US012470469B2

(12) United States Patent
Gao et al.

(10) Patent No.: US 12,470,469 B2
(45) Date of Patent: Nov. 11, 2025

(54) NETWORK ADAPTIVE MONITORING

(71) Applicant: NetBrain Technologies, Inc., Burlington, MA (US)

(72) Inventors: Lingping Gao, Burlington, MA (US); Peng Zhao, Burlington, MA (US); Yawei Wang, Burlington, MA (US); Hongwei Liu, Burlington, MA (US); Yongjing Chen, Burlington, MA (US); Lianchao Jin, Burlington, MA (US); Weibo Li, Burlington, MA (US); Pu Cheng, Burlington, MA (US); Guangdong Liao, Burlington, MA (US)

(73) Assignee: NetBrain Technologies Inc., Burlington, MA (US)

( * ) Notice: Subject to any disclaimer, the term of this patent is extended or adjusted under 35 U.S.C. 154(b) by 0 days.

(21) Appl. No.: 17/729,275

(22) Filed: Apr. 26, 2022

(65) Prior Publication Data

US 2022/0360509 A1 Nov. 10, 2022

Related U.S. Application Data

(60) Provisional application No. 63/311,679, filed on Feb. 18, 2022, provisional application No. 63/179,782, filed on Apr. 26, 2021.

(51) Int. Cl.
*H04L 43/12* (2022.01)
*H04L 41/0604* (2022.01)
(Continued)

(52) U.S. Cl.
CPC ...... *H04L 43/0817* (2013.01); *H04L 41/0627* (2013.01); *H04L 41/0816* (2013.01);
(Continued)

(58) Field of Classification Search
None
See application file for complete search history.

(56) References Cited

U.S. PATENT DOCUMENTS 5,276,789 A 1/1994 Besaw et al.
5,504,921 A 4/1996 Dev et al.
(Continued)

FOREIGN PATENT DOCUMENTS

EP 1349318 A2 10/2003
EP 3101841 A1 12/2016
(Continued)

OTHER PUBLICATIONS

Wayback Machine, Encyclopedia Britannica, definition of graphical user interface (GUI), Published 2015 (Year: 2015).*
(Continued)

*Primary Examiner* — Joshua Joo
(74) *Attorney, Agent, or Firm* — GTC Law Group PC & Affiliates

(57) ABSTRACT

A system is disclosed for network management automation using network intent or adaptive monitoring automation. Network intent (NI) represents a network design and baseline configuration for that network or network devices with an ability to diagnose deviation from the baseline configuration. The NI can be automated to update and replicate the diagnosis. The monitoring of the network can be adapted to capture network problems in advance with adaptive monitoring automation.

21 Claims, 45 Drawing Sheets

(51) Int. Cl.

| | |
|---|---|
| ***H04L 41/08*** | (2022.01) |
| ***H04L 41/0816*** | (2022.01) |
| ***H04L 41/0869*** | (2022.01) |
| ***H04L 43/0817*** | (2022.01) |
| ***H04L 43/0823*** | (2022.01) |
| ***H04L 43/0882*** | (2022.01) |
| ***H04L 43/16*** | (2022.01) |

(52) U.S. Cl.
CPC ...... *H04L 41/0869* (2013.01); *H04L 41/0886* (2013.01); *H04L 43/0847* (2013.01); *H04L 43/0882* (2013.01); *H04L 43/12* (2013.01); *H04L 43/16* (2013.01)

(56) References Cited

U.S. PATENT DOCUMENTS 5,572,640 A 11/1996 Schettler
5,706,440 A 1/1998 Compliment et al.
5,883,621 A 3/1999 Iwamura
5,926,176 A 7/1999 Mcmillan et al.
5,999,179 A 12/1999 Kekic et al.
6,058,103 A 5/2000 Henderson et al.
6,078,924 A 6/2000 Ainsbury et al.
6,137,782 A 10/2000 Sharon et al.
6,151,031 A 11/2000 Atkins et al.
6,205,122 B1 3/2001 Sharon et al.
6,253,240 B1 6/2001 Axberg et al.
6,286,035 B1 9/2001 Gillis et al.
6,289,380 B1 9/2001 Battat et al.
6,477,572 B1 11/2002 Elderton et al.
6,484,261 B1 11/2002 Wiegel
6,614,893 B1 9/2003 Paiz
6,628,304 B2 9/2003 Mitchell et al.
6,678,729 B1 1/2004 Ahoor et al.
6,718,382 B1 4/2004 Li et al.
6,788,315 B1 9/2004 Kekic et al.
6,901,440 B1 5/2005 Bimm et al.
6,907,572 B2 6/2005 Little et al.
6,909,708 B1 6/2005 Krishnaswamy et al.
6,957,263 B2 10/2005 Galou et al.
7,050,813 B1 5/2006 Paiz
7,051,101 B1 5/2006 Dubrovsky et al.
7,054,901 B2 5/2006 Shafer
7,065,769 B1 6/2006 Tolopka
7,082,464 B2 7/2006 Hasan et al.
7,177,924 B2 2/2007 Murray et al.
7,197,561 B1 3/2007 Lovy et al.
7,219,339 B1 5/2007 Goyal et al.
7,254,778 B2 8/2007 Dikhit
7,260,621 B1 8/2007 Lavian et al.
7,310,666 B2 12/2007 Benfield et al.
7,376,719 B1 5/2008 Shafer et al.
7,469,139 B2 12/2008 Van
7,490,073 B1 2/2009 Qureshi et al.
7,581,207 B2 8/2009 Bolder et al.
7,590,718 B2 9/2009 Gilmour et al.
7,721,304 B2 5/2010 Datla et al.
7,742,459 B2 6/2010 Kwan et al.
7,765,320 B2 7/2010 Vehse et al.
7,774,440 B1 8/2010 Bagrodia et al.
7,783,733 B1 8/2010 Yip et al.
7,813,281 B2 10/2010 Bolt et al.
7,823,069 B1 10/2010 Tanner et al.
7,848,337 B1 12/2010 Weng et al.
7,908,594 B2 3/2011 Varanasi et al.
7,996,415 B1 8/2011 Raffill et al.
8,190,723 B2 5/2012 Datla et al.
8,266,264 B2 9/2012 Hasan et al.
8,271,626 B2 9/2012 Childers et al.
8,276,152 B2 9/2012 Sanghvi et al.
8,325,720 B2 12/2012 Gao et al.
8,386,593 B1 2/2013 Gao et al.
8,386,937 B1 2/2013 Gao et al.
8,549,499 B1 10/2013 Ding et al.
8,601,318 B2 * 12/2013 Huang ................ G06F 11/2257 709/227
8,745,191 B2 6/2014 Raleigh et al.
8,782,201 B2 7/2014 Kephart et al.
8,903,965 B2 12/2014 Fong et al.
8,924,533 B2 12/2014 Adams et al.
8,943,184 B2 1/2015 Kothe et al.
9,098,412 B1 8/2015 Marchant et al.
9,176,731 B1 11/2015 Ziftci et al.
9,258,195 B1 2/2016 Pendleton et al.
9,374,278 B2 6/2016 Gao et al.
9,392,462 B2 7/2016 Raleigh et al.
9,438,481 B2 9/2016 Gao et al.
9,621,428 B1 4/2017 Lev et al.
9,954,751 B2 4/2018 Zhang et al.
10,235,353 B1 3/2019 Sanders et al.
10,382,288 B2 8/2019 Gao et al.
10,454,782 B2 10/2019 Gao et al.
10,567,252 B1 2/2020 Mukhopadhyaya et al.
10,652,102 B2 5/2020 Kompella et al.
10,756,983 B2 * 8/2020 Ratkovic ................. H04L 43/06
10,992,543 B1 4/2021 Rachamadugu et al.
11,018,994 B2 5/2021 Balan et al.
11,327,826 B1 5/2022 Shama et al.
11,431,584 B2 8/2022 Gao et al.
11,528,195 B2 12/2022 Gao et al.
11,637,758 B2 4/2023 Gao et al.
11,689,430 B2 6/2023 Gao et al.
11,736,365 B2 8/2023 Gao et al.
12,010,004 B2 6/2024 Gao et al.
2002/0054169 A1 5/2002 Richardson
2002/0152305 A1 10/2002 Jackson et al.
2002/0161861 A1 10/2002 Greuel
2002/0161875 A1 10/2002 Raymond
2002/0175934 A1 * 11/2002 Hand ...................... H04L 41/22 715/734
2002/0194497 A1 12/2002 Mcguire
2002/0198974 A1 12/2002 Shafer
2003/0009430 A1 1/2003 Burkey et al.
2003/0033588 A1 2/2003 Alexander
2003/0051032 A1 3/2003 Schenkel et al.
2003/0055892 A1 3/2003 Huitema et al.
2003/0101262 A1 5/2003 Godwin
2003/0135758 A1 7/2003 Turner
2003/0204590 A1 10/2003 Torii
2004/0019671 A1 1/2004 Metz
2004/0024865 A1 2/2004 Huang et al.
2004/0041833 A1 3/2004 Dikhit
2004/0153536 A1 8/2004 Strassner
2004/0193729 A1 9/2004 Saraph
2004/0194088 A1 9/2004 Chen et al.
2005/0005266 A1 1/2005 Datig
2005/0041676 A1 2/2005 Weinstein et al.
2005/0044197 A1 2/2005 Lai
2005/0060693 A1 3/2005 Robison et al.
2005/0135360 A1 6/2005 Shin et al.
2005/0138557 A1 6/2005 Bolder et al.
2005/0165597 A1 7/2005 Nightingale
2005/0169179 A1 8/2005 Antal et al.
2005/0216421 A1 9/2005 Barry et al.
2005/0243066 A1 11/2005 Li et al.
2005/0256961 A1 11/2005 Alon et al.
2006/0004745 A1 1/2006 Kuhn et al.
2006/0015591 A1 1/2006 Datla et al.
2006/0020694 A1 1/2006 Nag et al.
2006/0031446 A1 2/2006 Hamedi
2006/0036612 A1 2/2006 Harrop et al.
2006/0062154 A1 3/2006 Choy et al.
2006/0092940 A1 5/2006 Ansari et al.
2006/0221843 A1 10/2006 Cidon et al.
2006/0233310 A1 10/2006 Adams et al.
2006/0258348 A1 11/2006 Rajala
2006/0282453 A1 12/2006 Tjong et al.
2007/0006179 A1 1/2007 Tjong et al.
2007/0011348 A1 1/2007 Bansal et al.
2007/0058570 A1 3/2007 Singh et al.
2007/0073863 A1 3/2007 Motoyama et al.
2007/0101273 A1 5/2007 Lin et al.
2007/0130112 A1 6/2007 Lin

(56) References Cited

U.S. PATENT DOCUMENTS

| | | | |
|---|---|---|---|
| 2007/0168704 | A1* | 7/2007 | Connolly ............ G06F 11/2025 714/E11.073 |
| 2007/0169008 | A1 | 7/2007 | Varanasi et al. |
| 2007/0204231 | A1 | 8/2007 | Cunningham et al. |
| 2007/0283328 | A1 | 12/2007 | Javed et al. |
| 2008/0120129 | A1 | 5/2008 | Seubert et al. |
| 2008/0155423 | A1 | 6/2008 | Moran et al. |
| 2008/0155643 | A1 | 6/2008 | Moran et al. |
| 2008/0165775 | A1 | 7/2008 | Das et al. |
| 2008/0222189 | A1 | 9/2008 | Ovanesyan et al. |
| 2009/0003232 | A1 | 1/2009 | Vaswani et al. |
| 2009/0094521 | A1 | 4/2009 | Hung et al. |
| 2009/0113248 | A1 | 4/2009 | Bock et al. |
| 2009/0119280 | A1 | 5/2009 | Waters et al. |
| 2009/0157630 | A1 | 6/2009 | Yuan |
| 2009/0216867 | A1 | 8/2009 | Pusateri et al. |
| 2009/0288065 | A1 | 11/2009 | Nathan et al. |
| 2009/0300403 | A1* | 12/2009 | Little .................. G06F 11/0748 714/38.14 |
| 2010/0023867 | A1 | 1/2010 | Coldiron et al. |
| 2010/0030984 | A1 | 2/2010 | Erickson et al. |
| 2010/0118710 | A1 | 5/2010 | Ogawa et al. |
| 2010/0122175 | A1 | 5/2010 | Gupta et al. |
| 2010/0138750 | A1 | 6/2010 | Trinler |
| 2010/0153852 | A1 | 6/2010 | Mccallum et al. |
| 2010/0260066 | A1 | 10/2010 | August et al. |
| 2010/0299430 | A1 | 11/2010 | Powers et al. |
| 2010/0318639 | A1 | 12/2010 | Jauquet et al. |
| 2011/0004914 | A1 | 1/2011 | Ennis et al. |
| 2011/0013520 | A1* | 1/2011 | Dunn .................... H04L 43/103 370/242 |
| 2011/0047467 | A1 | 2/2011 | Porter |
| 2011/0087988 | A1 | 4/2011 | Ray et al. |
| 2011/0161730 | A1 | 6/2011 | Van et al. |
| 2012/0041858 | A1 | 2/2012 | Lewis |
| 2012/0054551 | A1 | 3/2012 | Gao et al. |
| 2012/0059916 | A1 | 3/2012 | Ohashi |
| 2012/0173691 | A1 | 7/2012 | Kothe et al. |
| 2012/0198082 | A1 | 8/2012 | Gaertner et al. |
| 2012/0209581 | A1 | 8/2012 | Gao et al. |
| 2012/0213117 | A1 | 8/2012 | Banerjee et al. |
| 2012/0259762 | A1 | 10/2012 | Tarighat et al. |
| 2012/0314605 | A1 | 12/2012 | Akiyoshi |
| 2013/0042222 | A1 | 2/2013 | Maddela |
| 2013/0067018 | A1 | 3/2013 | Reynolds et al. |
| 2013/0073486 | A1 | 3/2013 | Petrick |
| 2013/0198237 | A1 | 8/2013 | Serban et al. |
| 2013/0227103 | A1 | 8/2013 | Garimella et al. |
| 2013/0282889 | A1 | 10/2013 | Tito |
| 2013/0290224 | A1 | 10/2013 | Crowns et al. |
| 2013/0305091 | A1 | 11/2013 | Stan et al. |
| 2014/0040710 | A1 | 2/2014 | Smith |
| 2014/0078930 | A1 | 3/2014 | Bevemyr |
| 2014/0189870 | A1 | 7/2014 | Singla et al. |
| 2014/0192645 | A1 | 7/2014 | Zhang et al. |
| 2014/0207840 | A1 | 7/2014 | Smith et al. |
| 2014/0207945 | A1 | 7/2014 | Galloway et al. |
| 2014/0258985 | A1 | 9/2014 | Yawn et al. |
| 2014/0269266 | A1 | 9/2014 | Filsfils et al. |
| 2014/0280831 | A1* | 9/2014 | Gao ........................ H04L 41/22 709/223 |
| 2014/0280833 | A1 | 9/2014 | Gao et al. |
| 2014/0280864 | A1 | 9/2014 | Yin et al. |
| 2014/0282027 | A1* | 9/2014 | Gao ........................ H04L 41/22 715/736 |
| 2014/0355450 | A1 | 12/2014 | Bhikkaji et al. |
| 2015/0019692 | A1 | 1/2015 | Chandaria et al. |
| 2015/0081887 | A1 | 3/2015 | Kalkunte et al. |
| 2015/0103672 | A1 | 4/2015 | Stuart |
| 2015/0156077 | A1 | 6/2015 | Gao et al. |
| 2015/0242413 | A1 | 8/2015 | Goo et al. |
| 2015/0334207 | A1 | 11/2015 | Kane et al. |
| 2015/0373207 | A1 | 12/2015 | Day et al. |
| 2015/0382212 | A1 | 12/2015 | Elliott et al. |
| 2016/0020976 | A1* | 1/2016 | Gamage ................ H04L 43/103 709/224 |
| 2016/0028606 | A1* | 1/2016 | Cole ....................... H04L 43/12 709/224 |
| 2016/0099883 | A1 | 4/2016 | Voit et al. |
| 2016/0119219 | A1 | 4/2016 | Fang et al. |
| 2016/0164753 | A1 | 6/2016 | Cimprich et al. |
| 2016/0352586 | A1 | 12/2016 | Priya et al. |
| 2016/0359687 | A1 | 12/2016 | Gao et al. |
| 2016/0359688 | A1 | 12/2016 | Gao et al. |
| 2017/0063709 | A1* | 3/2017 | Smith ..................... H04L 47/70 |
| 2017/0070426 | A1 | 3/2017 | Chen et al. |
| 2017/0264513 | A1* | 9/2017 | Pietrowicz .............. H04L 45/02 |
| 2017/0324627 | A1* | 11/2017 | Eardley ................... H04L 43/12 |
| 2017/0353490 | A1 | 12/2017 | Krauss et al. |
| 2018/0018065 | A1 | 1/2018 | Gao et al. |
| 2018/0062956 | A1 | 3/2018 | Schultz et al. |
| 2018/0091419 | A1 | 3/2018 | Bickhart |
| 2018/0115469 | A1 | 4/2018 | Erickson et al. |
| 2018/0176096 | A1 | 6/2018 | Prabakaran et al. |
| 2018/0262594 | A1 | 9/2018 | Nhu et al. |
| 2018/0351806 | A1 | 12/2018 | Mohanram et al. |
| 2018/0351821 | A1 | 12/2018 | Nagarajan et al. |
| 2018/0375886 | A1* | 12/2018 | Kirti ................... H04W 12/086 |
| 2019/0044790 | A1 | 2/2019 | Dickens et al. |
| 2019/0052552 | A1* | 2/2019 | Holbrook ................ H04L 45/22 |
| 2019/0087401 | A1 | 3/2019 | Sanders et al. |
| 2019/0182119 | A1* | 6/2019 | Ratkovic ................. H04L 43/06 |
| 2019/0215248 | A1 | 7/2019 | D'ippolito et al. |
| 2019/0230003 | A1 | 7/2019 | Gao et al. |
| 2019/0238410 | A1 | 8/2019 | Kang et al. |
| 2019/0311034 | A1 | 10/2019 | Gao et al. |
| 2019/0327125 | A1 | 10/2019 | Mcchord et al. |
| 2019/0356535 | A1 | 11/2019 | Li et al. |
| 2020/0106673 | A1 | 4/2020 | Garrett et al. |
| 2020/0195501 | A1 | 6/2020 | Shenoy et al. |
| 2020/0213186 | A1* | 7/2020 | Shaw ...................... H04L 49/50 |
| 2020/0225925 | A1* | 7/2020 | Sathyanarayanamurthy ............... H04L 43/10 |
| 2020/0252261 | A1* | 8/2020 | Arora .................. H04L 43/0817 |
| 2020/0262297 | A1 | 8/2020 | Kubota et al. |
| 2020/0313957 | A1 | 10/2020 | A et al. |
| 2020/0389367 | A1 | 12/2020 | Gao et al. |
| 2020/0389368 | A1 | 12/2020 | Gao et al. |
| 2020/0389369 | A1 | 12/2020 | Gao et al. |
| 2020/0389370 | A1 | 12/2020 | Gao et al. |
| 2020/0403863 | A1 | 12/2020 | A et al. |
| 2021/0014145 | A1* | 1/2021 | Cai ......................... H04L 43/10 |
| 2021/0021492 | A1 | 1/2021 | Gao et al. |
| 2021/0144082 | A1 | 5/2021 | Bisht et al. |
| 2021/0152416 | A1 | 5/2021 | A et al. |
| 2021/0258238 | A1* | 8/2021 | Bose ................... G06F 9/45512 |
| 2021/0304098 | A1 | 9/2021 | Yang et al. |
| 2021/0309124 | A1 | 10/2021 | Fields et al. |
| 2021/0392047 | A1 | 12/2021 | Jamkhedkar et al. |
| 2022/0006755 | A1* | 1/2022 | Busick .................... H04L 45/34 |
| 2022/0021738 | A1* | 1/2022 | Patel ................... H04L 43/0876 |
| 2022/0044131 | A1 | 2/2022 | Rayes et al. |
| 2022/0078072 | A1 | 3/2022 | Rayes et al. |
| 2022/0094614 | A1 | 3/2022 | Khurshid et al. |
| 2022/0106060 | A1 | 4/2022 | Morrison et al. |
| 2022/0120574 | A1 | 4/2022 | Simpson |
| 2022/0166679 | A1 | 5/2022 | Hafeez et al. |
| 2022/0200863 | A1 | 6/2022 | Kotalwar |
| 2022/0247638 | A1 | 8/2022 | Engi et al. |
| 2022/0321426 | A1* | 10/2022 | Ewert ................. H04L 41/0813 |
| 2022/0393942 | A1 | 12/2022 | Gao et al. |
| 2022/0414492 | A1 | 12/2022 | Jezewski |
| 2023/0034173 | A1 | 2/2023 | Russell et al. |
| 2023/0104928 | A1 | 4/2023 | Gao et al. |
| 2023/0155907 | A1 | 5/2023 | Mwanje et al. |
| 2023/0198866 | A1 | 6/2023 | Gao et al. |
| 2023/0224214 | A1 | 7/2023 | Bhargava et al. |
| 2023/0336400 | A1 | 10/2023 | Gao et al. |
| 2024/0155435 | A1 | 5/2024 | Karapantelakis et al. |
| 2024/0305517 | A1 | 9/2024 | Gao et al. |

(56) References Cited

U.S. PATENT DOCUMENTS

| | | | |
|---|---|---|---|
| 2024/0314017 | A1 | 9/2024 | Gao et al. |
| 2024/0314019 | A1 | 9/2024 | Gao et al. |

FOREIGN PATENT DOCUMENTS

| | | | |
|---|---|---|---|
| EP | 3101842 | A1 | 12/2016 |
| EP | 3324575 | A1 | 5/2018 |
| EP | 3101842 | B1 | 11/2019 |
| EP | 3101841 | B1 | 7/2020 |
| EP | 3748503 | A1 | 12/2020 |
| EP | 3748504 | A1 | 12/2020 |
| EP | 3748505 | A1 | 12/2020 |
| EP | 3754905 | A1 | 12/2020 |
| EP | 3780500 | A2 | 2/2021 |
| EP | 3780500 | B1 | 9/2024 |
| EP | 3748503 | B1 | 12/2024 |
| WO | 2013036269 | A1 | 3/2013 |
| WO | 2014145818 | A1 | 9/2014 |
| WO | 2016130337 | A1 | 8/2016 |
| WO | 2019050474 | A1 | 3/2019 |
| WO | 2022002379 | A1 | 1/2022 |

OTHER PUBLICATIONS

NetBrain Workstation Architect Edition, parts of chapter 10, Apr. 27, 2010, 7 pages.
NetBrain Workstation 2.0, Oct. 10, 2008, 2 pages.
NetBrain Technologies Announces New Channel Strategy in North America and Europe, Mar. 17, 2010, 2 pages.
NetBrain Technologies Releases Enterprise Suite 4.0 at CiscoLive 2011, Jul. 8, 2011, 5 pages.
"U.S. Appl. No. 12/505,432, Non-Final Office Action mailed Apr. 2, 2012", 24 pages.
"U.S. Appl. No. 12/510,467, Non-Final Office Action mailed Mar. 20, 2012", 13 pages.
"European Application Serial No. 16172666.6, Extended European Search Report mailed Oct. 24, 2016", NetBrain Technologies Inc., 10 pages.
"European Application Serial No. 16172682.3, Extended European Search Report mailed Oct. 24, 2016", NetBrain Technologies Inc., 9 pages.
"European Application Serial No. 20178695.1, Extended European Search Report mailed Oct. 30, 2020", NetBrain Technologies Inc., 12 pages.
"European Application Serial No. 20178696.9, Extended European Search Report mailed Nov. 2, 2020", NetBrain Technologies Inc., 10 pages.
"European Application Serial No. 20178698.5, Extended European Search Report mailed Nov. 9, 2020", NetBrain Technologies Inc., 13 pages.
"European Application Serial No. 20186452.7, European Search Report mailed Dec. 9, 2020", NetBrain Technologies Inc., 15 pages.
"European Application Serial No. 20186452.7, Extended European Search Report mailed Mar. 12, 2021", NetBrain Technologies Inc., 14 pages.
Anonymous, "Cisco Prime Infrastructure 3.3 User Guide", XP055742035, San Jose, CA, USA Retrieved from the Internet: URL:https://www.cisco.com/c/en/us/td/docs/net_mgmVprime/infrastructure/3-3/user/guide/bk_CiscoPrimeInfrastructure_, Aug. 2, 2017, 898 pages.
Cisco Systems, Inc., "Show Command Section Filter", Cisco IOS Release 12.3(2)T, 2003, 1 page.
Netbrain Technologies Inc., "How to Define and Use Qapp", Updated Jun. 12, 2015. Retrieved from https://www.netbraintech.com/ftp/EE60/How_to_Define_and_Use_Qapp_6.0.pdf on Aug. 4, 2020., 2015, 250 pages.
"International Application Serial No. PCT/US2014/030647, International Preliminary Report on Patentability mailed Sep. 15, 2015", NetBrain Technologies Inc., 7 pages.
"International Application Serial No. PCT/US2014/030647, International Search Report and Written Opinion mailed Aug. 7, 2014", NetBrain Technologies Inc., 9 pages.
"International Application Serial No. PCT/US2016/015603, International Preliminary Report on Patentability mailed Aug. 15, 2017", NetBrain Technologies Inc., 9 pages.
"International Application Serial No. PCT/US2016/015603, International Search Report and Written Opinion mailed Mar. 29, 2016", NetBrain Technologies Inc., 11 pages.
Schmidt, et al., "Do-It-Yourself TMN Applications by Visual Programming Methods", IEEE Communications Magazine, vol. 33, No. 11, Nov. 1995, pp. 72-76.

* cited by examiner

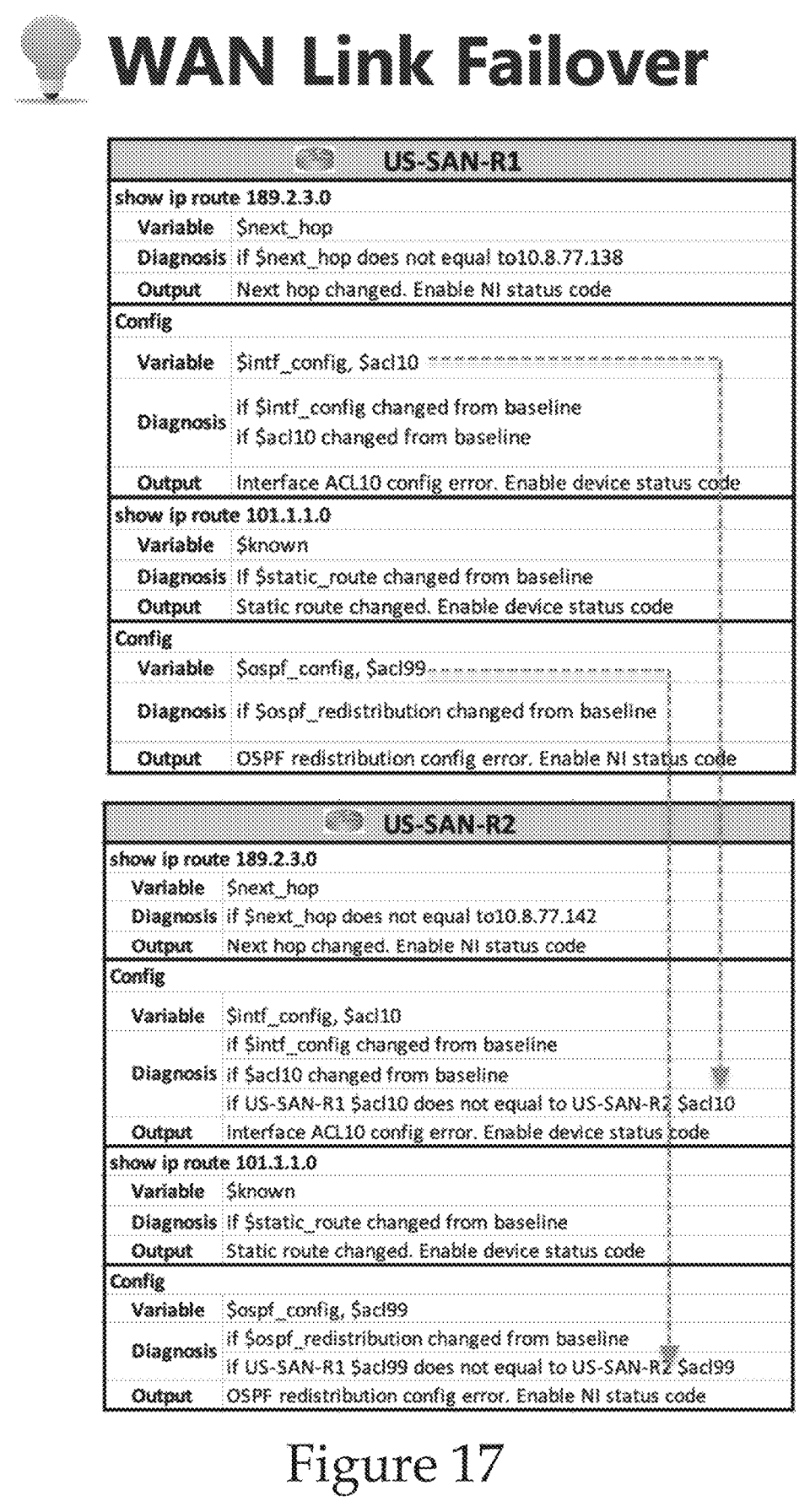

WAN Link Failover

| US-SAN-R1 | |
|---|---|
| **show ip route 189.2.3.0** | |
| Variable | $next_hop |
| Diagnosis | if $next_hop does not equal to10.8.77.138 |
| Output | Next hop changed. Enable NI status code |
| **Config** | |
| Variable | $intf_config, $acl10 |
| Diagnosis | if $intf_config changed from baseline<br>if $acl10 changed from baseline |
| Output | Interface ACL10 config error. Enable device status code |
| **show ip route 101.1.1.0** | |
| Variable | $known |
| Diagnosis | if $static_route changed from baseline |
| Output | Static route changed. Enable device status code |
| **Config** | |
| Variable | $ospf_config, $acl99 |
| Diagnosis | if $ospf_redistribution changed from baseline |
| Output | OSPF redistribution config error. Enable NI status code |

| US-SAN-R2 | |
|---|---|
| **show ip route 189.2.3.0** | |
| Variable | $next_hop |
| Diagnosis | if $next_hop does not equal to10.8.77.142 |
| Output | Next hop changed. Enable NI status code |
| **Config** | |
| Variable | $intf_config, $acl10 |
| Diagnosis | if $intf_config changed from baseline<br>if $acl10 changed from baseline<br>if US-SAN-R1 $acl10 does not equal to US-SAN-R2 $acl10 |
| Output | Interface ACL10 config error. Enable device status code |
| **show ip route 101.1.1.0** | |
| Variable | $known |
| Diagnosis | if $static_route changed from baseline |
| Output | Static route changed. Enable device status code |
| **Config** | |
| Variable | $ospf_config, $acl99 |
| Diagnosis | if $ospf_redistribution changed from baseline<br>if US-SAN-R1 $acl99 does not equal to US-SAN-R2 $acl99 |
| Output | OSPF redistribution config error. Enable NI status code |

Figure 17

Figure 43
Alert History - All Automations
7 Items
Show: All
Execution Time
Probe Name
Alert Message
Executed NI
04/08/21 08:35 PM
Interface Down
Interface down
04/08/21 08:35 PM
Low Frequency
BGP ACL Symmetry Check
04/08/21 08:37 PM
BGP Config Change
BGP config change
04/08/21 08:39 PM
OSPF Config Change
OSPF config change
04/08/21 08:40 PM
Link Utilization High
OSPF Design Check
04/08/21 08:40 PM
Link Utilization High
Interface s0/1 utilizat...
BGP ACL Symmetry Check
04/08/21 08:41 PM
CPU High
CPU is high, current ...
BGP Design Check

NETWORK ADAPTIVE MONITORING

PRIORITY

This application claims priority to Provisional Patent Application No. 63/179,782, filed on Apr. 26, 2021, entitled INTENT-BASED NETWORK AUTOMATION, and claims priority to Provisional Patent Application No. 63/311,679, filed on Feb. 18, 2022, entitled PROBLEM DIAGNOSIS AUTOMATION SYSTEM (PDAS) INCLUDING NETWORK INTENT CLUSTER (NIC), TRIGGERED DIAGNOSIS, AND PERSONAL MAP, the entire disclosures of both of which are herein incorporated by reference.

BACKGROUND

In the modern computer age, businesses rely on an electronic network to function properly. Computer network management and troubleshooting are complex. There are thousands of shell scripts and applications for different network problems. The available, but poorly documented solutions, can be overwhelming for junior network engineers. Most network engineers learn troubleshooting through reading the manufacturer's manual or internal documentation from the company's documentation department. But the effectiveness varies. For instance, the troubleshooting knowledge captured in a document can only be helpful if the information is accurate and the user correctly identifies the problem. Many companies have to conduct extensive training for junior engineers. The conventional way of network troubleshooting requires a network professional to manually run a set of standard commands and processes for each device. However, to become familiar with those commands, along with each of its parameters, takes years of practice. Also, complicated troubleshooting methodology is often hard to share and transfer. Therefore even though a similar network problem happens again and again, each instance of troubleshooting may still have to start from scratch. However, networks are getting more and more complex, and it is increasingly difficult to manage them efficiently with traditional methods and tools.

Network management teams provide two functions: to deliver on services required by the business and ensure minimized downtime. The first function may be dominated by projects, such as data centers, cloud migration, or implementing quality of service (QoS) for a voice or video service. The second function, minimizing downtime, may be more critical in impacting a company's revenue and reputation. Ensuring minimal downtime can include preventing outages from happening and resolving outages as soon as possible. Two measurements for an outage may include Mean Time Between Failure (MTBF) and Mean Time to Repair (MTTR).

Network management may utilize new methodologies and processes to accommodate the global shift to digital technologies. To manage the network efficiently with tactical, manual approaches using legacy mechanisms to build, operate, and troubleshoot may need to improve.

SUMMARY

This disclosure relates generally to network management automation using network intent or adaptive monitoring automation. Network intent (NI) represents a network design and baseline configuration for that network or network devices with an ability to diagnose deviation from the baseline configuration. The NI can be automated to update and replicate the diagnosis. The monitoring of the network can be adapted to capture network problems in advance with adaptive monitoring automation.

In one embodiment, a method for automating network management includes creating a network intent for a network device with a baseline configuration for the network device; establishing a diagnosis for the network device that includes a comparison with the baseline configuration; monitoring variables for the network device; comparing variables for the network device with the baseline configuration based on the diagnosis; identifying a deviation from the baseline configuration based on the comparing; updating the network intent based on the diagnosis and the deviation; and utilizing, iteratively, the updated network intent for the network device with the monitoring and the comparing. The network intent is associated with the network device and other network devices have other network intent with variables for those other network devices. The updated network intent is applied to a second network device. The utilizing includes outputting at least one of a diagnosis note, device status code, a network intent status code, or a baseline intent. The modifying comprises updating the network intent and iteratively applying the network intent for the one or more baseline configurations. The baseline configuration is saved as the network intent, and the monitored variables comprise current data, which is compared with previous data. The method includes parsing, with a visual parser, the monitored variables, wherein the monitoring is based on the parsed variables. The visual parser parses the monitored variables with a text parser, a variable parser, a paragraph parser, or a table parser. The visual parser comprises a reuse parser that applies to other network devices other than the network device. The network intent establishes design rules, security rules, or establishes repetitive problems.

In one embodiment, a method for network management includes establishing a network intent that comprises one or more baseline configurations for a network; monitoring variables in real time; comparing the monitored variables with the one or more baseline configurations; diagnosing a deviation from the one or more baseline configurations, which indicates one or more network problems; modifying the network intent based on the diagnosing, such that the network intent can be automatically applied to future deviations; and applying the modified network intent for subsequent instances of the monitoring. The network intent is associated with a network device and the variables are for that network device. A second network intent is established for a second network device. The applying further comprises iterative performing the comparing, the diagnosing, and the modifying for the subsequent instances. The method includes providing an alert when the deviation is diagnosed. The method includes parsing, with a visual parser, the monitored variables, wherein the diagnosing is based on the parsed variables. The modifying includes outputting at least one of a diagnosis note, device status code, a network intent status code, or a baseline intent. The modifying comprises updating the network intent and iteratively applying the network intent for the one or more baseline configurations. The baseline configuration is saved as the network intent and the monitored variables comprise current data, which is compared with previous data. The monitoring comprises an adaptive monitoring automation using a primary flash probe and a secondary flash probe.

In one embodiment, a method for automating network management includes performing monitoring of a network, wherein the monitoring is adaptive to network problems and adaptive to a workload; establishing a primary flash probe that is used to detect a deviation based on the monitoring; establishing one or more secondary flash probes for the primary flash probe that are triggered when the primary flash probe detects the deviation; and generating a flash alert when the primary flash probe or the one or more secondary flash probes detect the deviation. The method includes running a network automation at a device level based on the generated flash alert. The network includes running a diagnosis for the network device that includes a comparison with the baseline configuration. The network automation is the network intent. The monitoring comprises a back-end automation without reliance on a user to run automation. The primary flash probe or the one or more secondary flash probes perform a device level check or an interface level check. The method includes establishing a flash probe that performs a network anomaly detection on a single device. The method includes establishing a built-in flash probe that is triggered for detection of a configuration change, or when SNMP or CLI is unreachable. The primary flash probe or the one or more secondary flash probes is triggered by an event or by an API. The method includes providing a dashboard displaying a summary of probes and the generated flash alerts that includes a distribution of those for each network device. The dashboard displays an execution tree with results from the probes and the generated flash alerts. The dashboard displays a map of the network devices and the probes for each of the network devices on the map.

In one embodiment, a network management system includes a network intention (NI) management configured to define and execute the NI; adaptive monitoring automation configured to utilize one or more flash probes in a backend process, wherein the one or more flash probes create an alert and trigger the NI execution; and a dashboard for displaying network devices with corresponding results of the flash probes. The system includes an execution tree with results from the flash probes and the generated flash alerts. When the alert occurs, the triggered automation is executed. The flash probe comprises at least one of a primary robe, a secondary probe, or an external probe. The dashboard displays a summary of the flash probes and the generated alerts that includes a distribution of those for each of the network devices. The dashboard displays an execution tree with results from the flash probes and the generated alerts. The dashboard displays a map of the network devices and the flash probes for each of the network devices. The system includes a visual parser using a grammar to turn device command output or configuration file text into programmable variables, wherein the visual parser is configured to parse a configuration file and CLI command output for automation problem resolutions, further wherein the visual parser comprises variables comprising text, single variables, paragraph, and table. The NI comprises at least one of a name, a description, a target device, a tag, a configuration, or a variable.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 17 illustrates an example NI usage for enforcing design rules.

DETAILED DESCRIPTION

Figure 1:
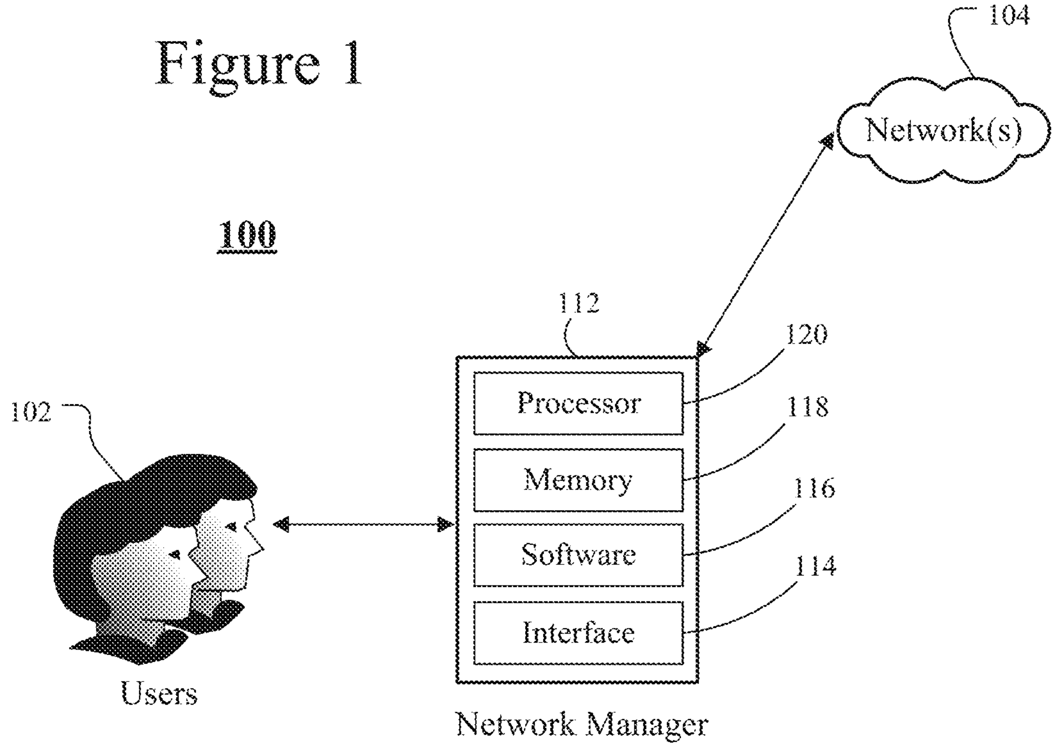
FIG. 1 illustrates a block diagram of an example network system.

A new model requires closed-loop mechanisms to achieve continuous improvement and self-documenting workflow automation. This shift to a business-centric and intent-based mindset is automation-friendly, analytical, and proactive. Network diagnostic work may move from sequential, CLI-focused methods to multi-threaded, integrated automation.

Network management automation may rely on administrative tasks or failure prevention monitoring, such as redundancy verifications, device hardening verifications, or compliance audits. The automation described below that augments network operations and improves MTTR and MTBF, prevents the inherent risks within networks that cause outages and MTBF, and prevents the inherent risks that cause outages within networks. Network engineering and architecture teams were traditionally the main stewards of this use case, where their jobs are to roll out new services, deliver redundancy, and reduce inherent risks. Reducing MTTR has an equal, if not greater, impact on the overall target of reducing downtime. The automation embodiments can enable infrastructure teams to become more efficient in this role. Combined with the added complexity of new networking technologies, the sheer volume of network devices, and the fragmentation of subject matter expertise, may lead to longer troubleshooting times. The automation embodiments can augment network management and improve MTTR.

By way of introduction, the disclosed embodiments relate to systems and methods for network management automation using network intent or adaptive monitoring automation. Network intent (NI) represents a network design and baseline configuration for that network or network devices with an ability to diagnose deviation from the baseline configuration. The NI can be automated to update and replicate the diagnosis. The monitoring of the network can be adapted to capture network problems in advance with adaptive monitoring automation.

Network Intention (NI) is a network-based solution with an executable automation element to document and verify a network design. NIs can be monitored proactively to prevent violation. The system can send an alert for an NI violation. The NI system may include Network Intention Management as a subsystem to define, manage and manually execute NI. The NI system may include a Feature Intent Definition or Network Intent Cluster as a subsystem to automatically create NIs from a template. The NI system may include Adaptive Monitoring Automation as a backend process to poll the network's status via a Flash Probe. When a flash alert occurs, the triggered automation is executed, such as Network Intent. The NI system may include a Decision Tree as a view to present the Flash Probe's results with the Flash Alert and associated triggered automation and further recommend automation elements based on a device and/or a tag that shows a troubleshooting scenario.

Reference will now be made in detail to exemplary embodiments of the invention, examples of which are illustrated in the accompanying drawings. When appropriate, the same reference numbers are used throughout the drawings to refer to the same or like parts. The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, and some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

The particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user," "network engineer," "network manager," "network developer" and "participant" shall interchangeably refer to any person, entity, organization, machine, hardware, software, or business that accesses and uses the system of the disclosure. Participants in the system may interact with one another either online or offline.

Communication between participants in the system of the present disclosure is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

In network troubleshooting, a network engineer may use a set of commands, methods, and tools, either standard or proprietary. For example, these commands, methods, and tools may include the following items:

The Command Line Interface (CLI): network devices often provide CLI commands to check the network status or statistics. For example, in a Cisco IOS switch, the command "show interface" can be used to show the interface status, such as input errors.

Configuration management: a tool used to find differences of configurations of network devices in a certain period. This is important since about half of the network problems are caused by configuration changes.

The term "Object" refers to the term used in computer technology, in the same meaning of "object oriented" programming languages (such as Java, Common Lisp, Python, C++, Objective-C, Smalltalk, Delphi, Java, Swift, C#, Perl, Ruby, and PHP). It is an abstracting computer logic entity that envelops or mimics an entity in the real physical world, usually possessing an interface, data properties and/or methods.

The term "Device" refers to a data object representing a physical computer machine (e.g., printer, router) connected in a network or an object (e.g., computer instances or database instances on a server) created by computer logic functioning in a computer network.

The term "Q-map" or "Qmap" refers to a map of network devices created by the computer technology of NetBrain Technologies, Inc. that uses visual images and graphic drawings to represent the topology of a computer network with interface property and device property displays through a graphical user interface (GUI). Typically, a computer network is created with a map-like structure where a device is represented with a device image and is linked with other devices through straight lines, pointed lines, dashed lines and/or curved lines, depending on their interfaces and connection relationship. Along the lines, also displayed are the various data properties of the device or connection.

The term "Qapp" refers to a built-in or user-defined independently executable script or procedure generated through a graphical user interface as per technology available from NETBRAIN TECHNOLOGIES, INC.

The term "GUI" refers to a graphical user interface and includes a visual paradigm that offers users a plethora of choices. GUI paradigm or operation relies on windows, icons, mouse, pointers and scrollbars to display graphically the set of available files and applications. In a GUI-based system, a network structure may be represented with graphic features (icons, lines and menus) that represent corresponding features in a physical network in a map. The map system may be referred to as a Qmap and is further described with respect to U.S. Pat. Nos. 8,386,593, 8,325,720, and 8,386,937, the entire disclosure of each of which is hereby incorporated by reference. After a procedure is created, it can be run in connection with any network system. Troubleshooting with a proposed solution may just take a few minutes instead of hours or days traditionally. The troubleshooting and network management automation may be with the mapping of the network along with the NETBRAIN QAPP (Qapp) system. The Qapp system is further described with respect to U.S. Pat. Nos. 9,374,278, 9,438,481, U.S. Pat. Pub. No. 2015/0156077, U.S. Pat. Pub. No. 2016/0359687, and U.S. Pat. Pub. No. 2016/0359688, the entire disclosure of each of which is hereby incorporated by reference.

The term "Step" refers to a single independently executable computer action represented by a GUI element, that obtains, or causes, a network result from, or in, a computer network; a Step can take a form of a Qapp, a system function, or a block of plain text describing an external action to be executed manually by a user, such as a suggestion of action, "go check the cable." Each Step is thus operable and re-usable by a GUI operation, such as mouse curser drag-and-drop or a mouse clicking.

FIG. 1 illustrates a block diagram of an example network system 100. The system 100 may include functionality for managing network devices with a network manager 112. The network system 100 may include one or more networks 104, which includes any number of network devices (not shown) that are managed. The network(s) 104 devices may be any computing or network device, which belongs to the network 104, such as a data center or enterprise network. Examples of devices include, but are not limited to, routers, access points, databases, printers, mobile devices, personal computers, personal digital assistants ("PDA"), cellular phones, tablets, other electronic devices, or any network devices. The devices in the network 104 may be managed by the network manager 112.

The network manager 112 may be a computing device for monitoring or managing devices in a network, including performing automation tasks for the management, including network intent analysis and adaptive monitoring automation. In other embodiments, the network manager 112 may be referred to as a network intent analyzer or adaptive monitor for a user 102. The network manager 112 may include a processor 120, a memory 118, software 116 and a user interface 114. In alternative embodiments, the network manager 112 may be multiple devices to provide different functions, and it may or may not include all of the user interface 114, the software 116, the memory 118, and/or the processor 120.

The user interface 114 may be a user input device or a display. The user interface 114 may include a keyboard, keypad or cursor control device, such as a mouse, joystick, touch screen display, remote control or any other device operative to allow a user or administrator to interact with the network manager 112. The user interface 114 may communicate with any of the network devices in the network 104, and/or the network manager 112. The user interface 114 may include a user interface configured to allow a user and/or an administrator to interact with any of the components of the network manager 112. The user interface 114 may include a display coupled with the processor 120 and configured to display output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the network manager 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e., software 116), such as code generated manually (i.e., programmed). The software 116 may include the Data View system and tasks that are performed as part of the management of the network 104, including the generation and usage of Data View functionality. Specifically, the Data View may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly, as discussed below. Likewise, the connections with other components of the system 100 may be physical connections or may be established wirelessly.

Any of the components in the system 100 may be coupled with one another through a (computer) network, including but not limited to one or more network(s) 104. For example, the network manager 112 may be coupled with the devices in the network 104 through a network or the network manager 112 may be a part of the network 104. Accordingly, any of the components in the system 100 may include communication ports configured to connect with a network. The network or networks that may connect any of the components in the system 100 to enable data communication between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The network manager 112 may act as the operating system (OS) of the entire network 104. The network manager 112 provides automation for the users 102, including automated documentation, automated troubleshooting, automated change, and automated network defense. In one embodiment, the users 102 may refer to network engineers who have a basic understanding of networking technologies, and are skilled in operating a network via a device command line interface and are able to interpret a CLI output. The users 102 may rely on the network manager 112 for controlling the network 104, such as with network intent analysis functionality or for adaptive monitoring automation.

Figure 2:
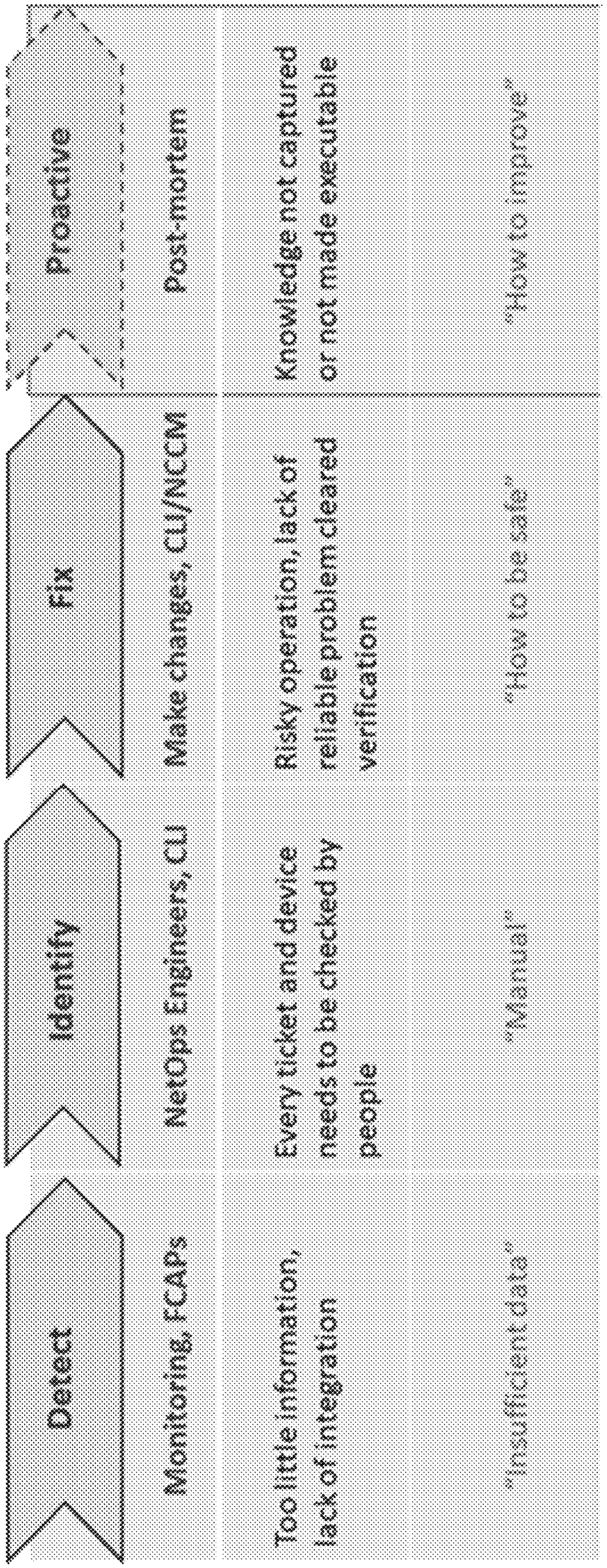
FIG. 2 illustrates an example of network management flow.

FIG. 2 illustrates an example network management flow. MTTR may have three operational phases: Detect, Identify, and Fix. Each step poses its challenges. Understanding how to apply automation to resolve every incident requires a thorough analysis of MTTR and the incident response workflow. Detect or fault detection is handled by monitoring and event management solutions, which are already commonly deployed in enterprise environments. While increased device telemetry has produced considerably more noise and false positives, today's event correlation solutions and SIEM products have helped reduce this flood. Therefore, the delay in MTTR is not usually within the Detect phase itself but instead occurs during the transition from the Detect phase to the Identify phase, which is a common cause of initial delays in incident resolution. Additionally, the information coming from the monitoring systems usually lacks details, often providing little actionable intelligence.

For Identify, potential delays and unreliable variability exist in the Identify phase, a problem that may require the most effort to resolve. Highly unpredictable, the Identify phase may have the most considerable impact on the cost of an outage. Without a means to methodically tackle this variability, we cannot measurably improve the most significant portion of MTTR. Hence, the most considerable reduction in MTTR will come from Mean Time to Identify (MTTI). An effective automation strategy must enable teams to obtain and analyze data faster to isolate the root cause.

While the Fix phase can be very brief, efforts to reduce the inherent risk of pushing a change and integrating this phase into a full incident response workflow are desired. The postmortem is an optional fourth phase of MTTR. When the current incident is resolved, what if a similar event reoccurs later, or is this a commonly recurring event? In network management postmortems, the lessons learned can be executable for next time.

Figure 3:
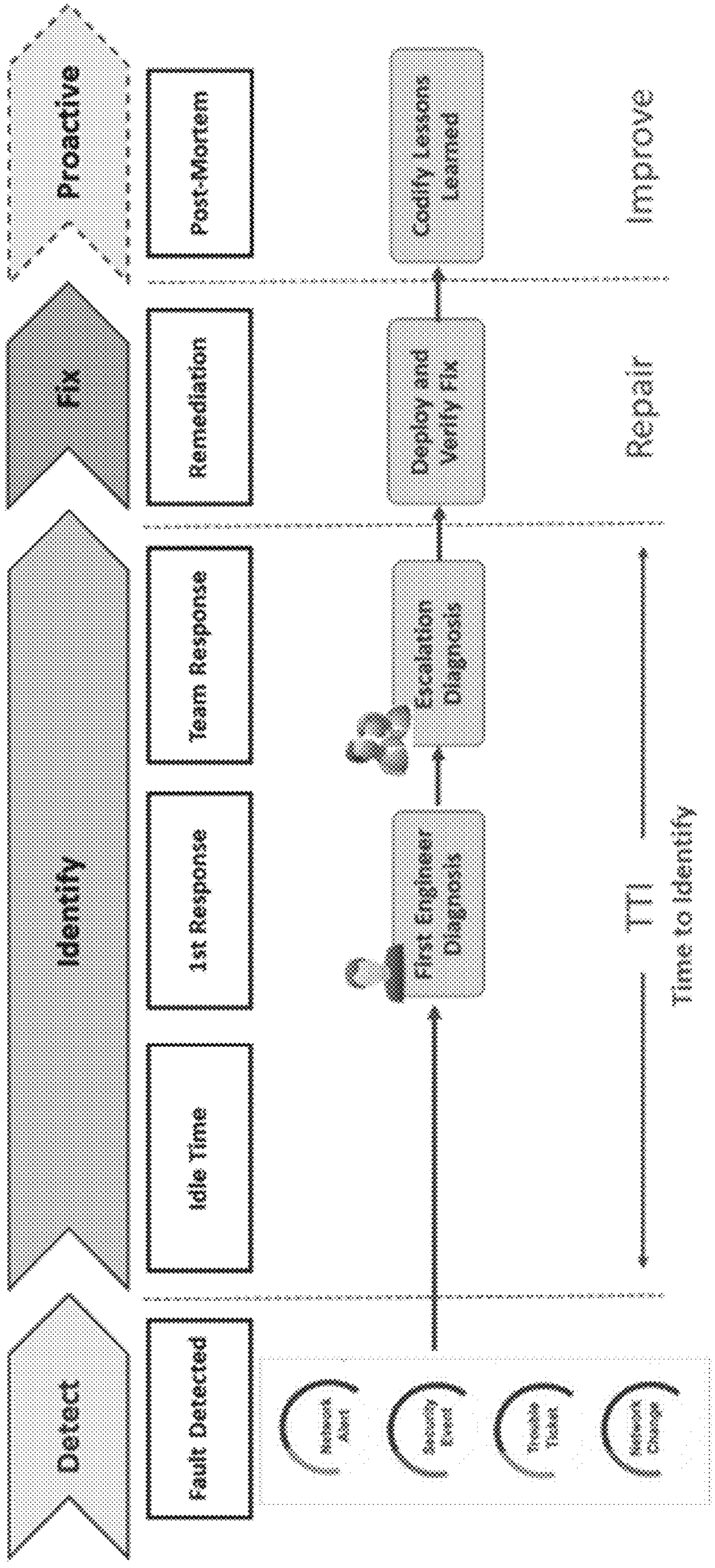
FIG. 3 illustrates another example of network management flow.

FIG. 3 illustrates another example network management flow. To visualize how the MTTR phases apply to an incident response methodology, FIG. 3 overlays the MTTR phases on top of a network operations workflow. An analysis of the incident response workflow from this perspective reveals the operational areas needing improvement.

Fault Detected: A network monitoring tool detects a fault, and then some automated event correlation may occur, and a ticket is automatically generated. Now, an investigation must begin to determine the root cause. While fault detection is mostly automated, the transition from detection to examination is typically not automated and is a cause of delay.

Idle Time: There is a waiting period after an event has been detected and is ongoing, but before an incident, a response investigation has begun. A ticket may sit idle for an hour or more while potentially critical diagnostic information vanishes.

First Response: This is often the most time-consuming stage and where MTTR can be reduced most. It is critical to have the correct data and the right know-how. Hugely variable, this stage can potentially take several hours or more depending on the complexity of the issue.

Escalation: If the first engineer is unable to resolve the issue, escalation is needed. The common flaw at this step is duplication of effort. The escalation engineer will inevitably repeat the first engineer's work before moving on to more advanced diagnostics.

Remediation: The goal here is to ensure that we push safe changes, do no additional harm, and verify that the fix was successful. Automation is the safest way to push out changes during this high-stress period of incident response.

Postmortem: Implementing lessons learned to "do better next time" may be critical yet exceedingly challenging to enact successfully.

Traditionally, the movement between the stages of incident response and the diagnostics during an investigation is manual. Therefore, MTTR reduction depends on people. Improving MTTR without automation would require either more people or a better network, both of which may be difficult to achieve. Advanced automation across each phase of the incident response workflow delivers a scalable methodology. MTTR reduction can be achieved by increasing automation at every stage of the incident response workflow and through a proactive automation at the postmortem stage following every incident.

Figure 4:
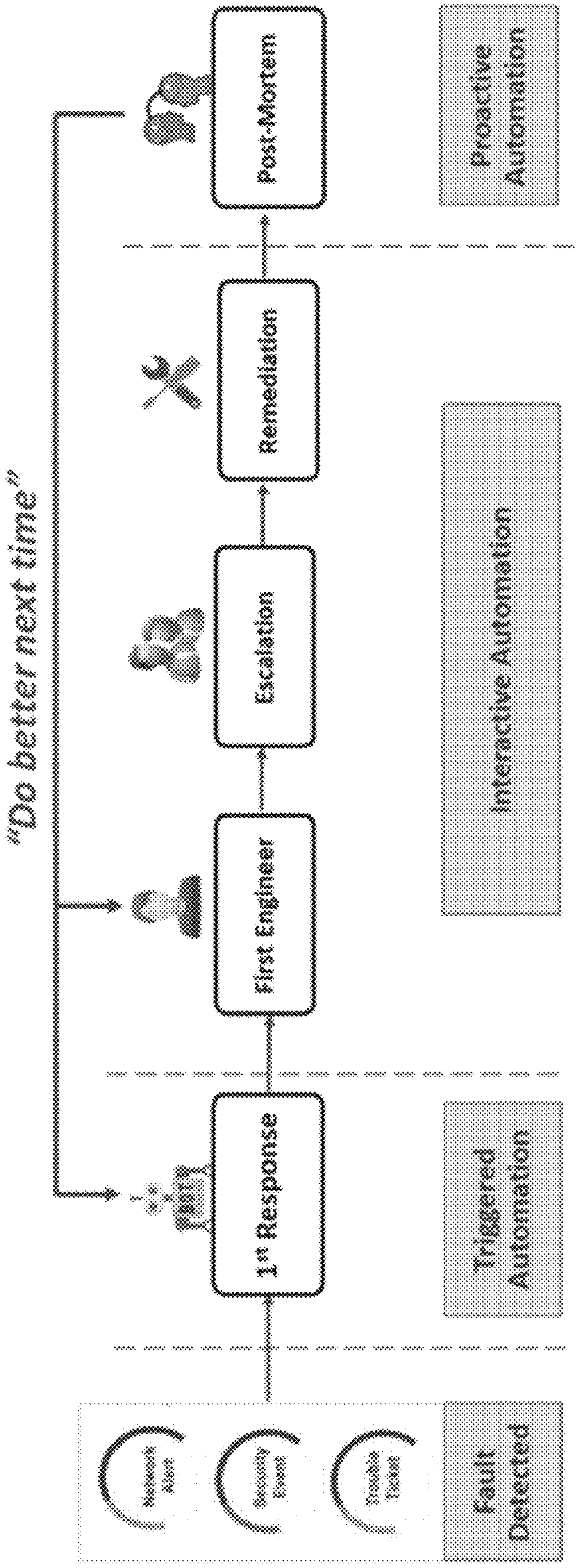
FIG. 4 illustrates another example of network management flow.

FIG. 4 illustrates another example network management flow. Automation may include:

- Triggered automation—occurring the moment an incident is detected.
- Interactive automation—to assist network engineers in their diagnoses.
- Proactive automation—to make the incident response more effective in the future.

Triggered Automation: Automate First Response

When a fault occurs within the network, the first challenge is the resulting idle time. If the ticket sits unworked, and in the case of intermittent issues, potential diagnostic data may even clear before an investigation can begin. Automation augments this process and initiates the diagnosis of the event. Triggered automation closes the gap between the detection of the fault and the action of investigating. For triggered automation to be successful, full network management workflow integration may be used. A network's event detection system or ITSM must communicate with the NetOps automation system to trigger an automatic diagnosis.

Figure 5:
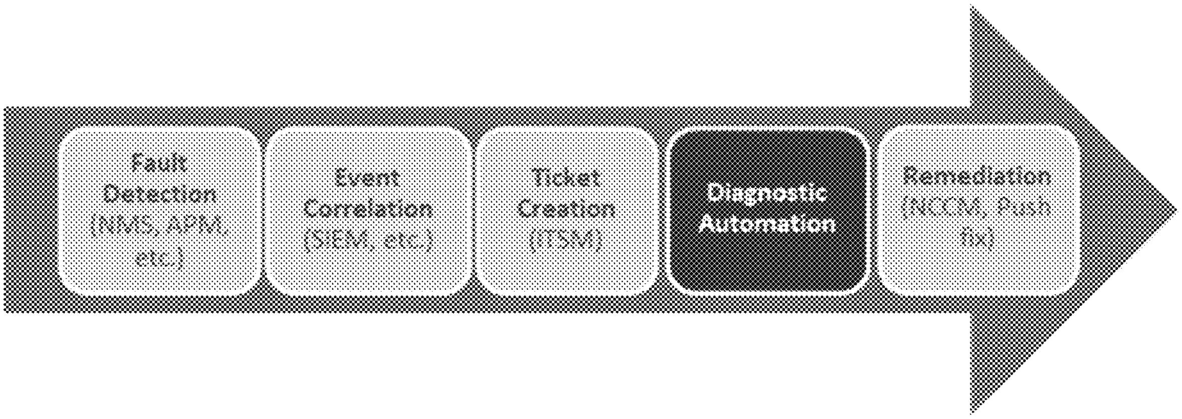
FIG. 5 illustrates triggered automation systems architecture.

FIG. 5 illustrates triggered automation systems architecture. Automation can augment the Detect phase in two ways: 1. automatically gather additional telemetry to help problem classification and diagnosis, and 2. reduce transition delays between the Detect and Identify stages.

Automation may be designed to augment people. Rather than sequentially parsing through the CLI outputs of every piece of network equipment in an affected segment, the engineer leverages pre-built operational runbooks that retrieve contextual diagnostic data from every device at the click of a button. This helps provide repeatable and predictable outcomes, ensures that relevant data is accurately retrieved, and dramatically reduces the diagnostic process's time.

The diagnostics may be scalable. Once the first engineer responds to an incident and begins the initial triage and investigation, the priority is to obtain the correct data quickly and perform accurate, efficient analysis, typically involving manual digging through CLI. The goal is to accelerate this diagnosis using automation. Knowing what data to get, retrieving it rapidly, and leveraging expert know-how to analyze this data is required. Automation may also provide enhanced data analytic functions to enable activities such as historical data comparisons to know "what has changed" or baseline analysis to understand "is this normal." When combined with live data, an engineer can obtain the correct data and use these comparisons of past, current, and ideal network conditions to perform the analysis much faster. The first level of support can resolve some issues, but many problems require escalation. Collaboration may fail during incident response, with data not adequately conveyed to the next-level engineer or diagnostics not captured and saved. The escalation engineer may duplicate the work of the first engineer before moving on to more advanced diagnostics. A network automation solution should record the collected diagnostics and troubleshooting notes of every person assigned to the ticket, so everyone working on the problem has the same data. When it comes to the fix, the goal is to push out the change safely and verify that the fix resolved the issue. A well-designed change automation system ensures the fix is successful. The solution automates the full mitigation sequence, including change deployment, the before and after quality assurance, and validation that the problem has cleared. The network management automation embodiments may ensure that mitigation is safely executed, no additional harm has occurred, and reliable post-fix verification is performed.

To see continual improvement over time requires more issues to be near-instantly diagnosed with the root cause identified. In other words, the automation strategy should focus on moving increasingly more issues to near-zero time to a resolution until you can resolve practically every ticket with automation. As more problems occur with proper postmortem reviews, a NetOps team would classify recurring issue types into a "known problem" category and develop operational runbooks for these problems.

As more known problem operational runbooks are fed to the machine, more known issues will have fully automated diagnoses. This process continuously pushes MTTR lower. With proactive automation, we convert lessons learned into repeatable and executable diagnostic automation tasks. More than just documenting that lesson, the goal is to implement an automated diagnostic that checks for this problem the next time there is a similar incident.

To achieve these proactive automation goals, the automation platform may:

Drive executable and reusable knowledge.

Deliver better "known problem" diagnosis.

Provide a self-documenting workflow with no coding required.

When designing a knowledge management framework and network automation strategy, the objective may enable junior engineers to leverage their senior-level expertise. From the view of an escalation chain, the goal will be to shift knowledge from senior staff, logically residing on the right side of the operational flow, towards the first responders working on the flow's left side, effectively shifting knowledge to the left. This downstream flow of knowledge enables the diagnostic work previously performed by a Tier-1 engineer to handle the automation system. The Tier-1 team can now take advanced work once performed by escalation engineers. This may provide the following benefits:

Reduced ticket escalations.

Expanded team knowledge.

Reduced operational costs.

Reduced MTTR.

There are several times when knowledge should be fed back into the automation platform, but two examples are operational handoff and following an incident. Operational Handoff is when a team has implemented a new network design (e.g., MPLS). A consistent, easy-to-follow method for documenting operational procedures related to new designs or new technology is required to ensure that everyone on the team knows how to troubleshoot the new environment. Building an operational runbook for the new design may be part of the handoff from the architect to the operator. Following an Incident means that the team may get together for a postmortem review after resolving an incident. The goal is to do better next time. This feedback process creates a closed-loop mechanism for continual improvement, capturing knowledge at these two critical and ordinary moments. Combining knowledge management with no-code runbook automation leads to the automated resolution of every ticket and can achieve continuous MTTR reduction over time. This feedback mechanism may be referred to as Proactive Automation.

Automation Platform

Figure 6:
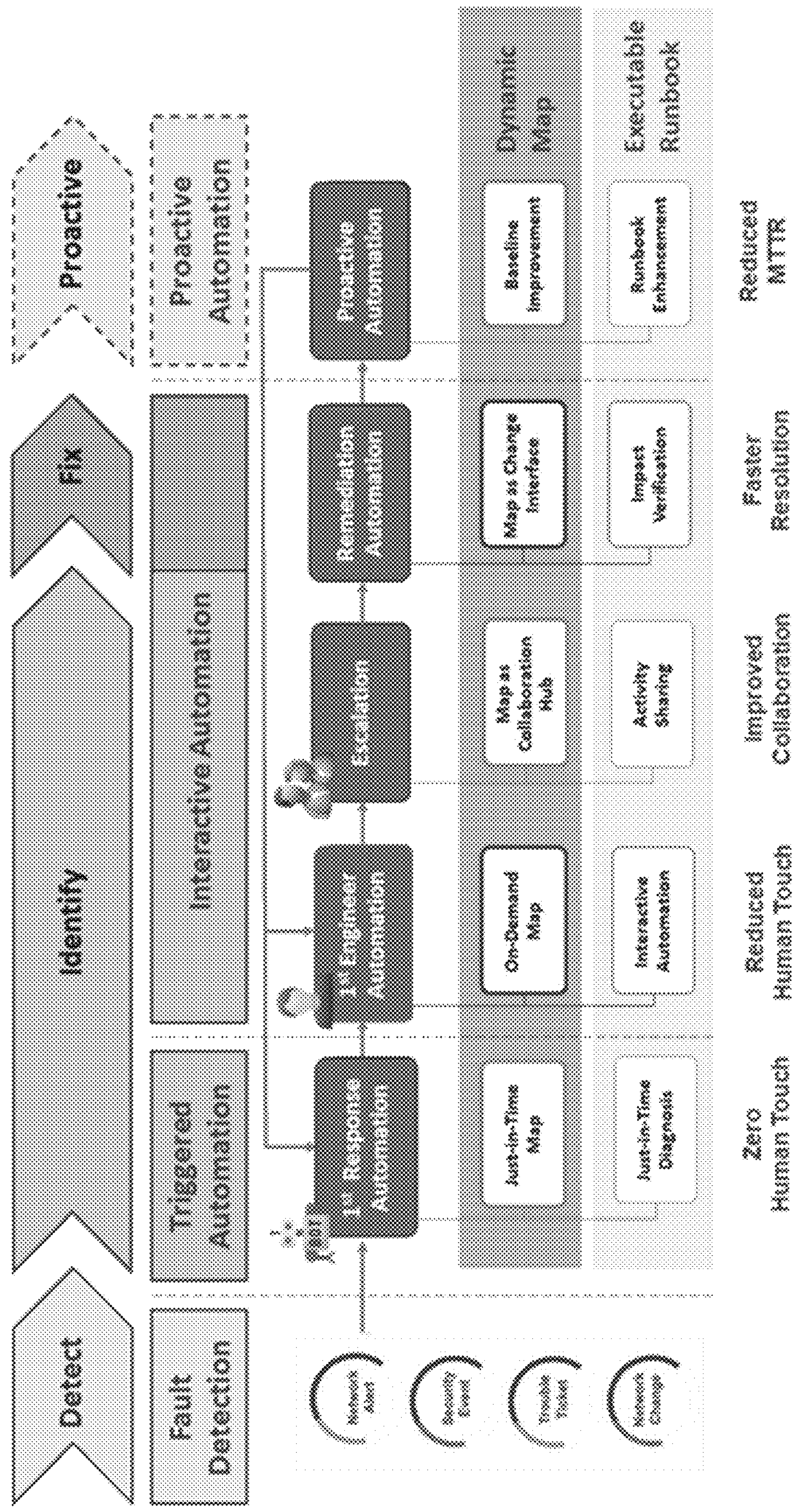
FIG. 6 illustrates an example incident response framework with automation for each stage.

FIG. 6 illustrates an example incident response framework with automation for each stage. In some embodiments, the automation platform utilizes two automation technologies—Dynamic Maps and Executable Runbooks. To build the model, the network management system performs an automated in-depth discovery of the network's control plane logic, which serves as the foundation for the automation. A neighbor-walking algorithm leverages CLI automation, SNMP, and APIs to decode thousands of data variables per device, creating a "digital twin" of the network. This discovery process populates the automation database, enabling data visualization via a Dynamic Map and providing repeatable automation with Executable Runbooks. The automation platform automates the resolution of every ticket and for delivering advanced knowledge management with the following functions:

Management network abstraction with creating the network's "digital twin" and a conceptual management network fabric.

Dynamic network mapping for real-time visualization and as the user interface for automation.

Runbook automation for rapid diagnostics and analysis of network events without any coding.

Integration with existing ecosystem tools for end-to-end analysis on one map.

Event-triggered automation for an instant, automated diagnostics, and mapping of the problem.

Centralized elastic knowledge base for codified know-how to shift knowledge to the left.

The automation may have two types of users: consumers and creators of executable knowledge. This solves the challenges of resolving network tickets and maintaining a network, as shown in the following example network incident. The network's monitoring systems have detected a low video quality issue between the Boston and New York site locations. The network team's application performance monitor notifies their ITSM system and generates a new trouble ticket. Here, workflow integration comes into play. The network management system provides a mechanism to integrate with ITSM systems, which enables (1) creating a contextual Dynamic Map of the problem area at the time of ticket creation, and (2) enriches the trouble ticket with diagnostic data obtained from Executable Runbooks at the time of the event—Just in Time Automation. In the example video quality incident, the Dynamic Map visualizes relevant data about the network—topology data, configuration, and design data, baseline data across thousands of data points, and even data from integrated third-party solutions. This map provides instant visualizations of the problem area. Triggered automation has now occurred, and valuable data has been automatically gathered at the start of the event using an Executable Runbook. A first response engineer may have reviewed these automated diagnostics. The data retrieved includes essential device health, QoS parameters, access-control lists, and other relevant collected logs. What used to be a manual effort is now a zero-touch mechanism, ensuring that every ticket is enriched with a contextual map and diagnostic data.

The root cause can then be determined in the poor video quality issue. The engineer has reviewed the map of the problem and the collected diagnostics but still needs to drill down further to determine the root cause. To aid in the diagnosis, the scalability of the automation platform may be used. Additional diagnostics or more advanced design reviews may be needed to determine the root cause. The engineer now leverages the automated drill-down capabilities of the network management automation platform to do further analysis and historical comparisons and compare this data with previous baselines. The know-how and operational procedures from previous incident responses by the network management team may be converted into Executable Runbooks and allows large swaths of contextual data to be pulled, parsed, analyzed, and displayed on the console at the push of a button by an engineer on the team, no matter their experience.

In the low video quality example, the network management team has identified the issue to be a misconfigured QoS parameter on a router. The misconfiguration has been successfully remediated with a configuration fix using the network management automation platform. By adding this issue to the list of known problems, the team ensures that they can identify and remediate the problems much faster if it happens again. With the network management automation platform, the additional diagnostic commands used to resolve the issue are added to the existing Executable Runbook automatically to enrich the Runbook without requiring any coding. Should the event reoccur, the system will trigger an automated diagnosis using the updated Runbook. The root cause will be determined instantly, with a near-zero Time to Repair for this repeat occurrence. This process also helps to rule out possible known issues in unrelated incidents automatically. It creates a "virtuous cycle"—the more known problems and scenarios for which an Executable Runbook is built, the further MTTR is reduced.

Intent-Based Automation

Dynamic Mapping and Executable Runbook are used for automating network troubleshooting. The Runbook digitalizes the troubleshooting procedure and can be executed anywhere by anyone after writing once. There exist vast amounts of troubleshooting playbooks by network device vendors. Enterprise also creates many best-practice playbooks to troubleshoot the problem common to its unique network. Executable Runbook can codify these playbooks. However, one difficulty in codifying these runbooks is that they try to solve a common problem and require coding skills. Some Runbooks can be complicated with many forks depending on human decisions (the diamond node in the sample playbook), making them hard to execute in the backend processes without human intervention. Since Runbook is a template-based solution designed to solve a common problem for many networks, it may not contain the baseline data for a specific network, which is the most useful info while troubleshooting.

Accordingly, Network Intention (NI) can be used to solve these issues. NI may also be referred to as Network Intent. NI is an Automation Unit that can represent an actual network design (with Baseline) and include the logic to diagnose the intent deviation and replicate diagnosis logic across the entire network (with Network Intent Cluster technology). NI is a network-based solution with an executable automation element to document and verify a network design. In an ideal network, all NIs should not be violated. NIs can be monitored proactively, and the system should send an alert for an NI violation. The NI system may include the following components:

- Network Intention Management: a subsystem to define, manage and manually execute NI.
- Feature Intent Definition (FID): a subsystem to automatically create NIs from a template YAML file. This may also be referred to as Network Intent Cluster (NIC).
- Adaptive Monitoring Automation: a backend process to poll the whole network's status via Flash Probe periodically. When a flash alert occurs, further execute the triggered automation such as Network Intent.
- Preventive Automation Dashboard: a view to present Flash Probe's results with the Flash Alert and associated triggered automation.

Figure 7:
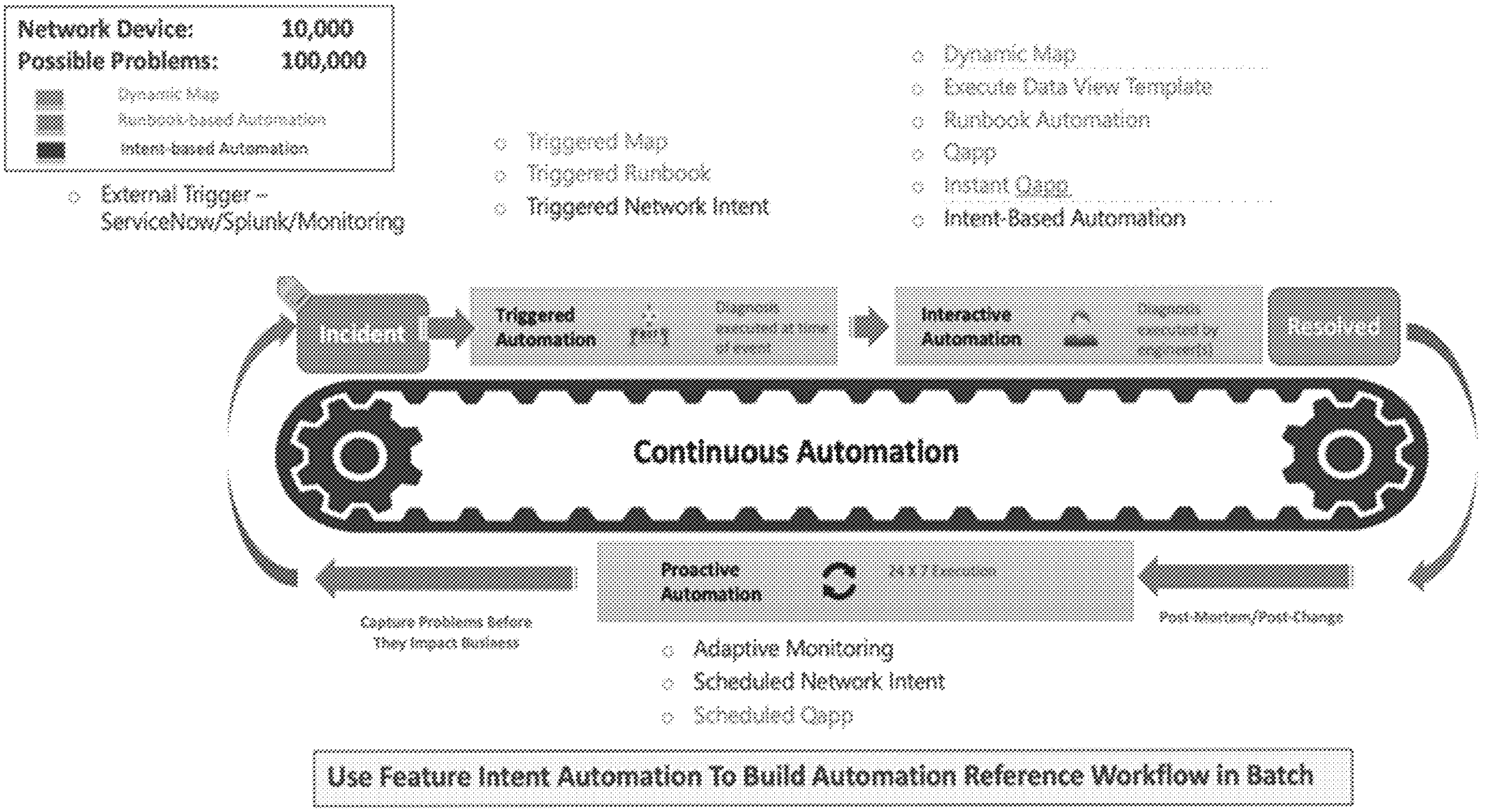
FIG. 7 illustrates an example network intent system with continuous automation.

FIG. 7 illustrates an example network intent system with continuous automation. Network Intent (NI) describes a network design for a specific network device, what these design baselines are like, and how to verify the design works properly. The baseline may be when the network is working well. This baseline configuration is a normal condition. This provides a way to document network design, allowing other engineers to quickly understand the device's design and baseline or normal state of a particular device. It also provides a way to verify network design. When a network problem occurs, one or multiple NIs are violated. In the postmortem stage of this problem, the violated NIs are coded and automatically monitored. The next time a similar situation occurs, it can be automatically or manually solved in a few minutes and reduce MTTR.

NI may be used in a preventative use case. There may not be problems, but periodic checkups are run to ensure the network is running normally. In another example, when there are problems (e.g., the application is down—ticket system), tests may need to be run, so the automation automates the testing for why the application is down. It may be NI is down.

Figure 8:
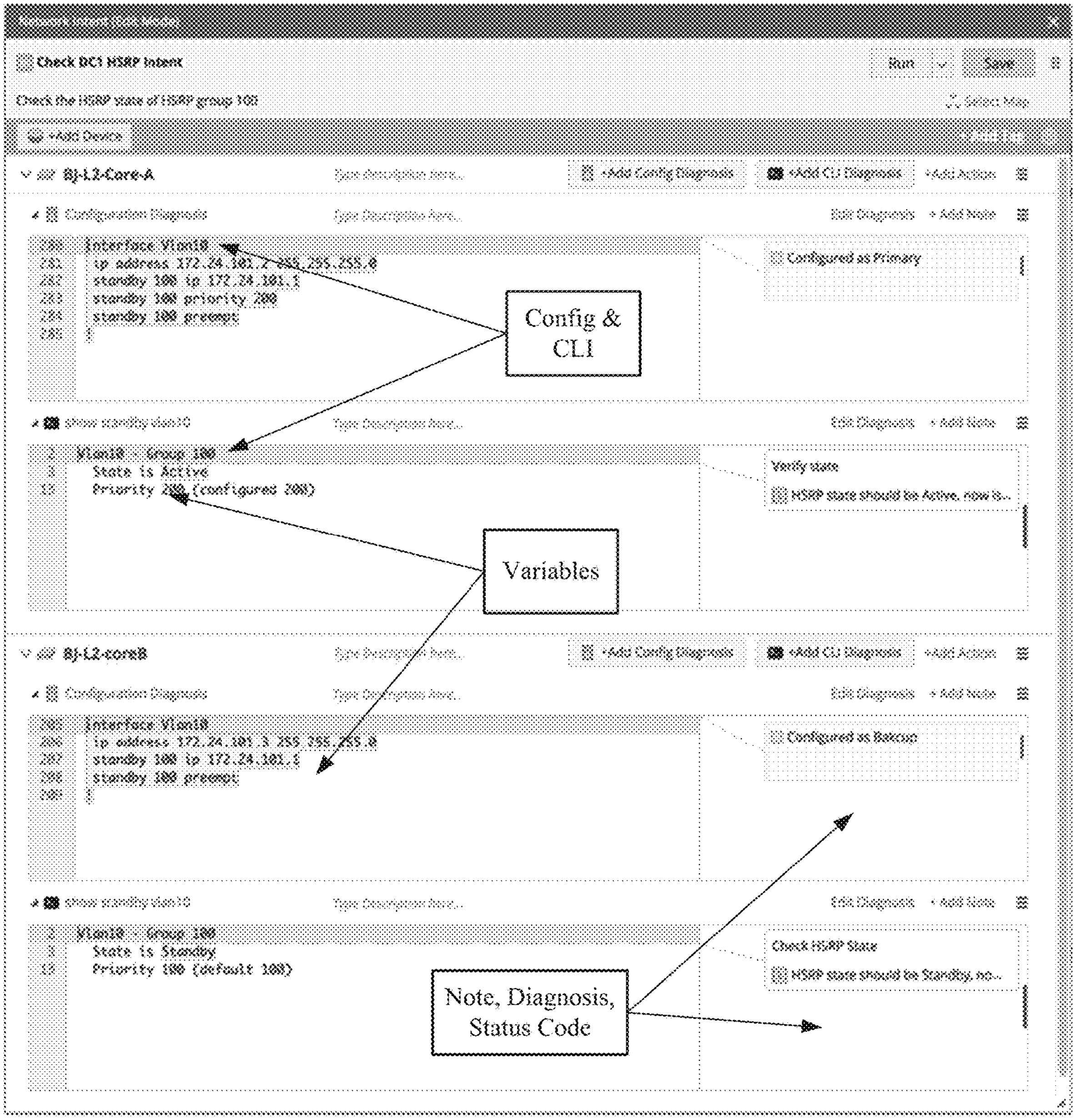
FIG. 8 is a screenshot of network intent (NI) editing.

FIG. 8 is a screenshot of network intent (NI) editing. Users can use the Add Device button to add the network device with which the NI is associated. In this example, BJ-L2-Core-A and BJ-L2-coreB are target devices. NI is always associated with a device and, more specifically, may be associated with a device's interface. An NI may have the following elements:

- Name and description.
- Target Device(s): the network device with which this NI is associated.
- Tags: the category of this NI and used for the global search and other functions.
- Config and CLI: the device configurations or CLI command outputs for this NI.
- Variables: the variables defined by the Visual Parser.
- Notes, Diagnosis & Status Code include notes, which can be any text to describe the design, best practice, and any hint. The Diagnosis and Status Code may be an executable code to verify this design and create an alert if it is violated.

Recommended actions: the actions the system recommends for further troubleshooting.

Referring to FIG. 8, selecting a new network intent may start with selecting target devices, which includes clicking the Add Device button, and from the device dialogs, selecting the target devices. By default, the devices in a current map are listed. You can also filter devices by device type, device group, or site. Next, the user can Add Config Diagnosis and Add CLI Diagnosis to add the Config and CLI commands related to this NI. In the Network Intent (Edit Mode) pane, the user clicks Add Config Diagnosis. From a menu, the user can click Configuration Diagnosis or Edit Diagnosis to open the diagnosis definition pane. The user can click Retrieve Live Data to retrieve live data as sample data or can click an icon to select history data, or directly import text as sample data. After the live data is retrieved, the user can click Add Text to define a text variable. The user can select lines of text in a Sample area, and click an arrow to duplicate it as the content to match the defined variable. For CLI commands, the user can enter a command and retrieve the data for this command from the live network.

In some embodiments, the Parser for Config and CLI commands can be defined. A Visual Parser supports at least four types of variables: text, single variables, Paragraph, and Table. The Text parser is used to match specified lines of text. For example, to verify that the specific configuration or CLI command output does not change in the future, you can define a text parser to parse specified lines of text and compare the live data with the baseline. A Variable or Keyword parser is used to parse a single-value variable (such as version number) by anchoring keywords before and after the variable. Each Variable Line Pattern in a keyword parser can parse a variable within the full-text range or parse multiple variables in one text line. A paragraph parser is used to extract the essential data in recurring text lines and place it into a tabular shape. The parsed variables of a paragraph parser are a table. The variables defined in ID line patterns, variable line patterns, and parent line patterns (optional) will be formed as table columns. A table parser may be used to parse table-formatted text, such as NDP table, VRF table, OSPF neighbors, etc. With a table parser, you can address the line of table headers in the raw text and then leverage the column separator to adjust the Table's column width manually.

In some embodiments, a note, diagnosis, and status code are added. A common diagnosis can be as simple as: if the variable is not equal to a specific value (the baseline value) and then creates an alert. Status code describes NI execution results (Error or Normal). Clicking Edit Diagnosis opens the diagnosis pane. On a Define Diagnosis tab, click Add Diagnosis to enter a diagnosis name and select an anchor defined. An if/then condition can be set, and there is an option to select the Set as Status Code for Network Intent check box to add a status code at the NI level.

When adding a diagnosis to a Network Intent, the user can define various diagnosis logics to make the NI more flexible and verify the network design more accurately. A Table/Paragraph Variable is one example. A variable can be a single variable such as $state or a table (Paragraph) variable. For the table/paragraph variable, the user can select the Loop Table Rows for the system to loop through each Table's row. Using the OSPF neighbor table as an example. There may be multiple neighbor information lines in the CLI result, and the diagnosis execution will determine whether the state contains full line by line. Different types of variables have various operations such as Equals, Not Equal to, Contains, etc. For each variable defined in diagnosis, the user can select its data sources/type:

Current: retrieved from the live data. The data and value from the current execution.

Baseline: the baseline data. The data and value are saved in the NI definition as the baseline.

Last: the system will retrieve the data twice and compare the current data with the last data.

The diagnosis may compare the current state with the baseline state or compare the current CRC value with the last CRC value. The user can compare the variables from the different devices, such as an MTU from two neighbor devices. There may be multiple simple conditions, and users can combine them into a Boolean expression (and/or). The diagnosis logic may have flexible settings to support simple and complex diagnosis logic and output.

NI can be used to enforce design rules or security rules. For example, it can Check Route Leaking Between DMZ/Enterprise/Production networks. This automation logic can be replicated to all networks by NIC. In another embodiment, NI can be used to troubleshoot repetitive problems, such as an interface error. In another embodiment, NI can be used to diagnose application path problems by considering:

Is the path changed visually between the cached path (when the network is healthy), golden path, and live path?

Is the path failing over programmatically? NI can check whether the routing table entry (for 13 failover) for destination changed and the CAM table (for L2 failover) changed.

Is the path healthy performance-wise? UI can baseline and analyze the link utilization change, CPU/memory change, link error change, and QoS buffer drop change.

Is Path configured properly? NI can check the QoS configuration consistence across devices along the path to check configuration consistence between fail-over device pairs in the path.

Visual Parser

FIG. 8 included variables defined by the Visual Parser. The Visual Parser uses a specific grammar to turn device CLI command output or configuration file text into programmable variables and enable "What you see is what you can program" without coding. It enables a network engineer familiar with the visual parsing grammar to parse the configuration file and CLI command output for most automation problem resolutions and achieve no-code automation that every network engineer can do.

Figure 9:
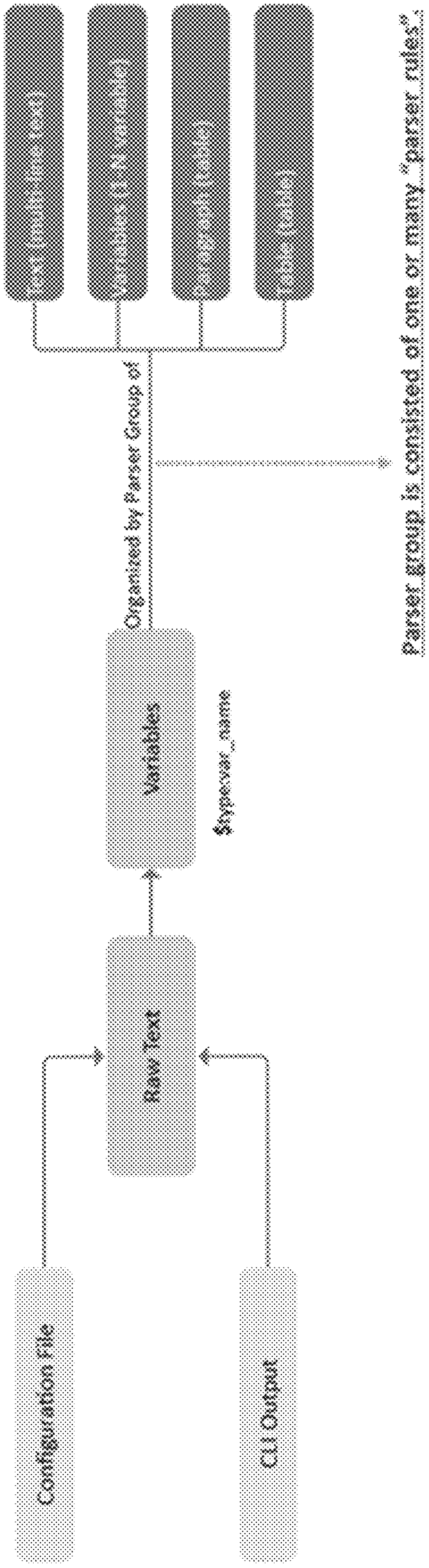
FIG. 9 illustrates a visual parser example.

FIG. 9 illustrates a visual parser example. The system allows users to define multiple types of parsers to parse variables. For each type of Parser, a set of parser rules work together to define how variables are extracted from raw text. With valid rules, the output of the Parser will be highlighted instantly inside the input text. A text parser can match specified lines of text. A simple variable parser can parse a single-value variable, such as version number, by anchoring keywords before and after the variable. A Paragraph parser can parse variables in recurring paragraphs, such as collisions and CRC errors for interfaces, by defining paragraph identifier (ID) lines and each Paragraph's line patterns. A Table parser can parse table-formatted text, such as NDP table, VRF table, etc.

The system provides at least five types of parser rules that can be applied to a parser or a parser group:

Start Line: Define the start of the text, then apply parsing rules.

End Line: Define the end of the text, after which parser rules will stop.

Text Replacement: Define text replacement before applying parser rules.

Single Line Parser: Parse a line of text using a pattern with keyword and variable.

Multiple Line Parser: use two special grammar, LinesbyKeyword and LinesbyVariable, to match the multiple lines of text.

A single-line rule (line pattern) represents a type of expression serving parse variables in one or multiple text lines. The system adopts line-pattern-matching syntax to apply the given line patterns to identify and parse variables. The line pattern may be in the following types of parser and parser components:

Simple Variables Parser (Variable Line)

Paragraph Parser (Variable Line, Identifier (ID) Line, and Parent Line)

Start and End Line

A simple line pattern is an example line pattern to parse one or more variables. A variable always starts with $, and it is a string by default. For example, the pattern "one minute: $string:cpu1; five minutes: $cpu2" asks the system to find the keyword "one minute:" and assigns the word between "one minute:" and ";" to the variable $ cpu1. The variable name may include a combination of letters, numbers, and underscores and can only start with letters and underscores. Variables of the same level in the same Parser may not be allowed to have the same name. The following table introduces sample pairs of raw text and simple line patterns for each variable type:

TABLE 1

Example pairs of raw text and simple line patterns for variable type.

| Variable Type | Sample of Raw Text | Sample of Line Pattern |
|---|---|---|
| String | Version 12.2(53)SE2, RELEASE SOFTWARE | Version $version, RELEASE SOFTWARE |
| Multi-string (mstring) | R1 uptime is 51 weeks, 4 days, 23 hours, 3 minutes | uptime is $mstring:uptime |
| Integer | MTU 1500 bytes | MTU $int:mtu bytes |
| Float/Double | Next hello sent in 1.824 secs | Next hello sent in $float:hello_time secs |
| Boolean | single-connect=false | single-connect=$bool:single_conn |
| Enumeration | Auto-duplex, Auto-speed<br>Full-duplex, 100 Mb/s, 100BaseTX/FX<br>Haft-duplex, 100 Mb/s, 100BaseTX/FX | $duplex(Full-duplex\|Half-duplex\|Auto-duplex) |
| Dummy | 0 input errors, 0 CRC, 0 frame, 0 overrun | $int:_dummy input errors, $int:crc CRC, $int:_dummy frame, $int:overrun overrun |

The following two characters can be used in a simple line pattern to match the start/end or a line:

TABLE 2

Example characters for start/end of a line.

| Character | Description | Sample Line Pattern |
|---|---|---|
| ^ | Match the start of a string or a line. | ^$intf is $mstring:state, line protocol is $status |
| $ | Much the end of a string or a line. | Neighbor priority is $priority. State is $state, $int:changes state changes$ |

The system may provide an option to match lines by variable patterns to get multiple raw CLI text lines of specified multiple variables with the following detailed rules:

Using a comma (,) to separate var1 and var2 only returns the lines where the variables reside.

Using a hyphen (-) to connect var1 and var2 returns the consecutive lines from the line of var1 to that of var2. If the end line is not specified in the pattern, such as "LinesByVariable[$var]:$var1-", it will return the rest of the Paragraph.

TABLE 3

Example variable formats.

| Format | Sample of Raw Text | | Sample of Regex |
|---|---|---|---|
| LinesByVariable[$var]: | Current configuration : | | Variable Line Pattern |
| $var1, $var2 | 11235 byes | | |
| | ! | | 1. version $float:version |
| | version 15.2 | Var Line 1 | |
| | service timestamps debug | Var Line 3 | |
| | datetime msec | | 2. hostname $hostname |
| | service timestamps log | | 3. LinesByVariable[$config]:$version, |
| | datetime msec | | $hostname |
| | no service password | | |
| LinesByVariable[$var]: | encryption | | + Variable Line Pattern |
| $var1-$var2 | ! | | |
| | hostname GW2Lab | Var Line 2 | |
| | ! | | |
| | boot-start-marker | | |
| LinesByVariable[$var]: | | | |
| $var1-$var2, $var3 | | | |

The system provides an option to match lines by keyword patterns to parse multiple lines of raw CLI text for the specified pattern by following the rules:

Return all matched lines between the start/end line of simple variable group or sub-paragraphs of paragraph group.

Allow simple line patterns, including ^ and $.

The system provides a specific regex pattern using regular expression (regex for short). Starting with a specific keyword: regex or mregex, the regex pattern declares all the required variables (separated by a comma) in a pair of square brackets, followed by a colon (:) and regex that can parse text lines. Each pair of parentheses in a regex represents a capturing group to group listed characters to form a sub-pattern. Their matched values will be assigned to each variable defined inside the pair of square brackets by sequence. The following two types of regex patterns define a visual parser:

TABLE 4

Example types of patterns.

| Pattern | Description | Format | Sample of Raw Test | Sample of Regex |
|---|---|---|---|---|
| Regex for a Single Line | A regular expression to parse strings in one line. | regex[$type1:var1, $type2:var2]:regex expression | 3.255.255.12 em2.0<br>2.2.2.2:0 12<br>192.168.1.1 em1.0<br>2.2.2.2:0 12<br>172.16.8.12 em3.0<br>2.2.2.2:0 12 | regex[$nbr_addr,$intf.$label_space_id.$inthold_time]:^(\d+\.\d+\.\d+\.\d+)\s+(\S+)\s+(\S+)\s+(\d+) |
| Regex for Multiple Lines | A regular expression to parse strings crossing lines. | mregex[$var1]:regex expression | Multicast reserved groups joined:<br>224.0.0.1<br>224.0.0.2<br>224.0.0.13<br>224.0.0.22<br>Directed broadcast forwarding is disabled | mregex[$multicast]:Multicast reserved groups joined: (.*?)Directed |

When there is no keyword before and after a target variable in one line of raw text, that is, the variable is the only string in that line, you can use the character ^ to represent the start of a line and use the character $ to represent the end of a line when defining the line pattern.

In some embodiments, a special character can be used for an exact match or a special character to avoid a mismatch. Setting a start line, end line, or both helps narrow down the range of text lines to apply a parser and get more accurate results. The matching scope includes the full-text range when there is no start/end line configured in a parser. There is an option to select either of the following ways to add a start line or end line: directly selecting a line or using the line of a selected variable.

Text replacement may be a flexible way to automate text pre-processing before it can be parsed as expected. When you want to search and replace any string in the raw text, you can define a text replacement. Text replacement can be defined on multiple levels. At a global level, there is a search and replace for a string in the whole range of sample text. At a parser level, there is a search and replace a string in the given range of text that a specific parser's definition has matched. When defining a text replacement, there is an option to add multiple replacements rules. Each rule may include a Find What or a Replace With. The Find What is the text you are searching for in the given range. It may include:

Match Whole Word—once enabled, searches will only match if the result is a whole word, e.g., a search for FastEthernet will not return FastEthernet1/2.

Match Case—once enabled, search terms are case-sensitive, e.g., a search for ethernet will not return Ethernet.

Regular expression—once enabled, search terms will use the regular expression engine to find complex patterns in the text; otherwise, search terms will be interpreted literally.

The Replace With the text that will replace what is matched. It may include Replace All Matches to replace all matches in the text scope, or Replace First Only, which replaces the first match only.

Text replacement may include the following use cases:

- Form a Table Header Line—When a device command output looks very similar to a standard table format but only misses a table header line, you can define text replacement to replace the line of text ahead of the table data with a customized table header line. This twist allows you to continue to define a table parser to parse the table data.
- Fill Up Table Headers—When one or more table headers are missing in the sample text, using a table parser directly will lose the data of those columns.
- Rename Duplicate Table Header—When there are two table headers with a duplicate name, the latter one cannot be parsed. The workaround is to rename table headers so that each header can have a unique name, which can be done by replacing the line of table headers with a new one.
- Adjust table column width—Sometimes, the table headers are not aligned with data cells and cannot be parsed by a table parser. For example, the alignment gap between table headers and cells causes an incorrect parsed result.
- Translate Interface Name—Sometimes, interface names in the raw text are irregular and cannot be further used before manual processing.

A text parser is used when you only want to use a portion of the configuration file or CLI command outputs to validate network design and check changes. Take the parsing of the configuration file as an example. You can define a text parser to parse the configuration file: 1) Retrieve sample text of configurations; 2) Select a parser type by clicking Add Text to add a variable Text1; 3) Select lines of text in the Sample area, and click the arrow ( ) to duplicate it as the content to match Text1; and 4) Preview the parsed result of sample text, and then click OK to save the text parser. Multiple paragraphs of lines can be selected in the Sample area and assembled in one text variable. Users can also add multiple text variables in one text parser to parse different paragraphs of lines.

The system adopts an exact match to compare the selected lines of text when applying a text parser, following these rules:

- Text lines are order-sensitive for line-by-line matching, regardless of whether a line is consecutive with others.
- When a few text lines can match but others cannot, only the matching lines are added to the parsed result.
- When there are multiple matches for one line, the first matching line will be adopted and added to the parsed result.

A simple variable parser is used to parse a single-value variable (such as version number, etc.) by anchoring keywords before and after the variable. Each Variable Line Pattern in a keyword parser can parse a variable within the full-text range or parse multiple variables in one text line.

A variable can be defined visually by highlighting the text inside the variable group, and a Line pattern will automatically be created for this variable. The rules to fill the keywords before and after this variable are:

- Search forward or backward from the highlighted text. When space is encountered, find the first word before or after the space. Taking the definition of $version as an example, the string where the variable is highlighted contains other characters. The keyword before the variable is "Software," and the keyword is "Version."
- If the first matched word is a helping verb (for example, was and are), a simple preposition (for example, on, of, with, at, under, for, and in), or a punctuation mark (:), the system continues to find another keyword and combine these two words.
- If the highlighted text is the beginning of the current line, the line pattern will start with "^". If the highlighted text is the end of the current line, the line pattern will end with "$".

The variable type will be auto-created according to the context of the highlighted text. The variable name is created by the following rules:

- If there is a keyword before the highlighted variable, it is the variable name (converted to all lowercase). Otherwise (at the beginning of the line, or the keyword does not meet the variable naming rules), follow rule 2.
- If there is a keyword after the highlighted variable, it is the variable name (converted to all lowercase). Otherwise (at the end of the line or the keyword does not meet the variable naming rules), follow rule 3.
- Define the variable name to be $var1-N.
- When two or more texts are highlighted, they are regarded as one variable. The variable's value is all content (including spaces) between the keywords before and after the highlighted texts. The corresponding variable type is $mstring. In the example below, the variable is defined as $mstring:uptime.

A paragraph parser is used to extract the essential data in recurring text lines and place it into a tabular shape. A paragraph parser can convert variables across multiple sections of the raw text into a table data structure, so diagnosis against each row can be exacted. Using the parsing of interface information as an example, a paragraph parser to parse interface information can be defined by:

1. Retrieve sample text, for example:

ID Line FastEthernet0/0 is up, line protocol is up

Variable Line Full-duplex, 100 Mb/s, 1000BaseTX/FX

. . .

Variable Line 0 input errors, 0 CRC, 0 frame, 0 overrun, 0 ignored

. . .

2. Select a parser type by clicking Add Paragraph, and click on the input box of the target ID Line.
3. Define ID Line Pattern: anchor the paragraph identifier to identify recurring paragraphs.
    1) Select an interface line of text in the Sample area, and click the arrow (⇨) to duplicate it as an ID Line A.
    2) Define a string-type variable by replacing FastEthernet0/0 with $intf.
    3) Define a multi-string variable by replacing up with $mstring:phy_state.
    4) Define a multi-string variable by replacing up with $mstring:link_state.
4. Define Variable Line Pattern: parsing variables inside each recurring Paragraph and sub-paragraph that has been identified by ID Line Pattern.
    1) Select Full-duplex, 100 Mb/s, 100BaseTX/FX in the Sample area and click the arrow (⇨) to duplicate it as Variable Line 1.
    2) In the Variable Line 1 field, replace Full-duplex, 100 Mb/s, 100BaseTX/FX with $duplex(Full-duplex|Auto-duplex), $speed(100 Mb/s|Auto-speed).

3) Select 0 input errors, 0 CRC, 0 frame, 0 overrun, 0 ignored in the Sample area, and click the arrow (⇨) to duplicate it as Variable Line 2.

4) In the Variable Line 2 field, replace 0 input errors, 0 CRC, 0 frame, 0 overrun, 0 ignored with $input_errors input errors, $crc CRC, $frame frame, $overunn overrun, $ignored ignored.

5. Preview the parsed result of sample text, and then click OK to save the paragraph parser.

Parent Line is an optional line pattern that can be added in a paragraph parser to parse parent instance variables for paragraphs that have been identified by ID Line Pattern. Inside each Paragraph, the system looks for text lines that can match the defined parent line pattern, upward from the line of ID Line A. If there are variables defined in the parent line pattern, the system parses and uses them as table columns. For example, the output of the show OSPF neighbor detail command from a Cisco XR device has nested paragraphs for OSPF neighbors belonging to each OSPF process, and the process ID is a key variable that needs to be parsed. To support such cases, set a parent line as follows: 1) In the Variable Definition area, click Add Parent Line; 2) Select the target line of text in the Sample area, and click the arrow to duplicate it in the Parent Line field; and 3) Define the variable of OSPF process ID by replacing OSPF1 with $process_id.

A table parser is used to parse table-formatted text, such as NDP table, VRF table, OSPF neighbors, etc. With a table parser, users can address the line of table headers in the raw text and then leverage the column separator to adjust the table's column width manually. Using the parsing of the VRF table as an example, a table parser to parse the VRF table can include:

Retrieve sample text.

Select a parser type by clicking Add Table.

Select the table header line in the Sample area, and click the arrow ( ) to duplicate the text in the Table Header Line and Column Separator field. Users can also click Set as Table Header in the drop-down after selecting the table header line in the Sample area.

In the Column Separator field, add a semicolon (;) to separate every two column names.

In the Table Column Variables area, select variables required to parse, rename them and select their types.

Preview the parsed result of sample text, and click OK to save the table parser.

Also, the system provides more advanced settings to enable the parsing of a wider range of table-formatted text. You can select the table text to appear left-aligned or right-aligned with the column separators in the sample text. By default, left-aligned is selected. When there are extra lines between the line of the table header and the lines of table rows, for example, the table header in the command output of show ip pim neighbor is wrapped and occupies two lines. You can select to skip 1 line from the table header line in the Advanced Settings so that the unwanted lines will not be parsed. By default, the parsing process of a table parser stops when there is a blank line ("^" or "$" is used as the identifier) in the text. Suppose a blank line is intended to be in the text by design. In that case, you can redefine the identifier. For example, set it as "Total number of prefixes" as follows so that the parsing process will not stop until the line that includes "Total number of prefixes". Sometimes, suppose a value of a table cell appears recurring in the same column of consecutive rows. The value will only be displayed in the first row and omitted in other rows until the value changes. Sometimes the raw text of table-formatted data may contain a line of separators inside a table, for example, a line of hyphens (-). To filter the line out, you can enable the Exclude Lines option in the Advanced Settings and enter the rules to exclude lines.

The Visual Parser is designed to be visible so that users can understand the relationship between the parser variable and the original data through the WYSIWYG (What You See is What You Get) and learn how to define a Parser quickly. Multiple parsers can be created from an original text. However, only one Parser can be expanded for edit or view at a time so that the relationship between the parser variable and the original data can be visually displayed. Each parser will have the Start Line and End Line properties, and these lines will be displayed in the original data by default.

The visual parser may be a reuse parser that can copy the parser from NI, which may be defined on one device, and apply it to other devices in one NI. This may be referred to as a copy parser.

Figure 10:
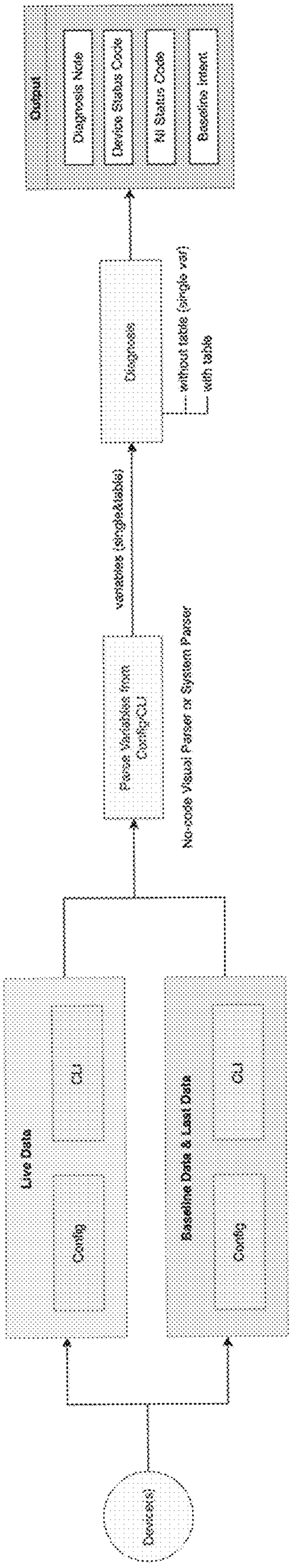
FIG. 10 illustrates an example of Network Intent (NI) components.

FIG. 10 illustrates an example of Network Intent (NI) components. The device accesses live data (Config/CLI), baseline data or last data. With the parser, variables are parsed for the diagnosis. The output can be a diagnosis note, a device status code, an NI status code, or a baseline intent, as discussed with respect to FIG. 8.

Figure 11:
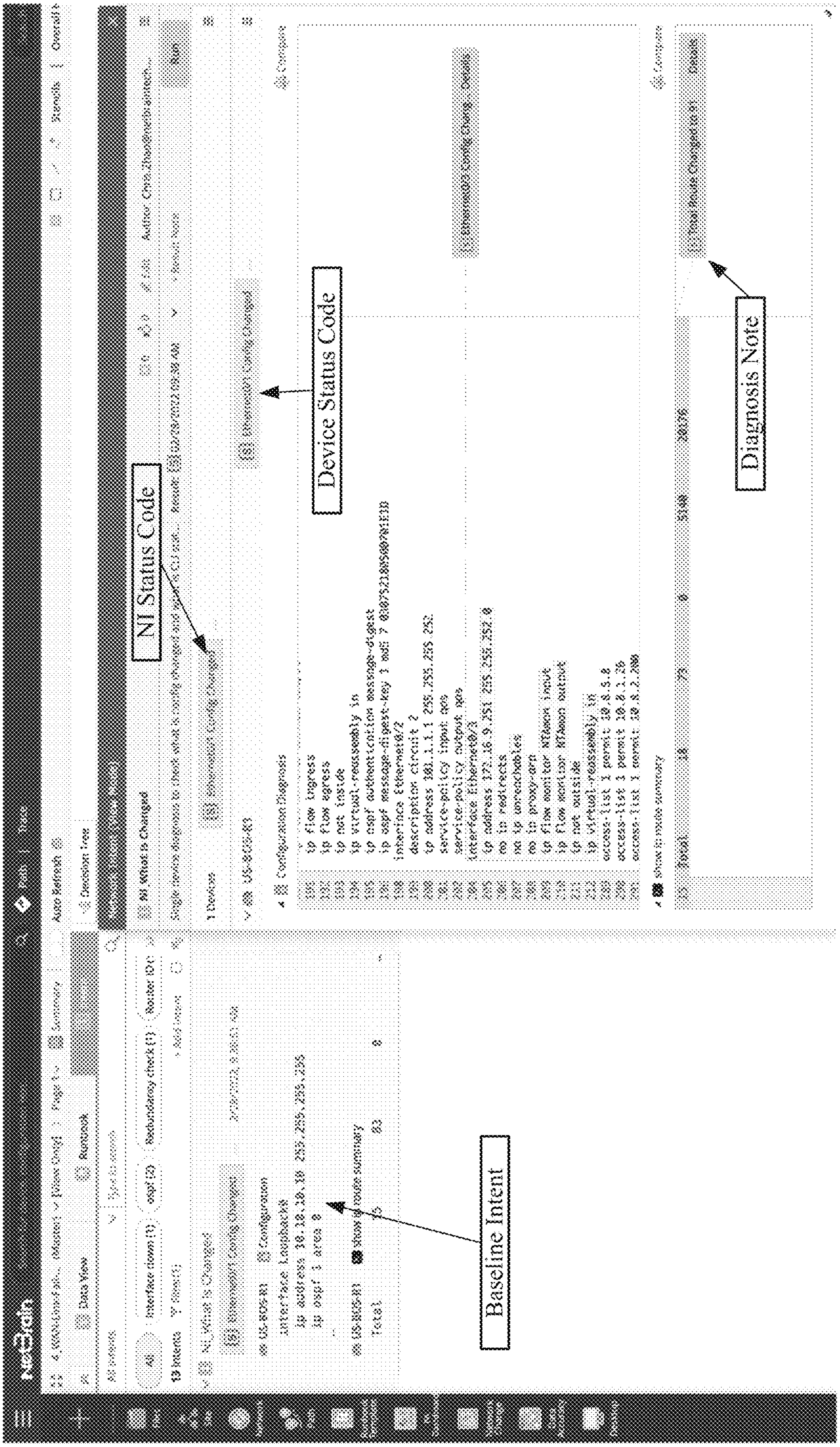
FIG. 11 illustrates a screenshot showing the NI components.

FIG. 11 illustrates a screenshot showing the NI components. The baseline intent is shown in an Intent panel. An example NI status code is shown along with a device status code. A diagnosis note displays diagnosis output.

Figure 12:
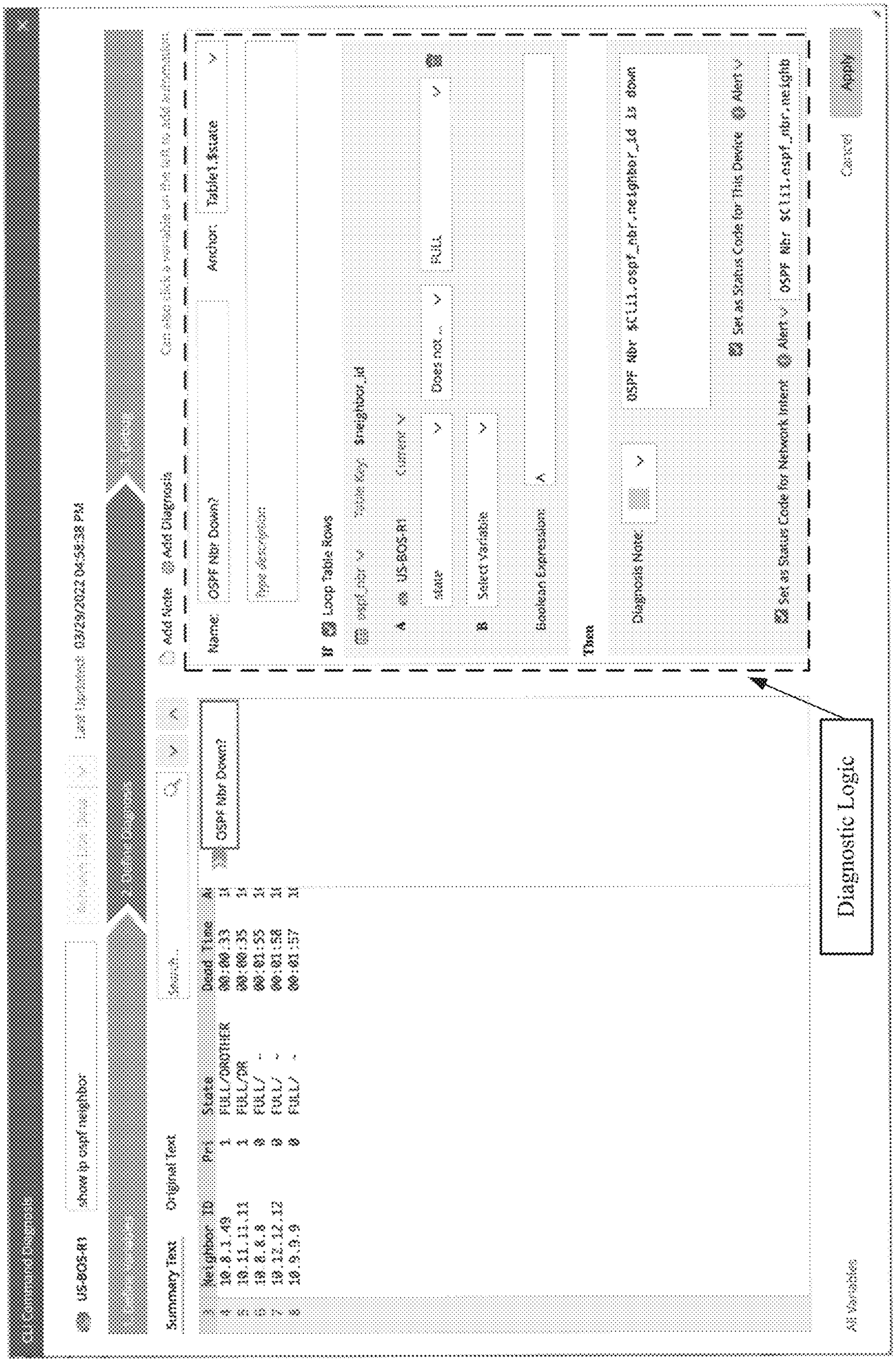
FIG. 12 illustrates diagnosis logic.

FIG. 12 illustrates diagnosis logic. A screenshot shows the sample diagnosis logic with flexible settings to support both simple and complex diagnosis logic and output. In this example, the device is shown with a sample diagnosis defined by a state comparison (in this case, the state is not FULL). There can be a Boolean expression and a "then" response statement.

Figure 13:
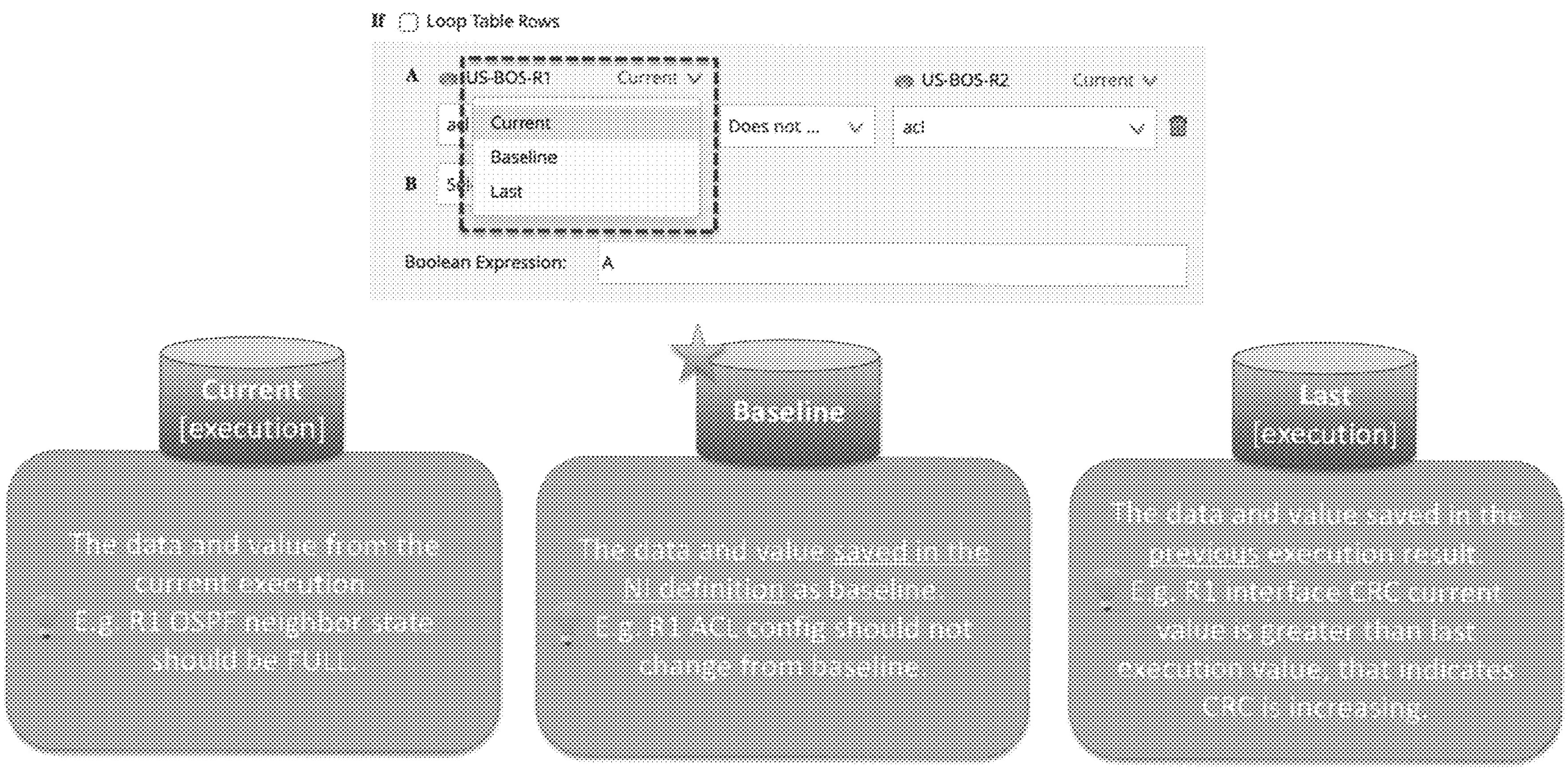
FIG. 13 illustrates the data types for the diagnosis logic.

FIG. 13 illustrates the data types for the diagnosis logic. There may be a current, baseline, and last execution data that is selected. The current execution data is the data and value from the current execution. The last execution data is the data and value from the previous execution result. The baseline is the data and value saved in the NI definition as the baseline. The baseline data is compared with the current execution data and/or compared to the change in the execution data between the last execution data and the current execution data.

Figure 14:
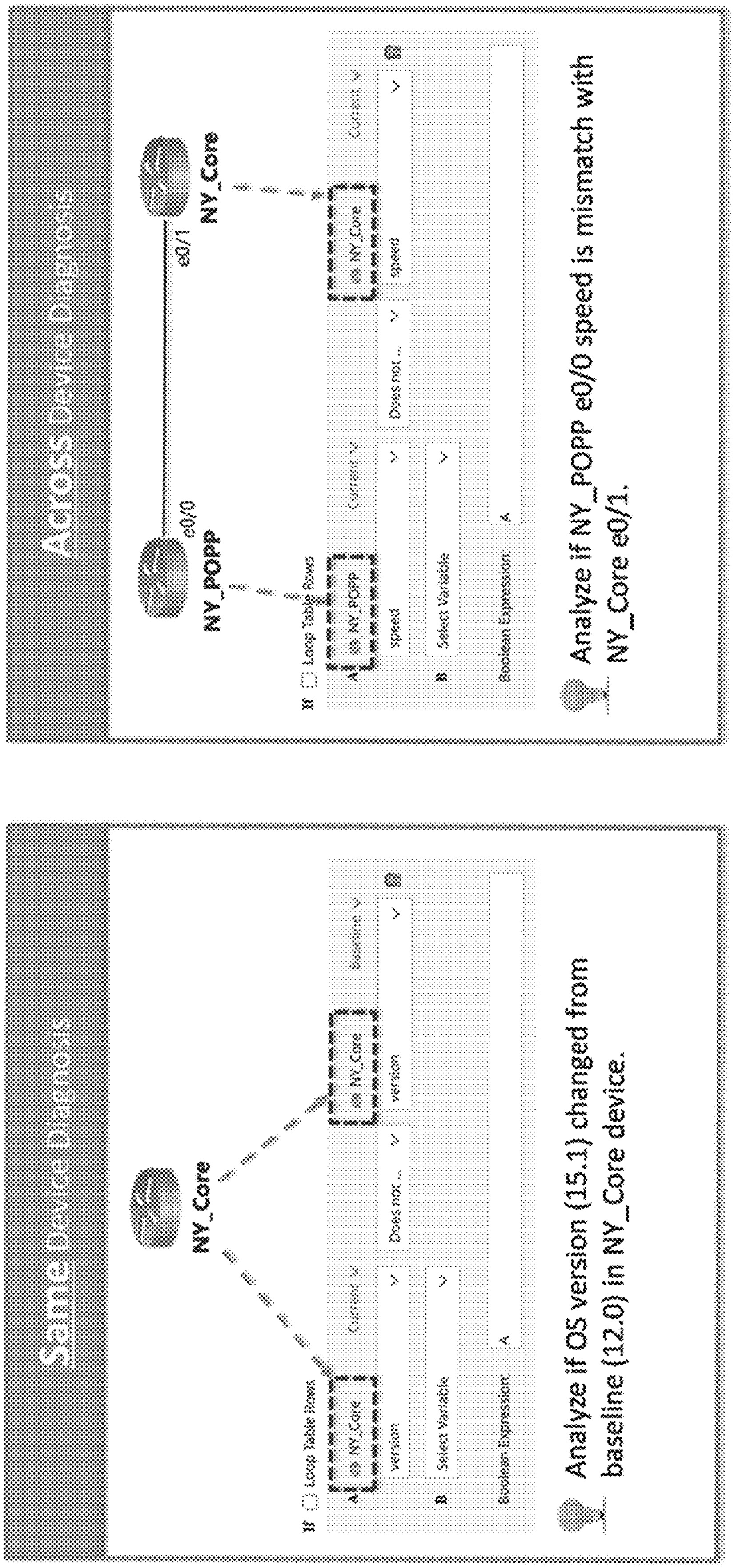
FIG. 14 illustrates diagnosis logic over the same device or across devices.

FIG. 14 illustrates diagnosis logic over the same device or across devices. The diagnosis logic may be applied to the same device for a diagnosis. Alternatively, the diagnosis may be applied across devices.

Figure 15:
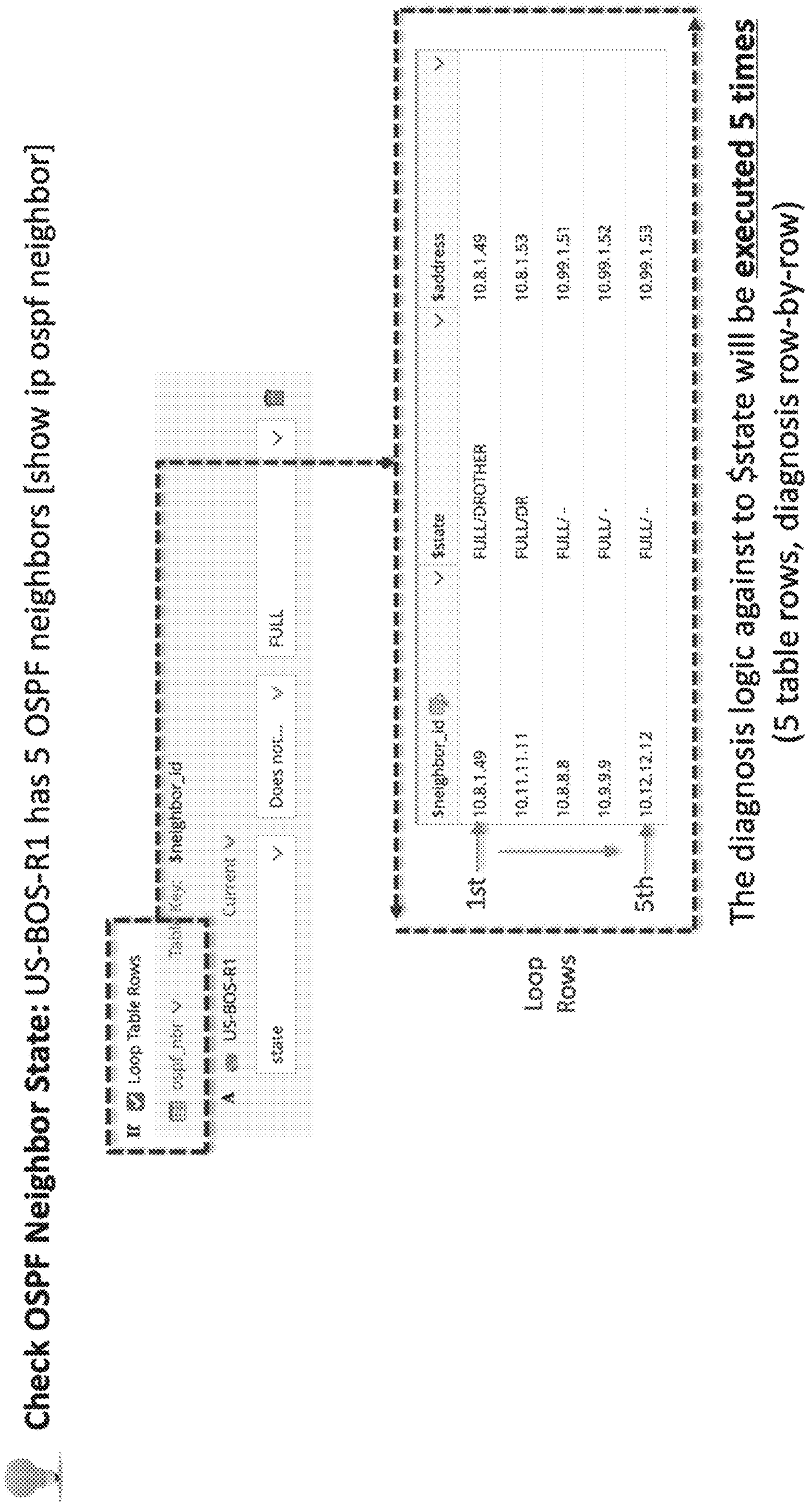
FIG. 15 illustrates a diagnosis logic example.

FIG. 15 illustrates a diagnosis logic example. The example includes a loop table of rows with data. In this example, the diagnosis logic is against the $state value and will be executed five times corresponding to the five table rows.

Figure 16:
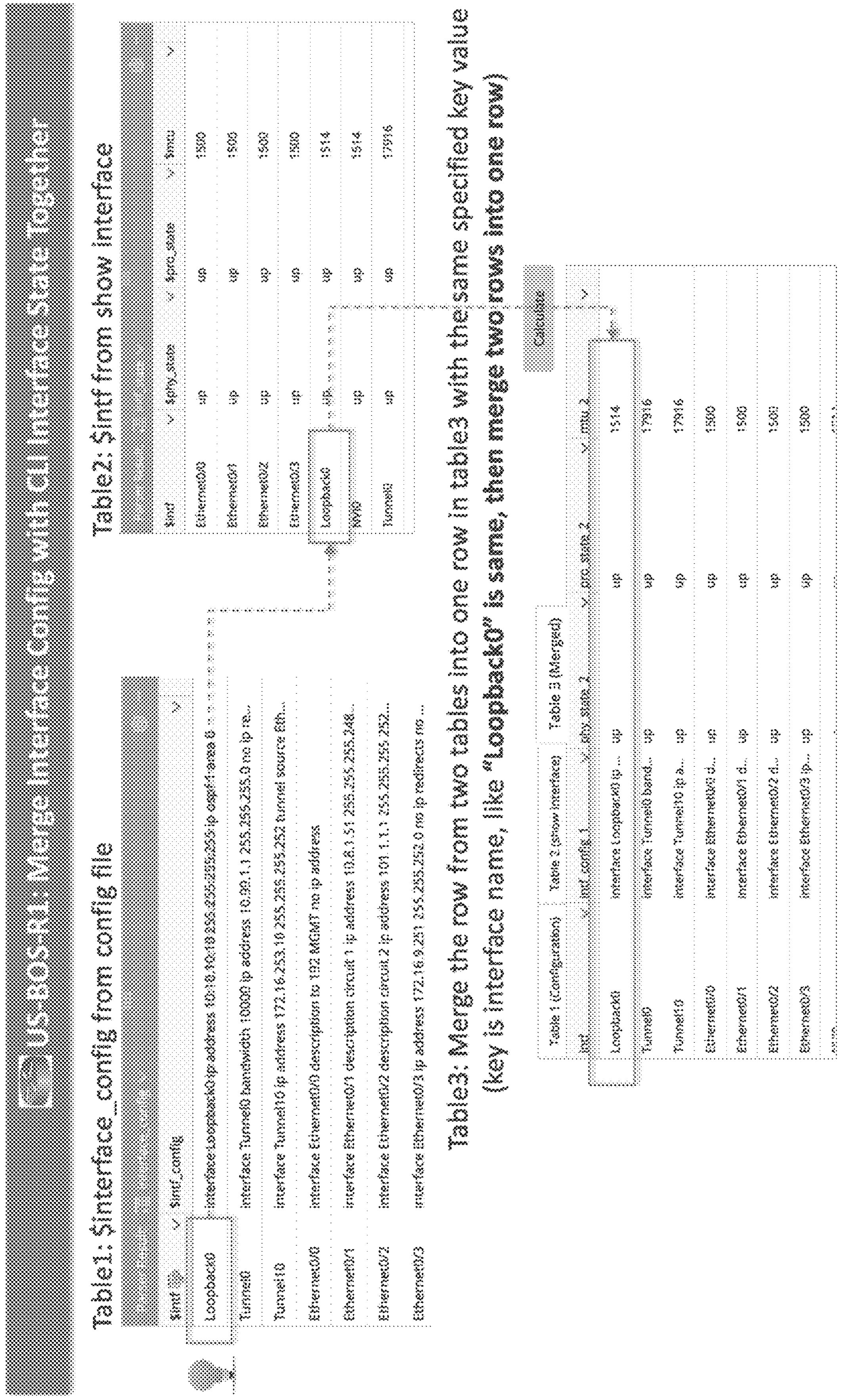
FIG. 16 illustrates a merge table for diagnosis.

FIG. 16 illustrates a merge table for diagnosis. The parser result in Table1 is shown with different states in the interface for Table2. In Table3, the row from the two tables is merged into one row in Table3 with the same specified key value. For example, the key is the interface name, like "Loopback0" is the same, then merge two rows into one row.

Figure 18:
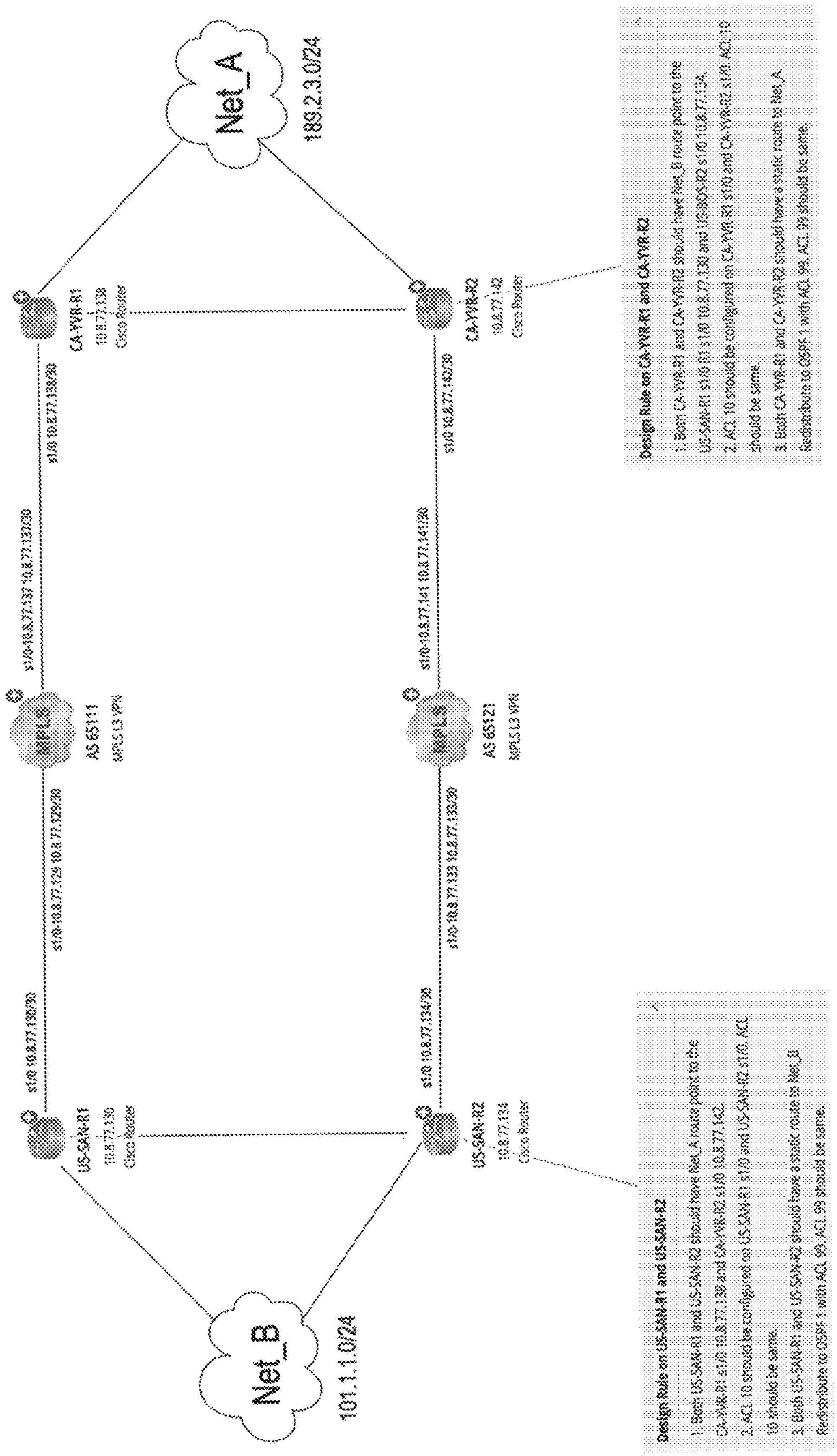
FIG. 18 illustrates an example NI map for enforcing design rules.

FIG. 17 illustrates an example of NI for enforcing design rules. Two network devices are shown with different components/features (e.g., IP route, Config), which each have a Variable, Diagnosis, and Output. The variable is the item or data monitored for any deviation from the diagnosis. For example, the top diagnosis for the $next hop variable is checking "if $next hop does not equal to 10.8.77.138." Based on the monitoring and the diagnosis, there is an Output, which in this example is changing the next-hop and enabling the NI status code. Some examples have multiple diagnoses listed. The diagnosis can be a condition or comparison with measurements or monitoring of the variables. In some examples, there may be baseline measurements that are part of the comparison. FIG. 18 is a related example to FIG. 17, and shows the two devices from FIG. 17, along with a map using NI to enforce design rules.

FIG. 18 illustrates an example NI map for enforcing design rules. The devices US-SAN-R1 and US-SAN-R2 from FIG. 17 are shown in FIG. 18. The example design rules include:

US-SAN-R1 and US-SAN-R2 should have Net_A route point to the CA-YVR-R1 s1/0 10.8.77.138 and CA-YVR-R2 s1/10 10.8.77.142.

ACL 10 is configured on US-SAN-R1 s1/0 and US-SAN-R2 s1//0.

ACL 10 is the same.

Both US-SAN-R1 and US-SAN-R2 should have a static route to Net_B and there is a redistribution to OSPF1 with ACL 99, which should be the same.

In this example, NI can be used to enforce these design rules.

Figure 19:
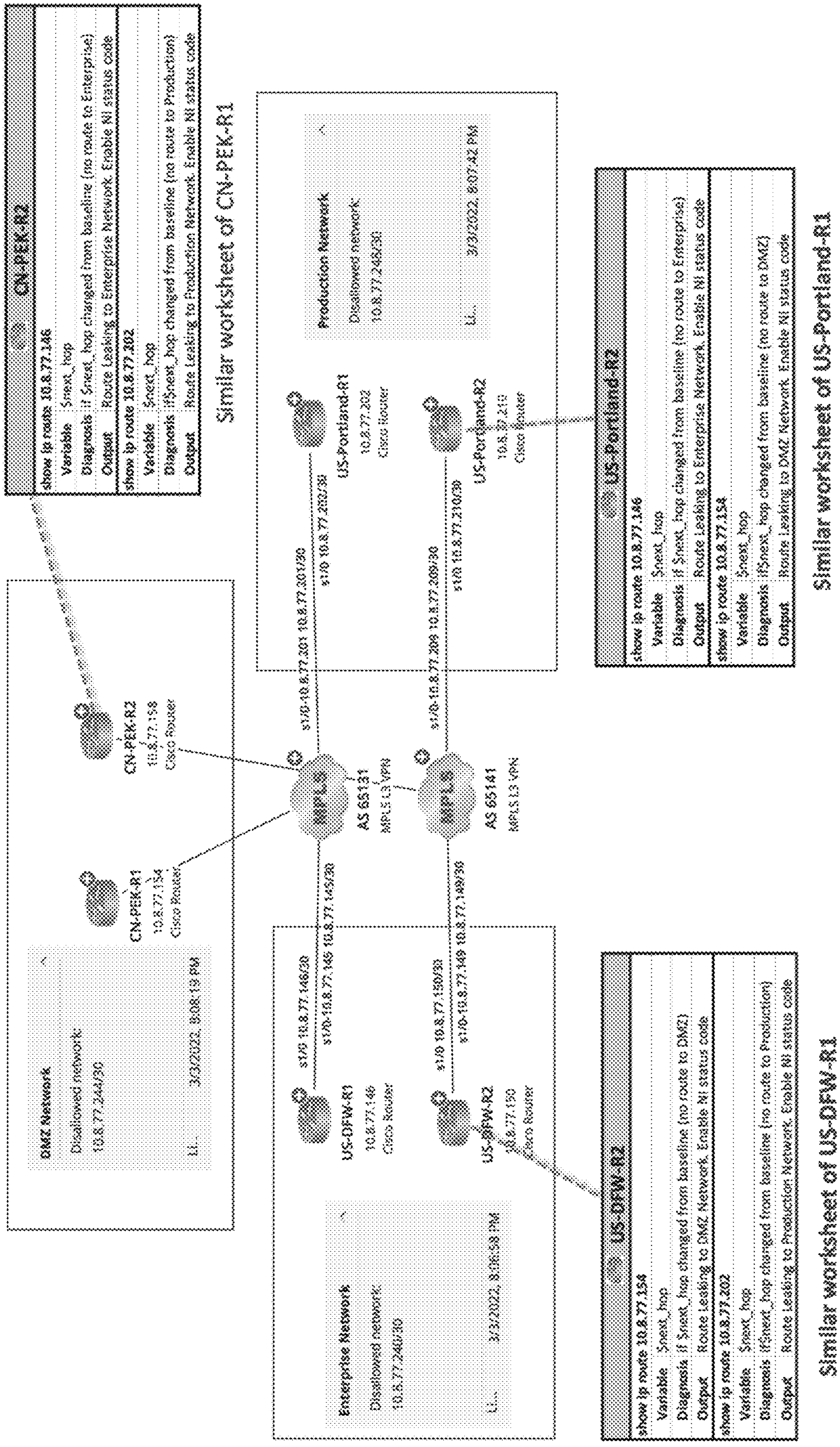
FIG. 19 illustrates using NI for enforcing security rules.

FIG. 19 illustrates using NI for enforcing security rules. This automation logic can be replicated to all networks by network intent clusters without specific code. This example shows the NI for three devices (CN-PEK-R2, US-DFW-R2, US-Portland-R2). Each of these devices may replicate the corresponding devices (CN-PEK-R1, US-DFW-R1, US-Portland-R1).

Figure 20:
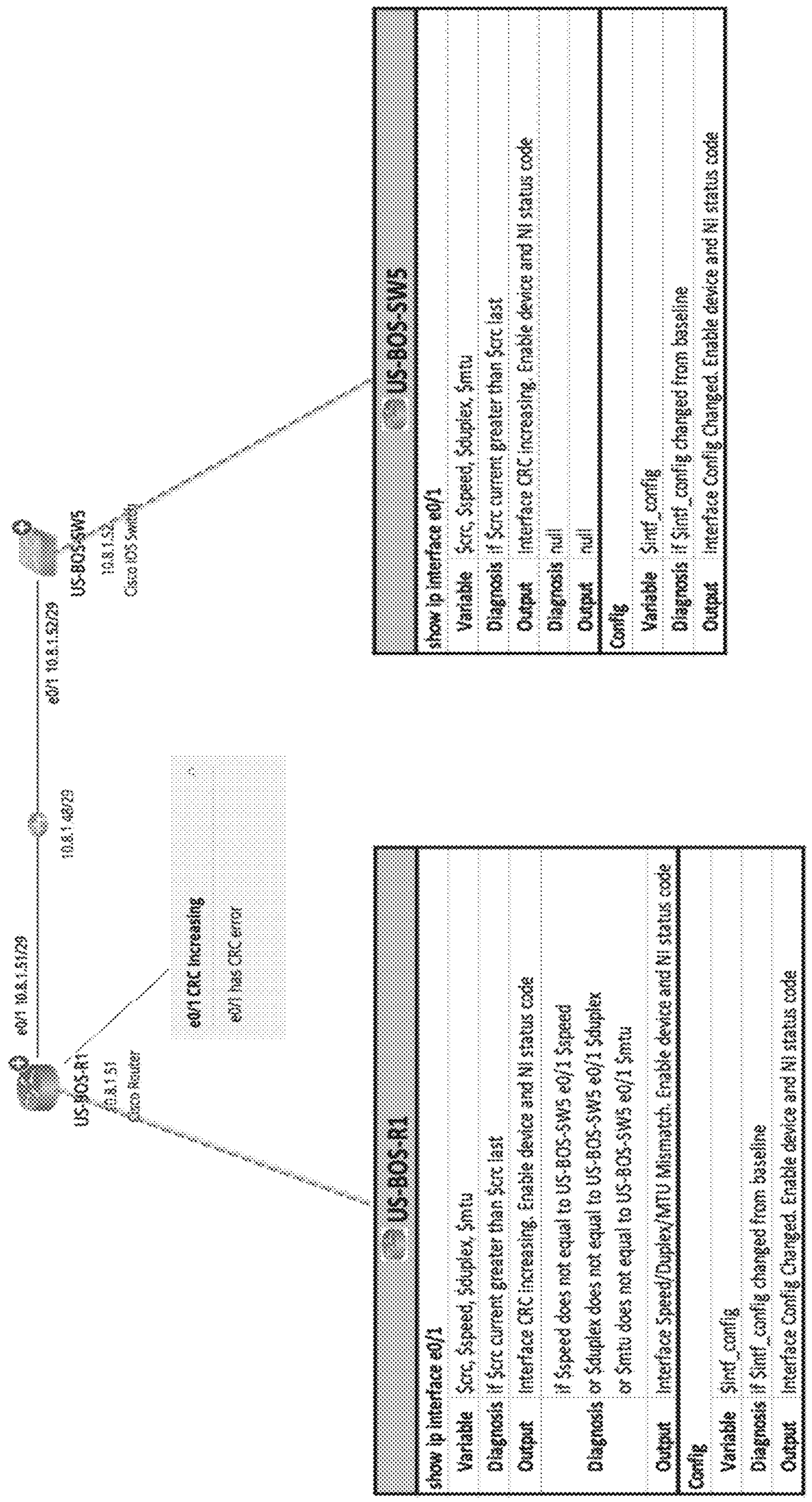
FIG. 20 illustrates using NI to troubleshoot repetitive problems.

FIG. 20 illustrates using NI to troubleshoot repetitive problems. There may be an interface error that is checked. In this example, a determination is made for a device whether CRC is increasing (e.g., diagnosis: "if $crc current greater than $crc last"). When the comparison for this diagnosis is true, the output includes Interface CRC increasing and enabling device and NI status code.

Figure 21:
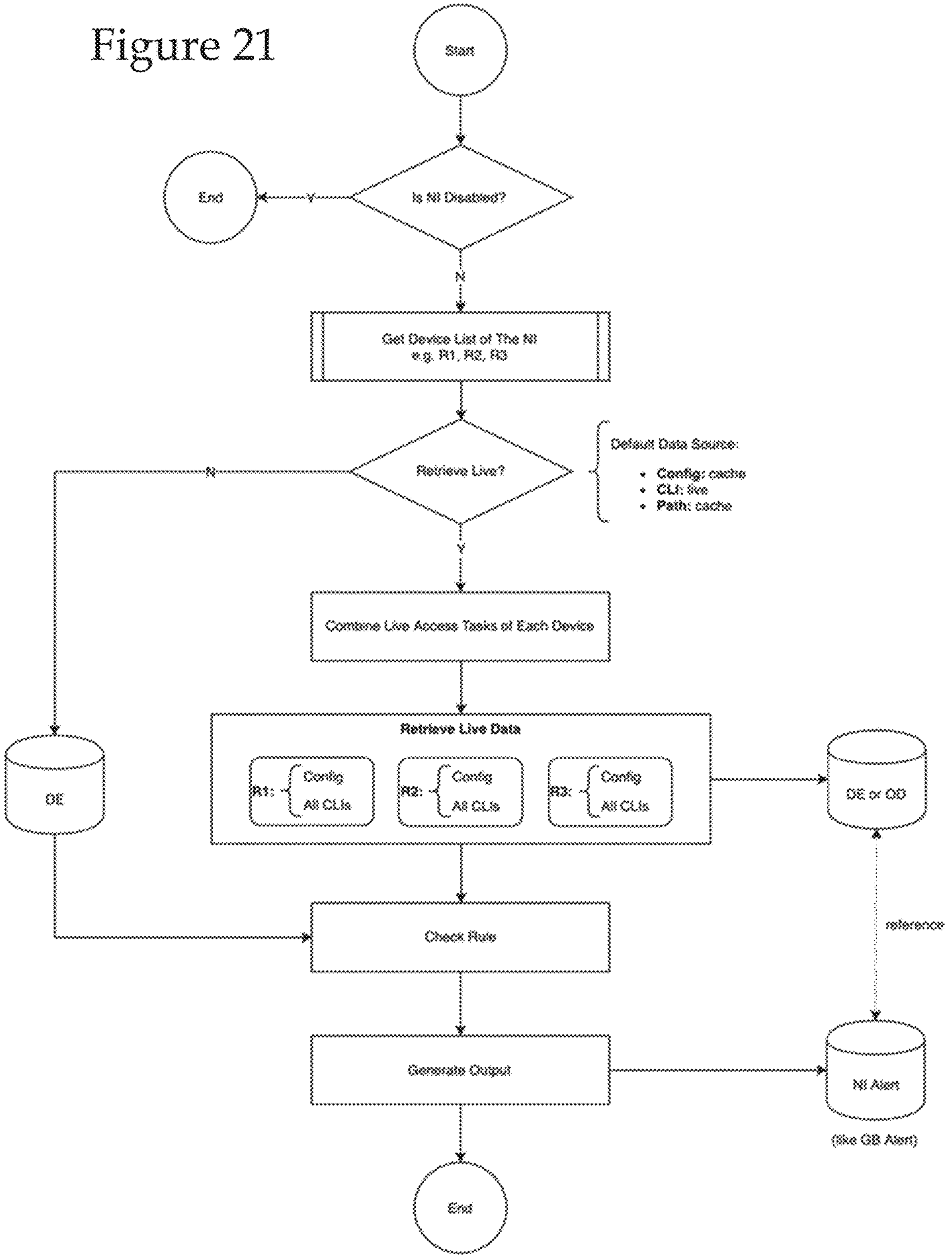
FIG. 21 is a flow chart for the execution of Network Intent (NI).

FIG. 21 is a flow chart for the execution of Network Intent (NI). As an automation object, an NI can be run directly from a map, as a runbook node, or automatically triggered to run in the backend as part of the adaptive monitoring process. At the time of execution:

Retrieve the live data for the pre-defined configuration file and CLI command.

Update the Configlet and CLI commands based on the live data.

Update the variables based on the live data.

Re-evaluate the diagnosis logic and update the diagnosis note and status code.

When users open a map, they can browse all Network Intents related to this map's devices in the NI pane. Open an NI to view the design and diagnosis note, and run this NI to verify the current intent status:

Open a map, and the related NIs are displayed.

Click an NI name and click Run Live.

In the NI result window, review the execution time, the alerts, if any, and the variables displayed.

In Debug mode, the NI creator can run an NI step by step and check each step's input and output value. The system executes NI in four levels:

Device (level 1)

Section (level 2)

Diagnosis (level 3)

Condition Detail (level 4).

Figure 22:
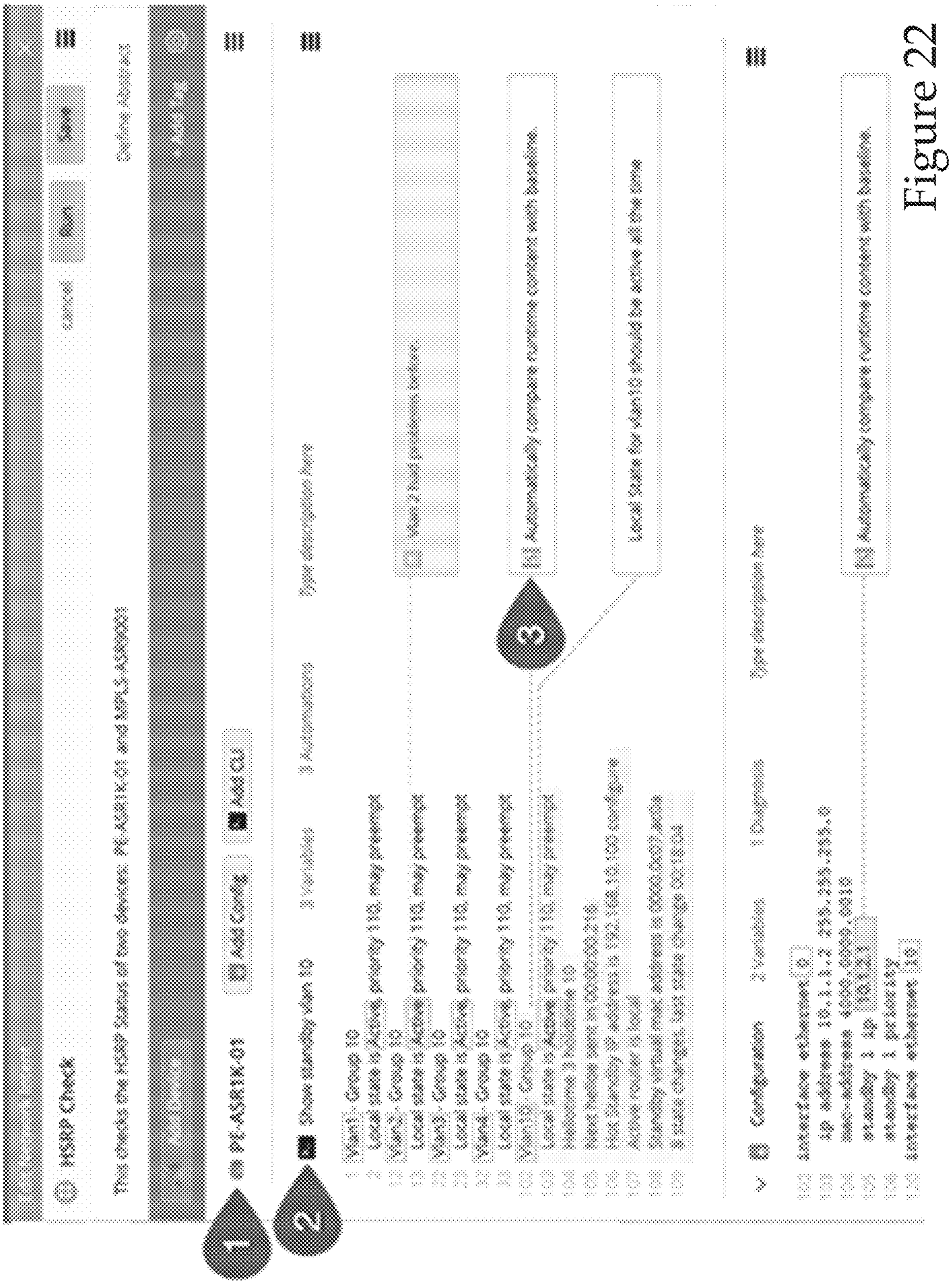
FIG. 22 illustrates levels of NI.
Figure 23:
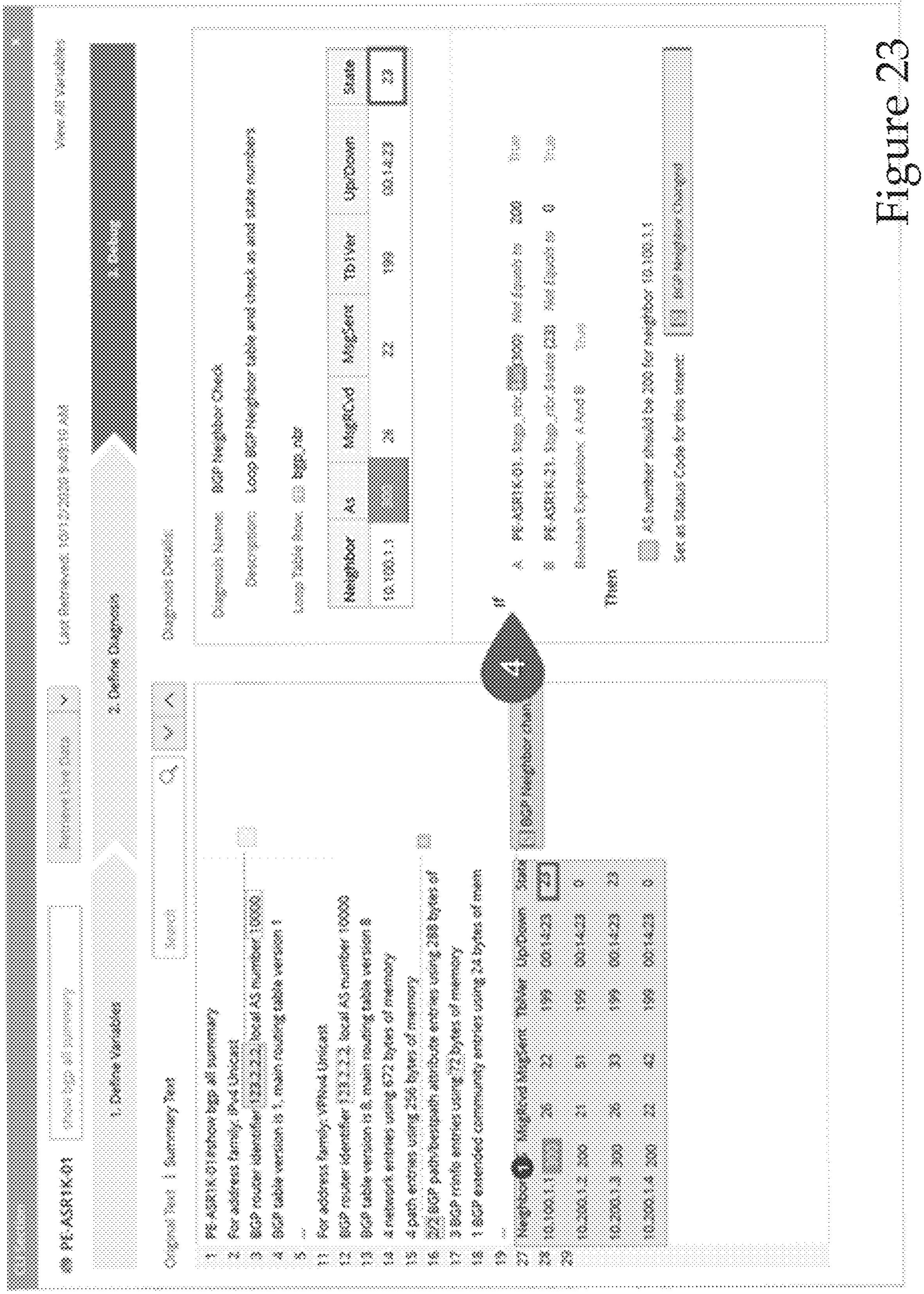
FIG. 23 illustrates other levels of NI.

FIG. 22 illustrates levels of NI, and FIG. 23 illustrates other levels of NI. Specifically, FIG. 22 illustrates levels 1-3, while FIG. 23 illustrates level 4. The process may include: 1) Open a map, and the related NIs are displayed; 2) Click an NI name to open an NI; 3) Click Edit and select Debug by clicking the corresponding icon; 4) Click Start. The default data source is live data, and you can also select other data sources from the drop-down list; 5) Use Debug control pane to view details step by step. The debug may provide Previous: go to the previous node.

Next: go to the next node.

Step Into: go to the node in the lower level.

Step Over: go to the next node at the same level.

Step Out: go to the next node at a higher level.

Stop: stop the debug mode.

The process further includes: 6) Click Step Into to view the details. For the table/paragraph variable, each row of data is displayed in the Diagnosis Detail pane. Like other automation objects such as Qapps, NI can be scheduled to run at the backend. NI may also be triggered to run by Flash Probe and a 3rd-party system.

When triggered by a flash probe, the NI can be installed as triggered automation of the flash probe as part of Adaptive Monitoring Automation, which is a backend process to monitor the whole network's status periodically. When a flash alert occurs, the system will further execute NIs. The triggered NI results can be viewed with the flash probe via the Preventive Automation Dashboard. When an alert occurs on the flash probe, you can trigger the NI to execute automatically. An NI can be installed to a flash probe.

In another embodiment, a third-party system can trigger network management Runbook Template execution, including an NI node. For example, a ticket is created since a BGP neighbor of a core device is flapping, which triggers an API call to the NetBrain system, and the device name and BGP are sent to the network management as a keyword. A Runbook can filter NIs related to this device and BGP and execute these NIs.

Figure 24:
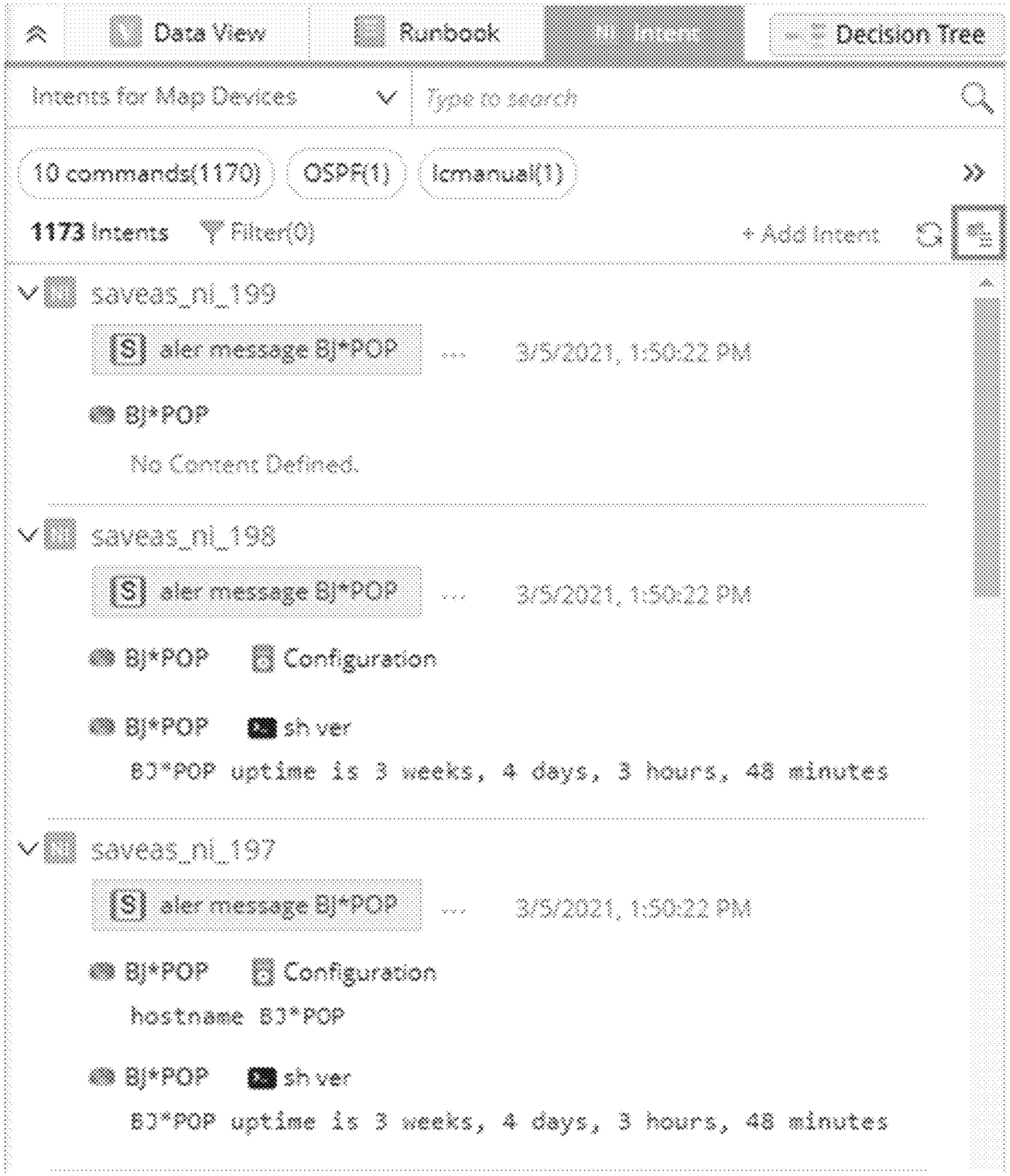
FIG. 24 illustrates a screenshot for managing NI.

FIG. 24 illustrates a screenshot for managing NI. A user can browse and manage all NI through a Folder View in the NI pane on the left side of the Map, including essential addition, deletion, modification, check operations, and the Folder NI context menu. First, open a map and navigate to the Intent pane. By default, all the network intents are displayed in ListView. Second, click the switch icon to view the network intent in Folder View.

Figure 25:
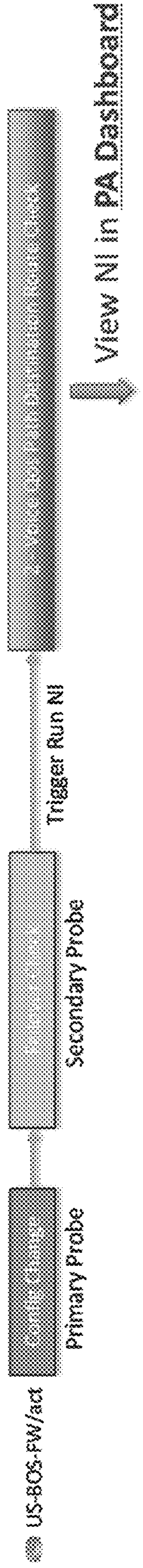
FIG. 25 illustrates a flow for NI.

FIG. 25 illustrates a flow for NI. The flow may be for the viewing and auto-running of NI in preventative automation. A primary probe provides a configuration change, while a second probe is a failover check. This can trigger the running of NI, which can include various operations.

Figure 26:
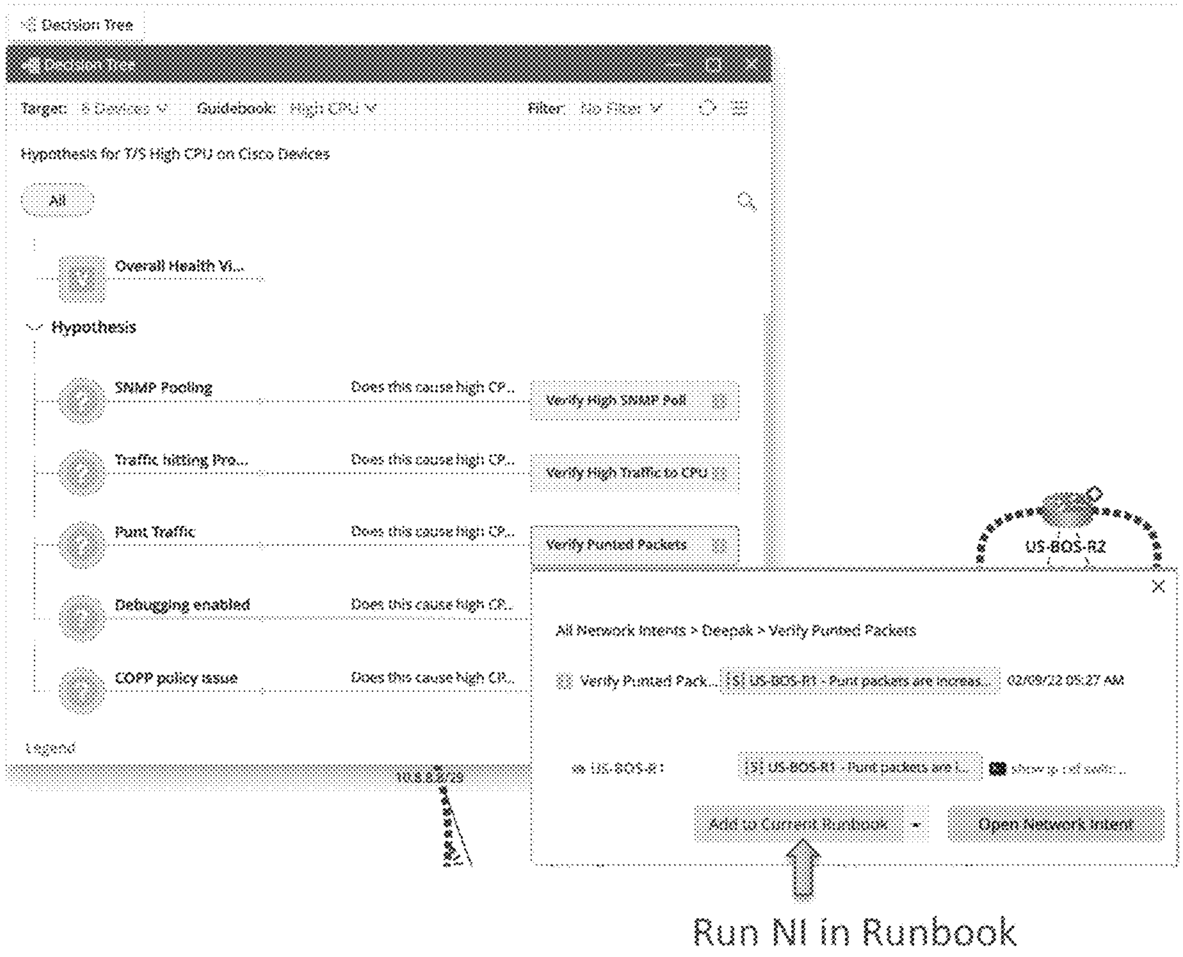
FIG. 26 illustrates viewing and running NI from a guidebook or runbook.

Referring back to FIG. 8, the NI can be viewed and run from an intent pane (e.g., clicking run). In other embodiments, the NI can be viewed and run from a guidebook or runbook, as shown in FIG. 26. In some embodiments, a guidebook and a runbook may be the same.

Feature Intent Definition (FID)

FID may also be referred to as Network Intent Cluster (NIC). FID and NIC may be used interchangeably throughout. A large network can have millions of NIs, and it may be time-consuming to add these NIs manually. The FID or NIC system can discover and create these NIs automatically based on a template file. A Feature Intent Template (FIT) may declare the network management resources that can be created and run based on device feature match. The template's main contents may be stored as a text file whose format complies with the YAML standard. Using the config line pattern, various network technologies can be decoded from device configuration files, exactly match the device you are interested in, and further store the key parameters in the line pattern for further use. It will significantly help you identify the devices running certain network technologies (BGP, QOS, Multicasting, etc.) across the entire network. Further, it creates the related NIs and defines the running methods (schedule run or triggered by flash probes).

Network Intent is device-based automation for end-users to define and use. It can be defined with deep automation analysis logic applicable to any scenario. To scale to other devices with similar intents, engineers build the intent-based automation device-by-device and intent-by-intent. It may be time-consuming to build intent-based automation for a large network with complex technologies. A Feature Intent Template or NIC template may be used for automation and may include:

- Decode network features using line patterns for accurate device feature match.
- Scale intent-based automation to the entire network with the device matched.
- Maintaining the intent by executing periodically.

The Feature Intent Template (FIT), defined inside YAML-Format Feature Intent Definition File (FID file), is a set of automation technology to define NetBrain automation across the entire network. Using the config line pattern, you can decode various network technologies from device configuration files, exactly match the device you are interested in, and store the key parameters in the line pattern for further use. It will significantly help you identify the devices running certain network technologies (BGP, QOS, Multicasting, etc.) across your entire network, create the related automation resources in the system (Network Intent for BGP design, Flash Probe for BGP flapping check, etc.), and further define the execution methods (triggered run by the system or interactively run by users). In one embodiment, the purpose of the feature intent template is to decode network features and build/install automation across the entire network to support the reference workflow.

The Feature Intent Template (FIT) definition includes two parts:

- Feature Intent Definition: defining how a device config should be matched with the line patterns. Devices, along with their configs and GDRs, will be evaluated by the feature intent definition.
- Automation Definition: defining what automation assets need to be created/installed based on the matched feature intent, such as network intent, flash probe, and triggered automation.

After FIT is executed against a set of network devices, the devices matching the network feature specified within FIT will be filtered, and a set of automation assets will be created accordingly.

Network Troubleshooting may require a deep understanding of different network technologies configured on each device, such as HSRP, QoS, or BGP. The knowledge and automation needed for further troubleshooting differ based on network features. Automating the automation assets required for troubleshooting is to understand network features. The line pattern concept to find the matched devices for a specific feature from the device configuration files. One simple example is to find whether the BGP routing protocol is configured on a Cisco IOS device by searching for config lines in one example. Each line may include two types of data, the network keyword, which does not change, and variables. If we take the first line as an example, "router" and "bgp" are network keywords, while "2" is a variable. As different routers may configure different routing processes, we need to combine the keyword with the variable to determine whether BGP is configured for a device. By combining keywords and variables into a single line, we have created a unique line pattern that serves as the feature decode unit. In NetBrain's implementation, the variable is represented by $<variable type>:<variable name>.

The configuration for a specific network technology differs in various embodiments. To use the line pattern to find the match for the specific feature while matching the configuration file line as much as possible, you can use the needed line (which may also be referred to as a must-have line in some embodiments) and optional line concept to tag your line pattern. Let's take the following configuration file snippet as an example:

```
interface GigabitEthernet0/21
description HSRP-GROUP
no switchport
ip address 192.168.2.1 255.255.255.0 secondary
ip address 192.168.1.1 255.255.255.0
standby 1 ip 192.168.1.100
standby 1 priority 150
```

To find the device with the HSRP configured and match the configlet as much as possible, we can define the following lines as needed lines:

```
interface GigabitEthernet0/21
ip address 192.168.1.1 255.255.255.0
standby 1 ip 192.168.1.100
```

The needed lines are the key line patterns that identify whether the device indeed has the HSRP configured. At the same time, you may or may not have the priority field configured by the standby group, so in this case, you'll need to make the following line an optional line: standby 1 priority 150.

To specify whether a line is a needed line or an optional line, you can use the M or O as a flap ahead of the line patterns. Putting them together, you'll have the following line pattern you can use to match devices.

```
M: interface $str:intf
M: ip address $ip:ip_address $ip:ip_mask
M: standby $int:standby_group ip $ip:standby_ip
O: standby $int:standby_group2 priority $int:standby_value
```

Devices that include all the needed lines sequentially will be recognized as a match, so using the optional line here can help you match devices with or without priority defined for the standby group. If you need to match devices with priority explicitly defined, you can make the last line a needed line. Since the default behavior of the line property is a needed line, you can leave the needed lines untagged, and the system will recognize the line as the needed line. The following pattern means the first three lines are needed lines while only the last one is the optional line:

```
interface $str:intf
ip address $ip:ip_address $ip:ip_mask
standby $int:standby_group ip $ip:standby_ip
O: standby $int:standby_group2 priority $int:standby_value
```

The configuration must match the line pattern definition sequentially for the line pattern definition to be identified as a match. If any line of the configurations does not match the line pattern defined, it will not be recognized as a match. The following modified configlet is not recognized as a match for the line pattern we just defined as the lines cannot be matched by exact order.

```
interface GigabitEthernet0/21
standby 1 ip 192.168.1.100
ip address 192.168.1.1 255.255.255.0
```

With the exact line pattern match rule by order, you will sometimes need to find repetitive lines for certain line patterns to find all the matched config lines. The group concept is introduced to better match device config files to support grouping several lines into a unique matching unit. The previous line pattern we just defined can be recognized as a single group, and we can give it a simple group name, group1, to indicate its uniqueness:

Group1:
  M: interface $str:intf
  M: ip address $ip:ip_address $ip: ip_mask
  M: standby $int:standby_group ip $ip:standby_ip
  O: standby $int:standby_group2 priority $int:standby_value By grouping these line patterns, you can find all interfaces with HRSP configured within configuration files and extract them. Another reason to divide your line patterns into different groups is to use each group as a unit to match separately. A simple example is finding OSPF configuration files for Cisco devices while finding all interfaces with OSPF configured. The line pattern will be something look like the below:

Group1:
  interface GigabitEthernet2/1
  ip address $ip:ip1 $ip:ip2
  ip ospf authentication-key 7 011208034E18
  ip ospf network point-to-point
  router ospf 1
  router-id $str:router_id
  passive-interface default
  no passive-interface GigabitEthernet2/1
  network 10.41.1.64 0.0.0.1 area 0
  network 10.41.2.0 0.0.0.255 area 0
  maximum-paths 2

As the previous rule states, if you put all these lines into a single group, the system will look for the configuration lines for a match and then look for the next match. So, a configuration file that may include multiple OSPF interfaces configured may only be matched once. To support this case, you can use the group logic to divide the line pattern into different OSPF groups as below:

Group1:
  interface GigabitEthernet2/1
  ip address $ip:ip1 $ip:ip2
  ip ospf authentication-key 7 011208034E18
  ip ospf network point-to-point
Group2:
  router ospf 1
  router-id $str:router_id
  passive-interface default
  no passive-interface GigabitEthernet2/1
  network 10.41.1.64 0.0.0.1 area 0
  network 10.41.2.0 0.0.0.255 area 0
  maximum-paths 2

The system will search for each group's exact match separately by dividing the line patterns into two groups. A configuration file that includes multiple interfaces can easily match the group1 definition. In contrast, the global OSPF configuration can be easily matched. Please note that the groups' sequence does not matter, so if the defined pattern starts from group1, then group2, while the real configuration file starts with group2 and then group1, the device will still be recognized as a match.

Device feature decoding through configuration files provides a powerful way to figure out network features from your network devices. But that requires massive calculations across all devices. In some cases, you may need lightweight methods to find devices quickly, so you can use the device properties that are already displayed in network management, or use the regex as a qualification to achieve this, as explained below:

```
feature:
  qualification:
    conditions:
      -     property: hasEIGRPConfig
            operator: Match
      -     property: device__type
            values:
              - Cisco IOS Switch
              - Cisco Router
      -     property: config
            operator: Match #
    boolean__expression: (A and B) or C
  configlet: # configlet
    match__rules: #
      -     regexes: # the first rule is the main Match Rule
              condition1:
                - regex: standby # regex means used for single-line
                matching.
                - mregex: ^interface1 .+\n\s+standby
                - mregex: ^interface2 .+\n\s+standby
              condition2:
                - mregex: ^interface .+\n\s+standby
                - mregex: ^interface .+\n\s+standby
```

The qualification section allows you to use all device GDR properties to filter the related devices. The regex section allows you to define one or more conditions to match related devices. Mregex is supported here. Using the qualification and regex rule as preliminary filters can significantly improve the accuracy and performance. In some use cases, you may only need to define the qualification and regex match without using the config line pattern for feature decoding, and that is fine. Still, you'll need to make sure you have at least one of the three matching methods defined for the system to match devices and execute properly.

The previous section explains the feature decode basics and how you can use the line patterns to match the configlet from configuration files. This section will explain how you can further divide the feature intent into sub-feature intent (SubFI for short) and generate default network intent by using the sub-feature intent. Network Intent can include very complex automation logic defining how to check the desired status. It can only include the basic configlets and CLI commands without automation logic, by which we mean the default Network Intent. The configuration files decoded can be used to fulfill the configlet displayed in the network pane and the configlet of the network intent detail pane if there's no automation logic defined for network intent.

You can also define the CLI commands to be used for feature verification, and this CLI command will be passed to the network intent CLI command when the default network intent is created based on feature intent.

Besides the general CLI commands without parameters, the CLI commands with the parameters can be referenced from the line patterns. In the above example, we use the show standby interface {$intName1}command, which means from the configuration files, we use the line pattern to match the interfaces with the HSRP configuration, and then we only check the interface HSRP status for these interfaces. By specifying parameters using inline patterns, we can significantly improve the CLI command accuracy.

Feature Intent stands for all configuration lines matched for line patterns. Often you could match many repetitive patterns and want to divide the Feature Intent into sub Feature Intent for further network intent creation. Let's take a simple example of the line patterns we created for the HSRP feature:

```
patterns:
  group1: |-
    M: interface $str:intyName1
    M: ip address $ip:ip1 $ip:mask1
    M: standby $str:standbyName1 ip $ip:ip2
    O: standby $str:standbyName2 priority $str:priority
```

The above pattern is the HSRP feature pattern to match devices that have HSRP configured on their interfaces. Still, one interface may have multiple HSRP groups configured, each with its ip address and priority. The following example shows a configuration file with two HSRP groups configured on a single interface, and we need to split the groups into two different network intents.

```
interface GigabitEthernet0/21
description HSRP-GROUP
no switchport
ip address 192.168.2.1 255.255.255.0 secondary
ip address 192.168.1.1 255.255.255.0
udld port aggressive
standby 1 ip 192.168.1.100
standby 1 priority 150
standby 1 preempt
standby 2 ip 192.168.2.100
standby 2 preempt
!
```

To divide different HSRP groups into different sub Feature Intent and further create network intent based on certain HSRP groups, we can divide the feature intent into SubFIs based on the following parameter used in YAML for Split Keys: a line pattern could match multiple instances in the configuration file, and thus some line pattern variables may have multiple possible values. Defining the variable here will ensure that the variable only has one instance value in the subFI. In the above sample, since we want to split the feature intent by group names, we can specify the split_keys as follows:

```
split_keys: #variable signature concept, optional
  group1: [$intfName1, $standbyName1]
```

By defining the split_keys, assuming we only have this interface with the HSRP configured, the subFIs are:

TABLE 5

| SubFI | Content |
|---|---|
| First SubFI | interface GigabitEthernet0/21<br>ip address 192.168.2.1 255.255.255.0 secondary<br>ip address 192.168.1.1 255.255.255.0<br>standby 1 ip 192.168.1.100<br>standby 1 priority 150<br>standby 1 preempt |
| Second SubFI | interface GigabitEthernet0/21<br>ip address 192.168.2.1 255.255.255.0 secondary<br>ip address 192.168.1.1 255.255.255.0<br>standby 2 ip 192.168.2.100<br>standby 2 preempt |

The previous example only contains one group in the pattern field. In case you have multiple groups in the pattern, and you want to group them, you will need to have the relation defined. The relation is used to filter and keep the SubFI matching the relation definition. The only function you can use is equals($var1, $var2) which means they should be the same.

By default, if you use multiple groups or define the split keys, NetBrain will generate multiple SubFIs according to your definition. However, in some cases, even if you find all related configlets, you still want to generate a single Feature Intent instead of multiple subFIs. In this case, you can use the generate_one_FI_groups flag. You can define whether you want to create one instance for single or multiple groups. If you want all groups to be generated as a single Feature Intent, list all group names here so the system will generate only one FI here.

Once we have generated the FI and SubFIs for multiple devices, we need to group them to generate the FI group. FI group contains a couple of devices with network relationships. The followings are two examples of FI groups:

HSRP pair, which includes the active device and the standby device.

ASA cluster, which includes two ASA devices.

To generate FI groups across multiple devices, we must find unique characteristics for these devices. From the networking perspective, the above examples can be explained by:

HSRP pair of devices sharing the same virtual IP address, and the primary device and secondary devices are within the same subnet.

Devices within an ASA cluster have the same IP address.

The unique characteristics of each device to generating FI group is denoted with the "Eigen" variables, identified with the following statements:

```
eigen_variabLes:
  name: crossReLationKey
    expression: expression: Combine($standbyName1,
Str(IP($ip1, $mask1)))
  name: site
    expression: $device.GetSiteName( )
```

There are different ways to define the Eigen variable expression:

SubFI variable: Use the SubFI variable directly for the Eigen variable.

Function calls: If you want to group several SubFI variables, you can use a function to merge several SubFI variables into a new variable. In the above case, we used the combine( ) function, which combines several variables into a new one. We want to ensure that the FI group has the same IP address as the same HSRP group. We don't want to mix different HSRP groups into a single FI group.

The network management's GDR properties: the built-in properties can be used in the Eigen variable for verification purposes. If you have different sites that may have the same HSRP IP address or HSRP group, you'll probably want to differentiate these devices by further criteria. We use the device site property to ensure that the same physical container site should not have the same HSRP ip addresses.

You can define one or more Eigen variables for device clustering. One of the key Eigen variables will be used for cross-device grouping and the others for complementary verification. The qualification field is used to filter further unwanted SubFIs based on Eigen variables. In this case, we want only to generate an FI group if the devices are within the same site. And we don't want to generate an FI group for devices that we haven't allocated to certain sites that may introduce inaccuracy. We can use the $site as the qualification to filter devices that don't belong to any site.

The last keyword, group_type, defines the method to group devices into the same FI group, and there are two types:

- ExactMatch: this is the default type, and the Eigen variable in this field needs to be the same so SubFIs can be grouped into a single FI group. This also applies to the situation you use the combine( ) function to combine several Eigen variables. All Eigen variables need to be the same to be grouped into a single FI group.
- Contain: there are cases where you may want to group subFIs if the Eigen variable contains a common value, and they don't need to be the same. A simple use case is one IP device has several BPG neighbors to the PE devices, and you want to group them into a single FI group. The Eigen variable is defined as the BGP neighbor IP address. The BGP neighbor IP address is represented as a list containing all Eigen variable values of all PE devices.

Once we have the SubFIs created based on Eigen variables, we can further convert the FI groups into Network Intents. There are two ways to convert FI group into network intents:

- Generate default network intent: in this step, we convert the configlets and CLI commands and generate networking intent. The network intents only include the configlets and CLI commands.
- Generate network intent with NI template: We convert the FI groups into network intent based on the NI template. As an NI already has the automation logic, we can reuse the aNI template's automation logic.

To generate default network intent, we need to define the related network intent contents:

network intents:
  path: xxxx/xxxx/General_BGP_{$crossRelationHash}
  conflict_mode: Skip
  lock_after_created: false
  create_default_NI: true
  cli_baseline_update_type: LatestFromDE The path field illustrates where you want to put the newly generated default network intents. To make each network intent unique, we attach the CrossRelation field to the network intent name. The conflict_mode section defines the behavior if the network intent with the same name already exists. In this case, you can either overwrite the existing network intent using an override flap or skip it. As network intent can be locked to prevent others from modifying it, you can set this field accordingly. Please note that the feature intent template cannot update the network intent because it's locked once you set this field to true. And this setting has higher priority over the conflict_mode field, so you won't be able to update the network intent in any case. The create_default_NI field specifies which type of network intent to generate. In this section, we'll set this field to true to generate default network intent without automation logic. Cli_baseline_update_type: This field specifies how you would like to set the CLI baseline data. There are two ways to add the CLI command output to the network intent:

1. LatestFromDE: Use this setting to make the current CLI command output the baseline of network intent. You'll need to ensure you have already retrieved the CLI command before executing the feature intent template.
2. LiveFromNextRun: Use this setting if you want the system to set the CLI command baseline from the live network when running the network intent.

Network Intent can be created from a NI template. This is the creation of Network Intent with automation logic. As the network intent is device-based automation, a user must select specific devices and then define the network intent automation. So, if you have many devices with similar network technology and need to define similar automation logic, it is tedious to manually replicate the logic to all other devices. Using FIT can find devices automatically and apply the automation analysis logic to the new network intents. A network intent template to display the template function may be the same as network intent. If the template variables are set up correctly, you can use any network intent as a network intent template. To set up the network intent template variables, you can open the edit mode of any network intent and click on the Define Template Variables hyperlink to open the Define Template Variables window. All devices defined in this network intent may be listed along with the CLI commands. There are at least two different ways to create new network intent:

- Exact device count match—the device count of newly created network intents needs to be the same as the existing network intent when applying the automation analysis logic.
- Adjustable device count match—the device count of newly created network intents can differ from what is defined within the network intent template. Check the option Allow to apply multiple devices to one variable in this case.

The exact device count match may require an exact device count match when the network intents require the same device count according to the network technology. The analysis logic may require differentiation of the different devices of the network intent. HSRP is an example of this case that requires two devices: the active and standby device. In the network intent's automation check logic, you may define different checking logic depending on this device's status (active or standby). Using this network intent as a template to duplicate the network intent automation logic to other devices may require the device count in the new network intent is the same.

The adjustable device count match may not require the exact device count match, which can be used when you have a couple of devices grouped for network technology that doesn't require the same device count. The following is a simple example of the IPSec designs for the WAN connections, where the network intent for the sites connected through IPsec tunnels, consisting of several devices. You can define the universal checking logic for all these devices, and if you want to create network intents for other WAN connections, the device count can be different, but the automation check logic can be re-used.

The next step may be to define how devices and related show commands are replaced by the new FI group. The replaced parameters may be the following:

- Device Parameter: replace the device with the new name. The device variable is pre-defined, and you can modify the variable name.
- CLI Command Parameter: if you use the CLI commands targeted for certain configs related to the current device, you must make that part a variable. The value can be replaced with a new value for the new device. Two examples include:
  - a. Interface Name: In the network intent template, we need to check the interface status for WAN interfaces connected to the Internet, so we use the show interface S0/1 command to achieve this, where the WAN interface name is S0/1. For new devices, the interface name may be different, and you need to make the specific interface name a variable so it can be replaced with a new value.
  - b. VLAN ID: In the network intent template, we use the show interface id 10 to check the status of VLAN 10.

But for a new device, the VLAN id can be different, and we need to make it a variable so it can be replaced with a new value.

With the Network Intent Template Parameters defined, a user can further define logic to map the feature intent template's variable. After defining the template variables, this Network Intent can be used as a template to generate further network intent, which can be shared/exported.

Adaptive Monitoring Automation

The Adaptive Monitoring Automation is a backend automation system to run hundreds of thousands of automation tasks without human intervention. The system may utilize a Flash Probe. A Flash Probe defines an entity that performs a network anomaly detection on one or more devices. In one example, a flash probe runs on a single device. For example, to detect whether a single Device R1 has a high CPU, you can define a Flash Probe (Alert Name) as CPU High. The Alert generated after Flash Probe is detected is Flash Alert. If a flash alert occurs in a network device, the system further runs the drill-down automation (Network Intent) to identify the potential root cause. The flash probe polls the live network device and discovers any anomaly. The system can also integrate with other 3rd party monitoring systems instead of directly pulling the live network data. The Adaptive Automation System may include:

The system to define and monitor Flash Probe.

The system to define the triggered NIs associated with a Flash Probe and recommended automation.

A dashboard to present the Flash Probe's results with the Flash Alert and associated triggered automation (Preventive Automation Dashboard).

Figure 27:
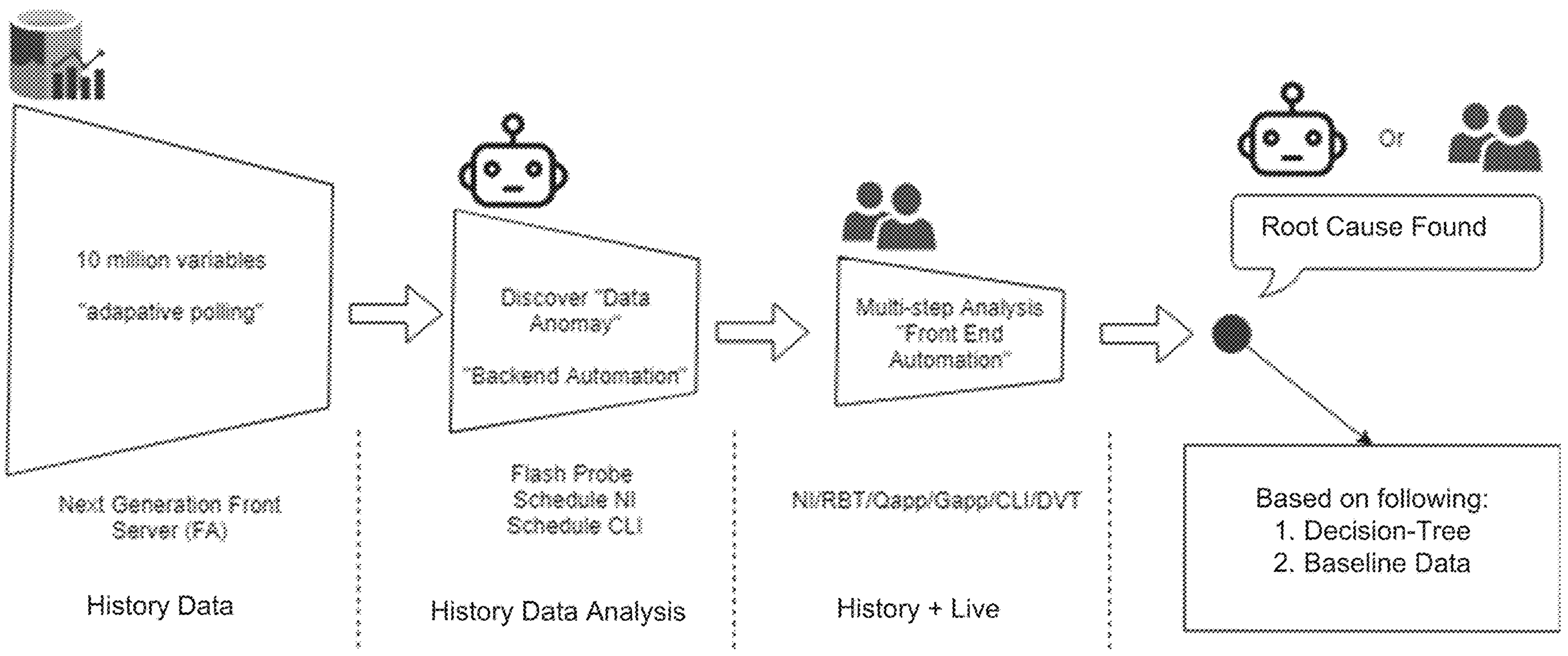
FIG. 27 illustrates an adaptive monitoring process.

FIG. 27 illustrates an adaptive monitoring process. In this example, a root cause is found based on either a decision tree (hypothesis with hierarchy) and/or baseline data. Runbook and Data View Template are examples of front-end automation, so when a problem occurs, users can leverage these functions to run a troubleshooting process and figure out the potential root cause. This may rely on humans to run the automation and view the results. The automation results may not be easily shared with others, and there is no scalable way to run automation checks for a large network. The Network Intent (NI) and Adaptive Monitoring (AM) systems include an intelligent trigger to execute the NI and enable large-scale automation without human intervention. The AM may utilize a Flash Probe, as discussed herein, that can define an entity that performs a network anomaly detection on a single device. A Flash Probe can be thought of as an Alert Name. For example, to detect whether a single Device R1 has a high CPU, you can define a Flash Probe (Alert Name) as CPU High and detect the current device's CPU via SNMP, CLI, or API. The Alert generated by Flash Probe is Flash Alert. If a flash alert occurs in a network device, the system further runs the drill-down automation (NI) to identify the potential root cause.

By executing device-level automation (triggered by the flash probe), the system may handle massive automation resources. The system scalability, as a result, can be enhanced. Since the automation is executed in the backend in a fully automatic manner, users can create their automation resources and upload them to the backend system. The automation results can be viewed across the entire company via the Preventive Automation Dashboard or the monitoring data view. An alert message may be displayed in the Preventive Automation Dashboard and sent via email for notification purposes. In one embodiment, a user can type $ to reference the variables defined in the alert message.

Referring back to FIG. 7, after the Incident is analyzed and resolved, users can create a flash probe for this Incident, which can catch the transient network problems and network problems that occur for the first time. This is an example of how the adaptive monitor and triggered automation operate together. The system can also integrate with other third-party monitoring systems instead of directly pulling the live network data.

Figure 28:
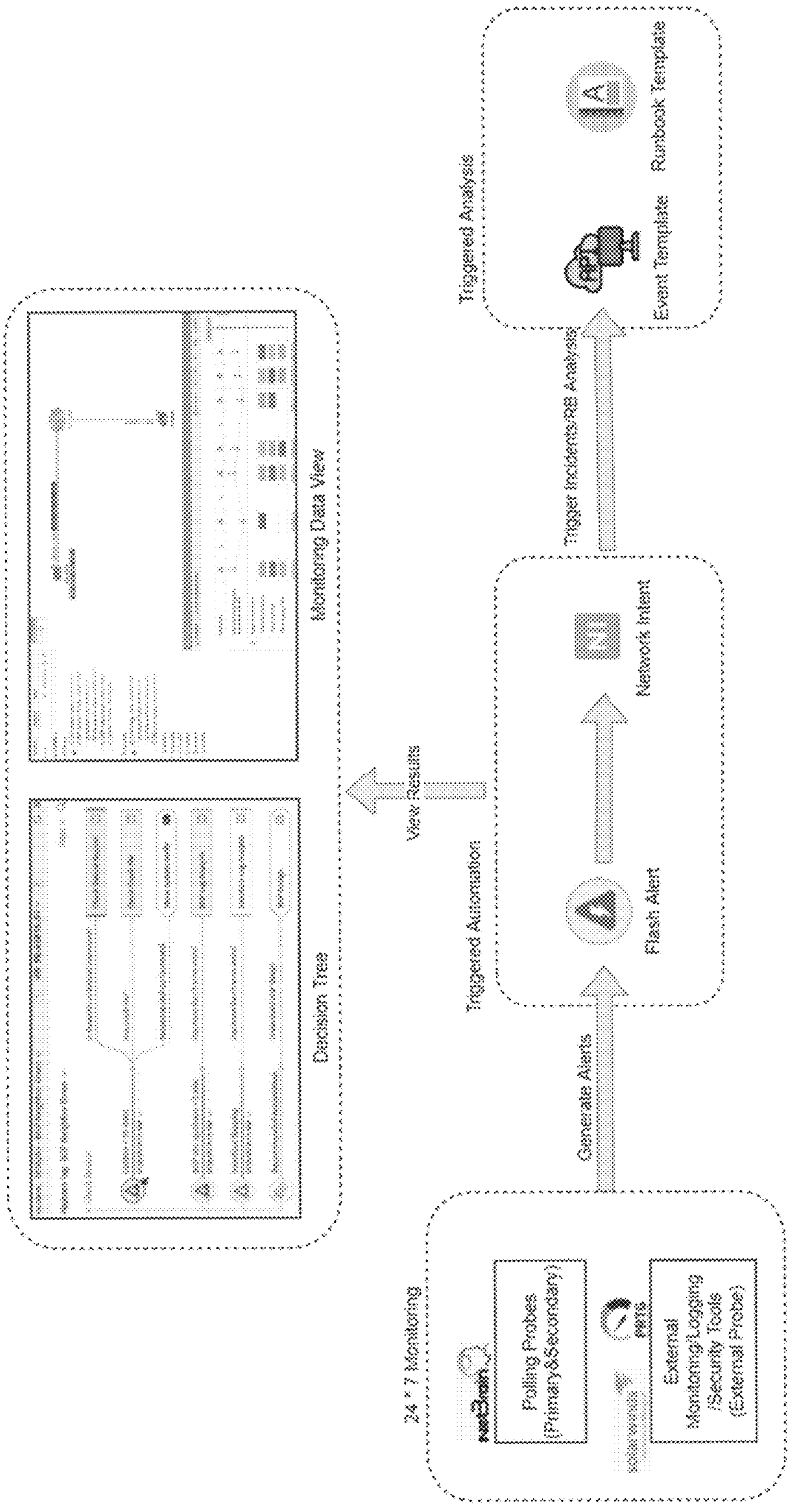
FIG. 28 illustrates an adaptive monitoring automation example components and flow.

FIG. 28 illustrates an adaptive monitoring automation example components and flow. There may be consistent 24×7 monitoring through SNMP/CLI polling or third-party systems in two examples. The Triggered Automation is a scalable Network Intent automation analysis triggered by flash alerts. The Triggered Analysis is triggered by a flash alert and NI alert to create an incident and further Runbook analysis.

For Adaptive Monitoring (AM) guidance, network problems (i.e., symptoms) should be tracked by a primary flash probe (e.g., a single device, primarily SNMP data, with a few basic CLI data, e.g., show interface). There may be transient problems, such as: 1) an Interface Performance Issue: link utilization spike, interface flapping; 2) a device performance issue (e.g., CPU/MEM spike); 3) a route table entry anomaly; 4) a firewall failover or a device configuration change. After the primary flash probe detects a symptom, it will trigger the secondary flash probe to further detect the network problem, such as with a single device with CLI data or by a more specific alert based on the primary alert (e.g., BGP, OSPF Neighbor Check, BGP route table check, BGP config check). The network problem may be further tracked by Network Intents such as an HSRP check, QOS check, and BGP route reflector design check.

As shown in FIG. 28, the flash probes can be primary and secondary probes as described herein. The flash probe is used to capture the network anomalies by periodic polling. The variables that need to be monitored are selected, and then rules are defined for those variables. Network Intent (NI) can be installed in the flash probe which is defined for specific troubleshooting scenarios and specifies which flash probes will be used for triggered automation.

Figure 29:
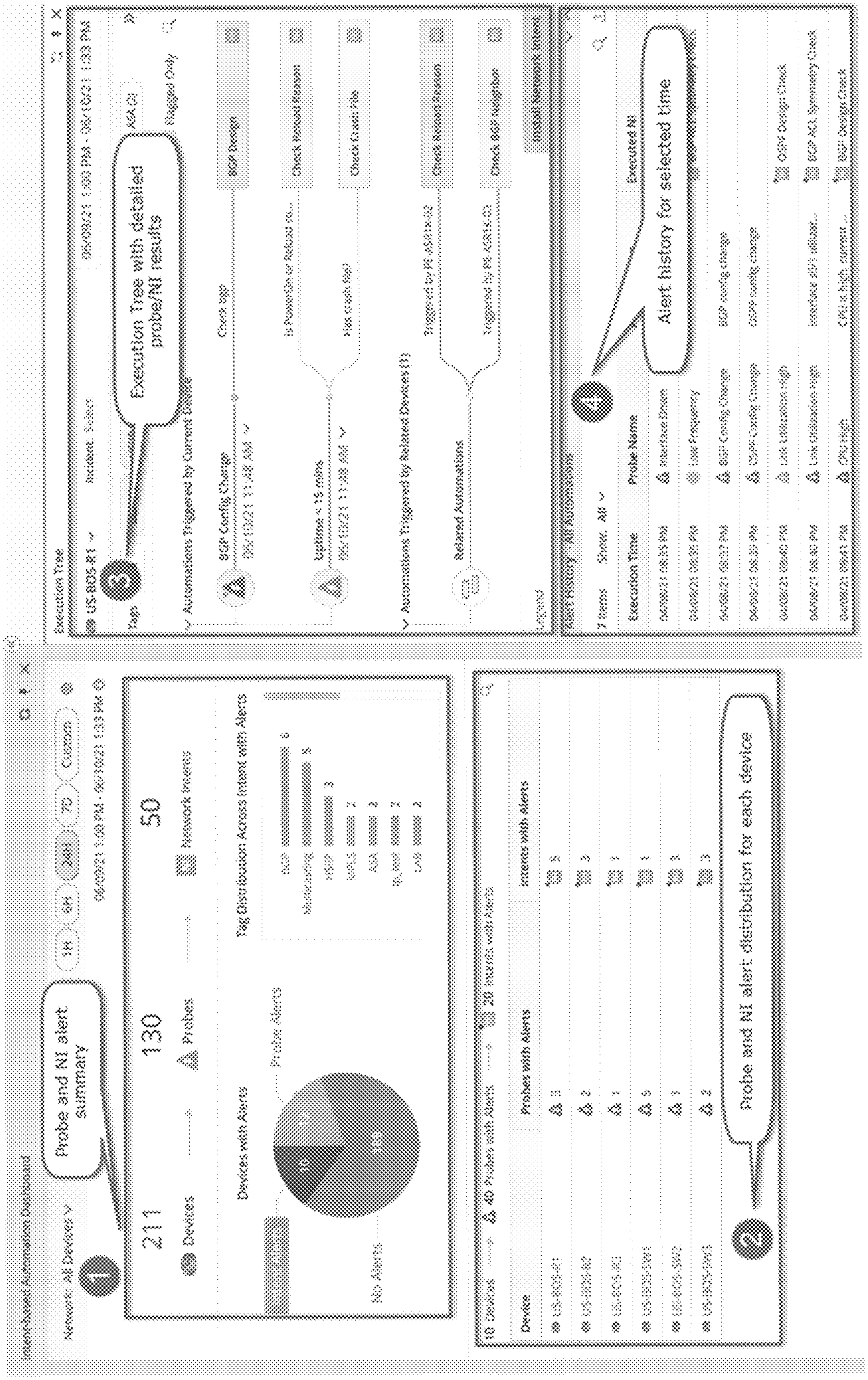
FIG. 29 illustrates an example preventative automation dashboard.
Figure 30:
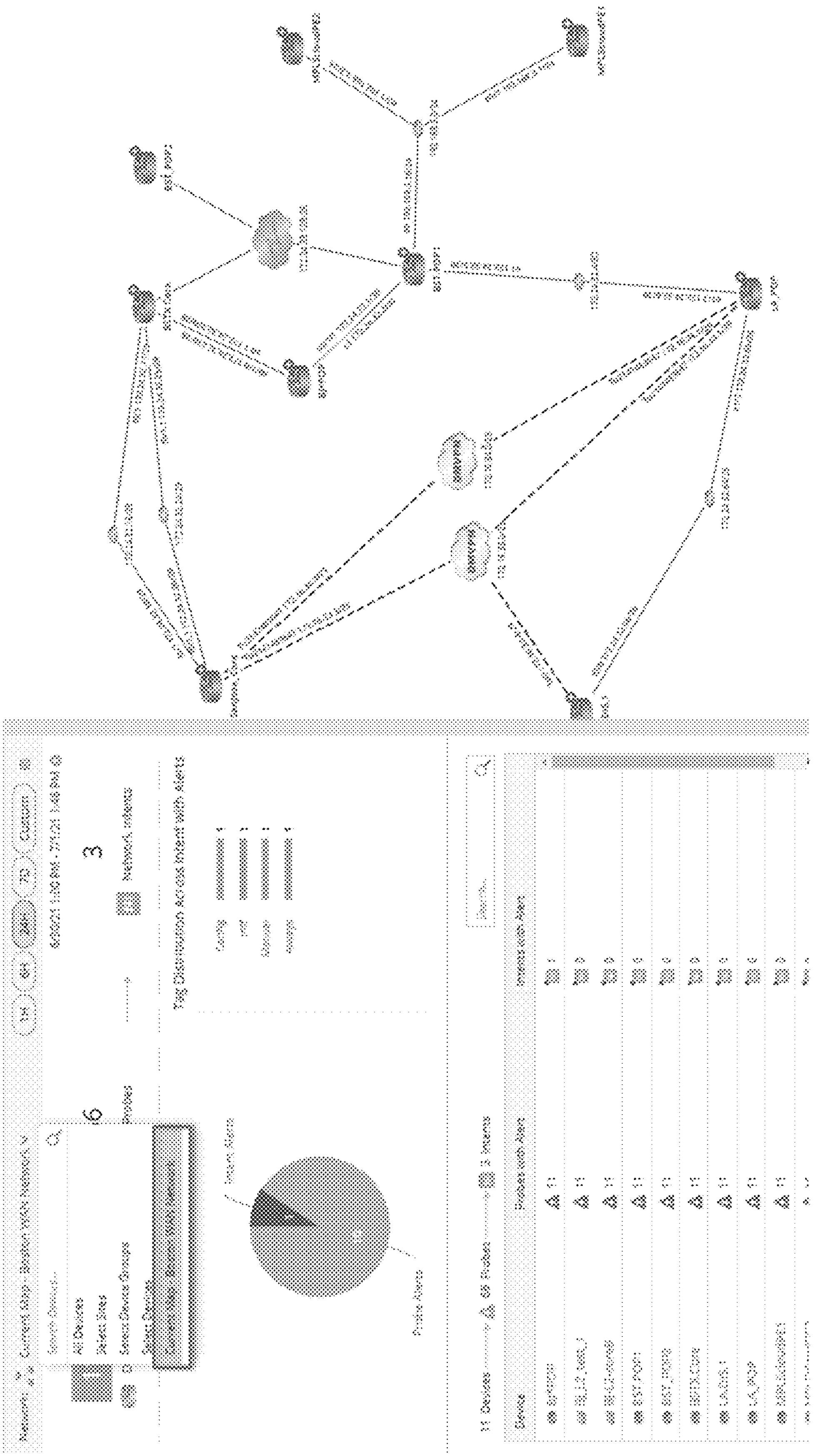
FIG. 30 illustrates an example map display for preventative automation results.

Adaptive monitoring results can be viewed from a Preventative Automation (PA) Dashboard or a monitoring data view, as shown in FIG. 29. FIG. 29 illustrates an example preventative automation dashboard. The dashboard may include a summary view (1 and 2) that provides a summary of probe/NI alerts based on a group of devices. The dashboard may include an execution tree (3 and 4) that provides the execution details for a single device. The results can be displayed on a map, as shown in FIG. 30, which allows for a viewing of results for the devices of the current map, which help the user quickly view the running status based on the current map. FIG. 30 illustrates an example map display for preventative automation results.

Figure 31:
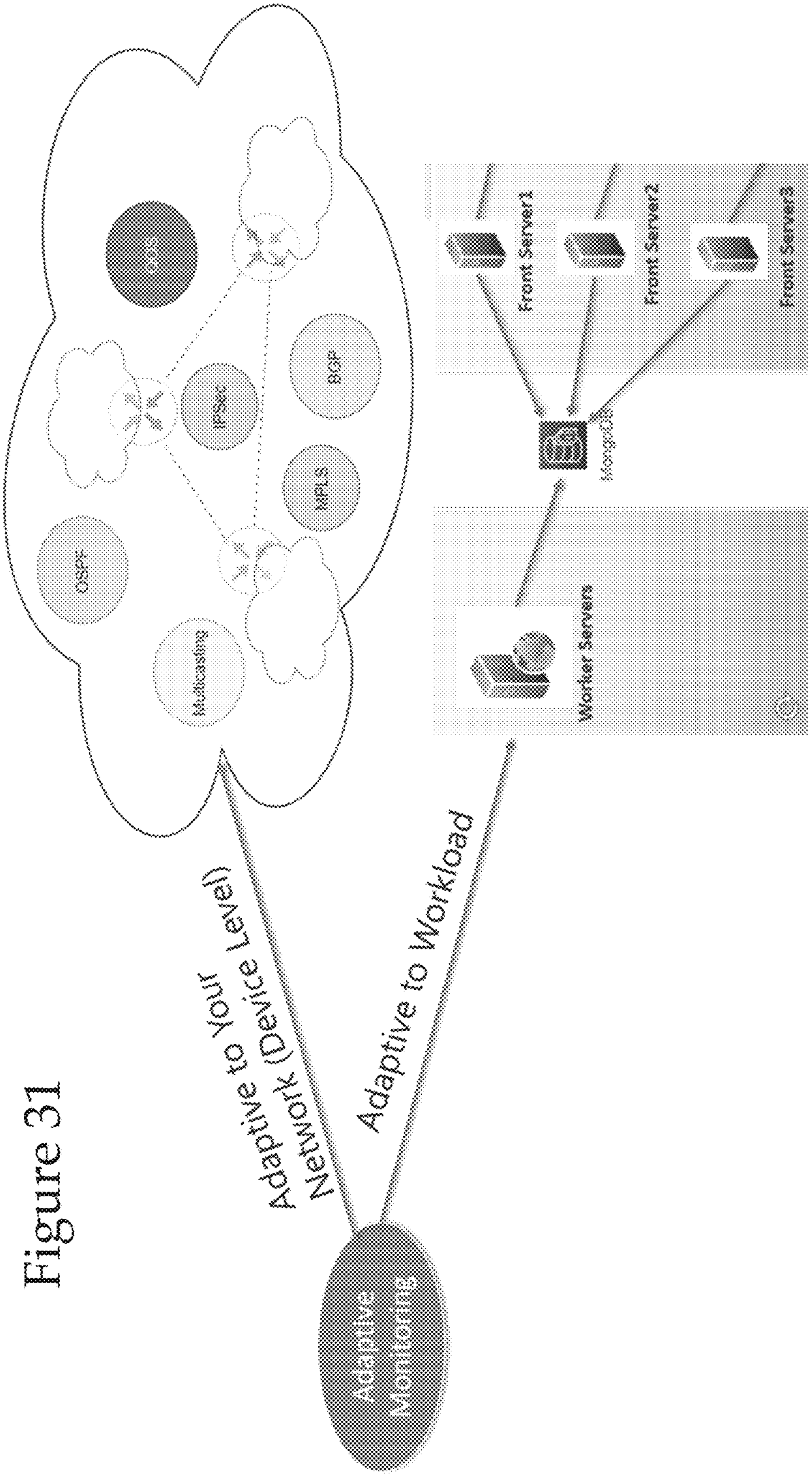
FIG. 31 illustrates an example adaptive monitoring.

FIG. 31 illustrates an example adaptive monitoring. The example system may be designed to capture network problems as they happen and before an end-user/application knows about them. Sample network issues captured by the adaptive monitoring system include transient problems (e.g., link utilization spikes, routing flapping, STP oscillation) or first occurrence issues (e.g., config change, failover, etc.). The adaptive monitoring may be adaptive to the particular network, such as at the device level. It may also adapt to the workload, depending on the server arrangement.

Figure 32:
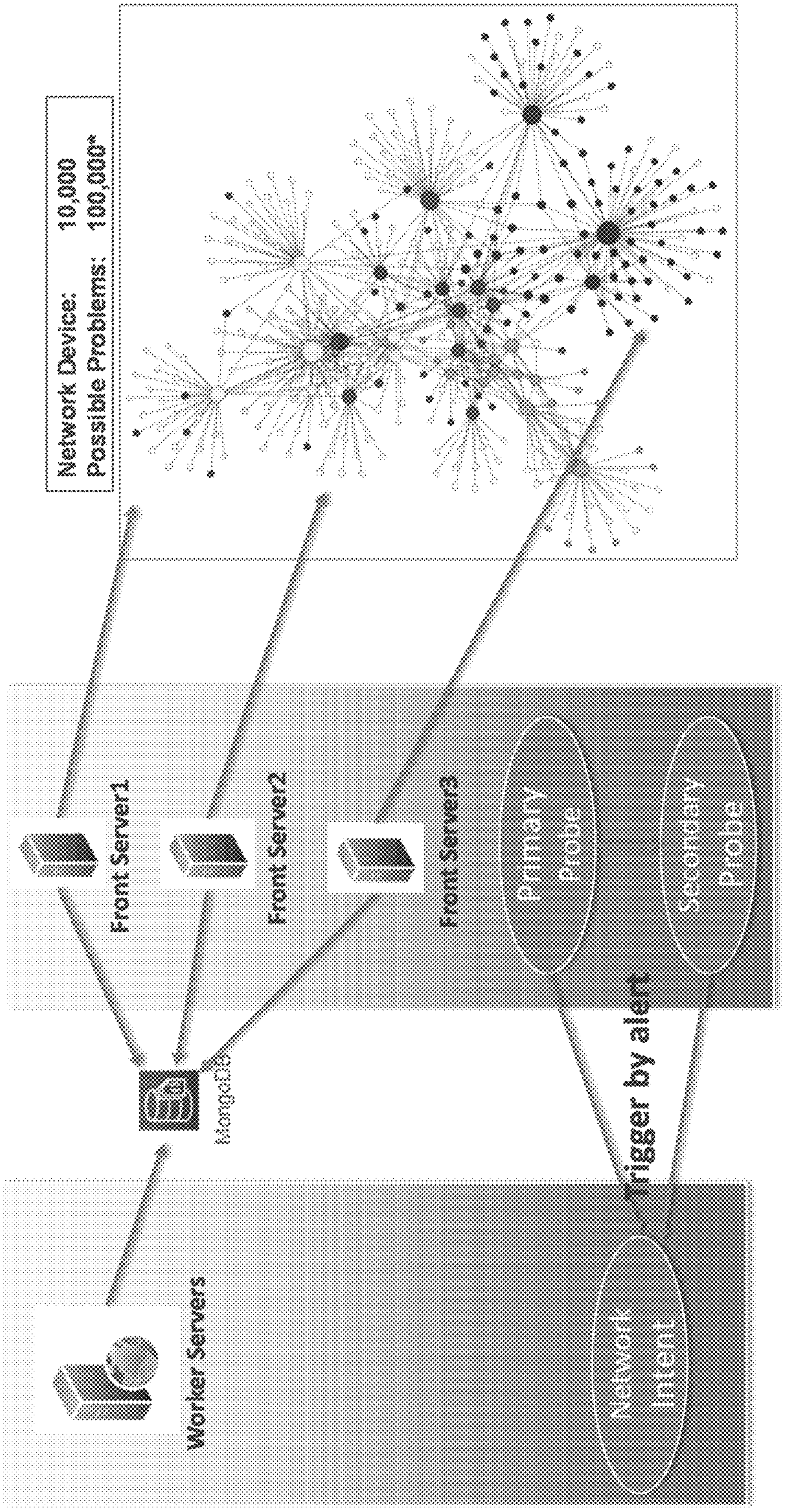
FIG. 32 illustrates the scaling of the example adaptive monitoring.

FIG. 32 illustrates the scaling of the example adaptive monitoring. The adaptive monitoring system can horizontally scale as distributed analysis on front servers in one example. In another example, there may be a hierarchical analysis from Primary Probe->Secondary Probe->Network.

Figure 33:
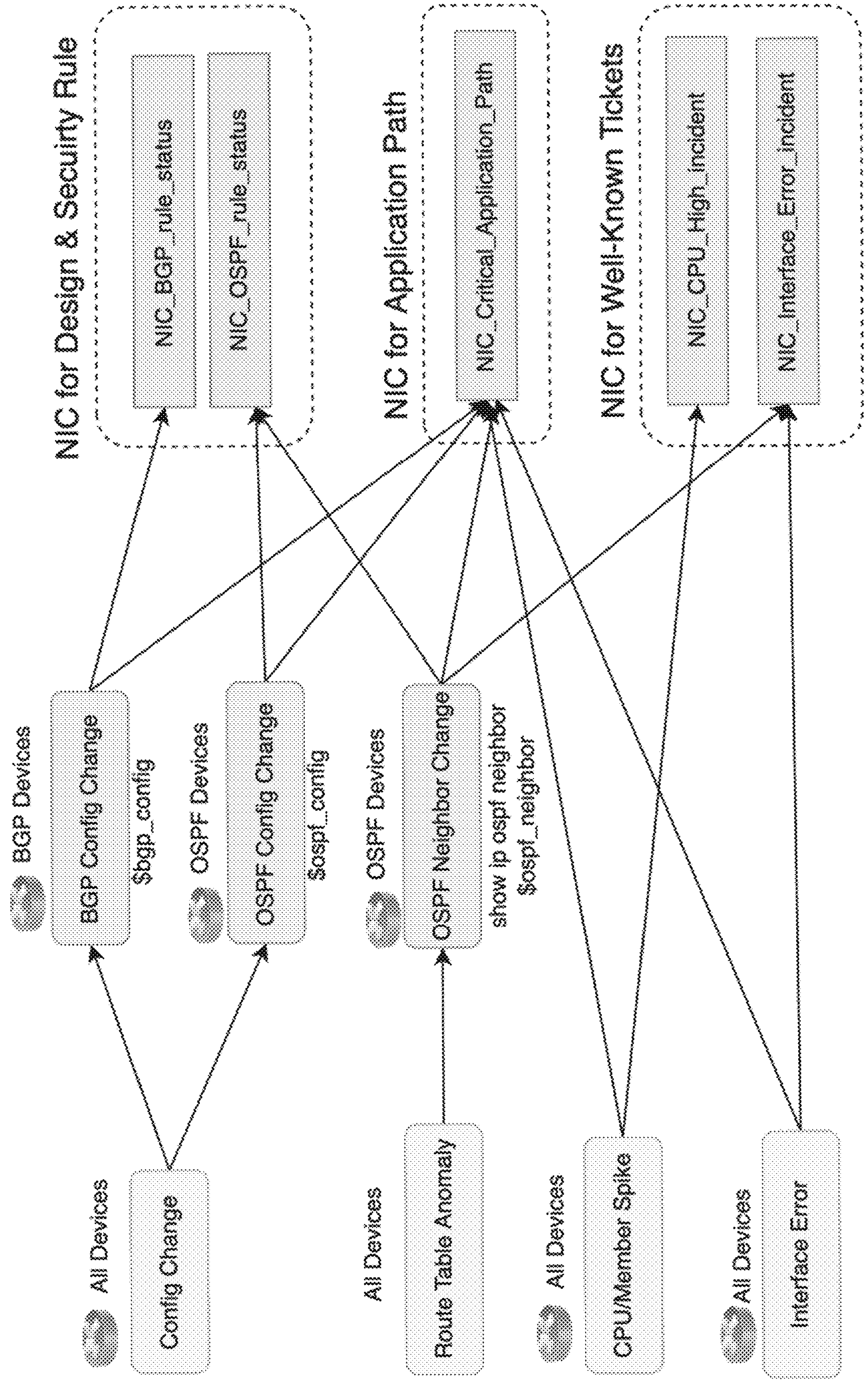
FIG. 33 illustrates a flash probe identifying when network alerts are generated.

FIG. 33 illustrates a flash probe identifying when network alerts are generated. A flash probe may be used to identify whether a certain network alert is generated, such as via SNMP/CLI parser variable, or it may receive an alert directly from external systems (e.g., Splunk). There may be a single device analysis unit or a multiple device analysis in some embodiments. It may be retrieved and executed in a front server to be scalable. There may be a device level check (e.g., CPU high, Config Change) or Interface Level Check (e.g., Interface CRC Error increase).

Figure 34:
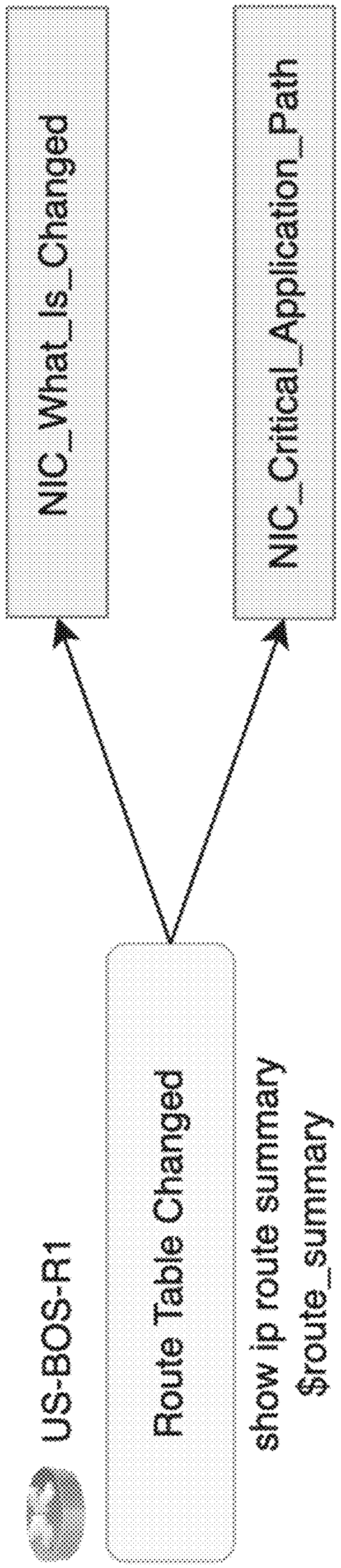
FIG. 34 illustrates a primary flash probe.

FIG. 34 illustrates a primary flash probe. The primary probe may be designed for issues detection on certain devices. In some examples, well-known probes can be designed and customized for a Route Table Change on the core routers in the US BOS site, like US-BOS-R1.

The primary flash probe is defined with basic info, such as the name, display name, and description. The Device/Interface level selection can also be defined, such as specifying whether this flash probe detects device level anomalies (CPU high, BGP neighbor change, etc.) or interface level anomalies (interface flapping, interface traffic usage high, etc.). Variables that are selected can be used for defining alert rules. This may include selecting the parser variables. The user can also use the compound variable computation to create complex variables for alert definition. Alert rules are defined for the condition to trigger an alert and the alert message for the flash probe. The flash probe is enabled by default once defined, and it will be executed based on the current device's primary frequency. To adjust the flash probe frequency, the user can click its frequency settings and modify them accordingly.

Figure 35:
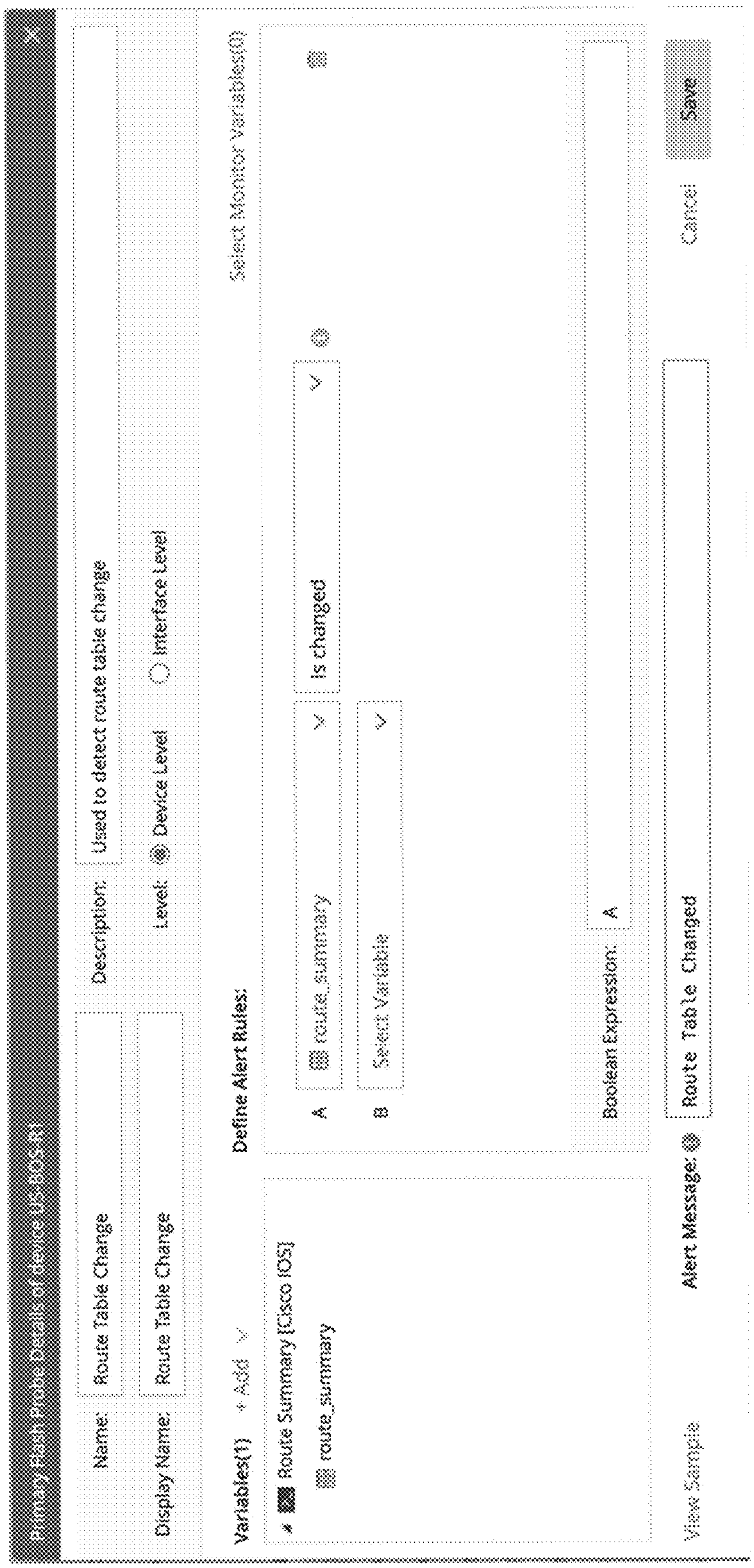
FIG. 35 illustrates a screenshot for primary flash probe details.

FIG. 35 illustrates a screenshot for primary flash probe details. In one embodiment, the screenshot is the details of the device from FIG. 34 when the route table is changed. The screenshot for the primary flash probe is used to detect the rote table change.

The primary flash probe can be applied to other devices. The system will check whether the selected devices are valid for the application according to the logic below:

- Flash probe can be applied to the target device successfully only if the parser of the existing flash probe also applies to the targeting devices. For example, if you use Cisco BGP Neighbor for the existing flash probe definition, you can apply the same probe to other Cisco devices; or if the existing flash probe uses SNMP public MIB to get the device interface status, you can apply this flash probe to any other devices regardless of the device type since the parser being used can be applied to all device types.
- If the same flash probe is already configured on other devices, the user can decide whether to overwrite all duplicate flash probes or keep them to suit specific needs.

The primary flash probe can be enabled/disabled on other devices. When a flash probe is enabled, it will trigger respective tasks to retrieve data and perform an error check periodically. If you want to enable or disable the flash probe for multiple devices, right-click a flash probe and choose from the following two options:

- Enable Other Devices with the Same Probe Name
- Disable Other Devices with the Same Probe Name The system can guide the user to select the desired devices, and all selected devices with the same flash probe name may be enabled/disabled in a batch.

Figure 36:
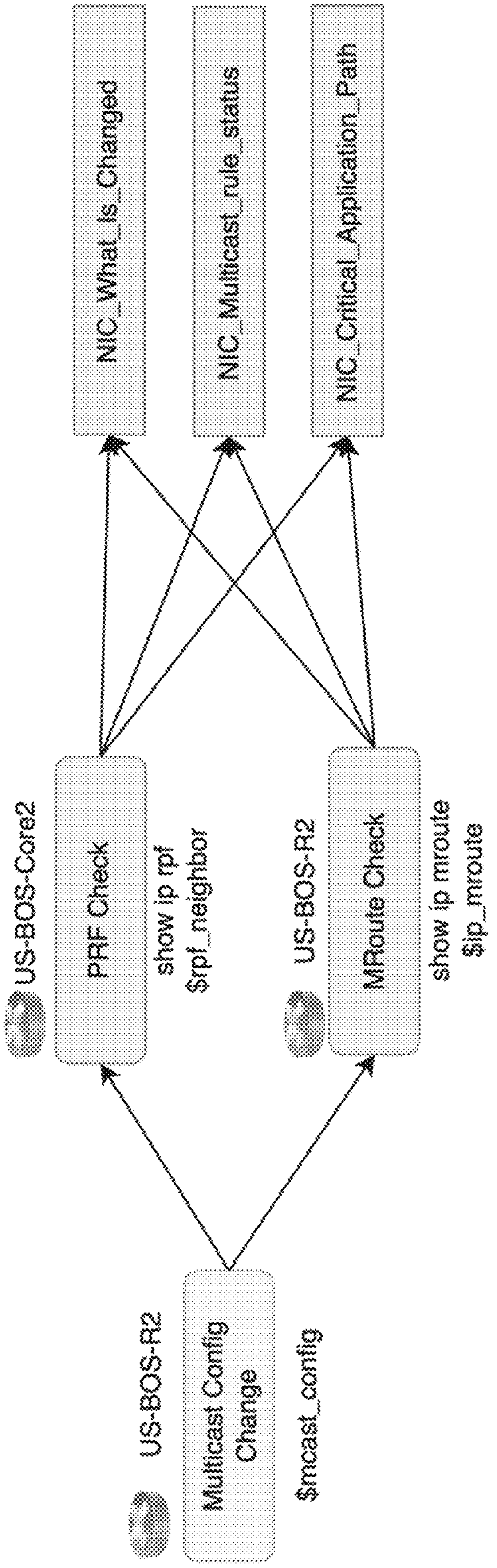
FIG. 36 illustrates a secondary flash probe.

FIG. 36 illustrates a secondary flash probe. A secondary probe may be designed for certain issues detected by triggering the primary probe on specific devices. In one example, US-BOS-Core1 primary probe Multicast Config Change could trigger several secondary probes on the current device or some probes on other devices. Improved efficient NI execution should be triggered by the secondary probe. It may reduce some NI/NIC execution by the common primary probe directly.

Figure 37:
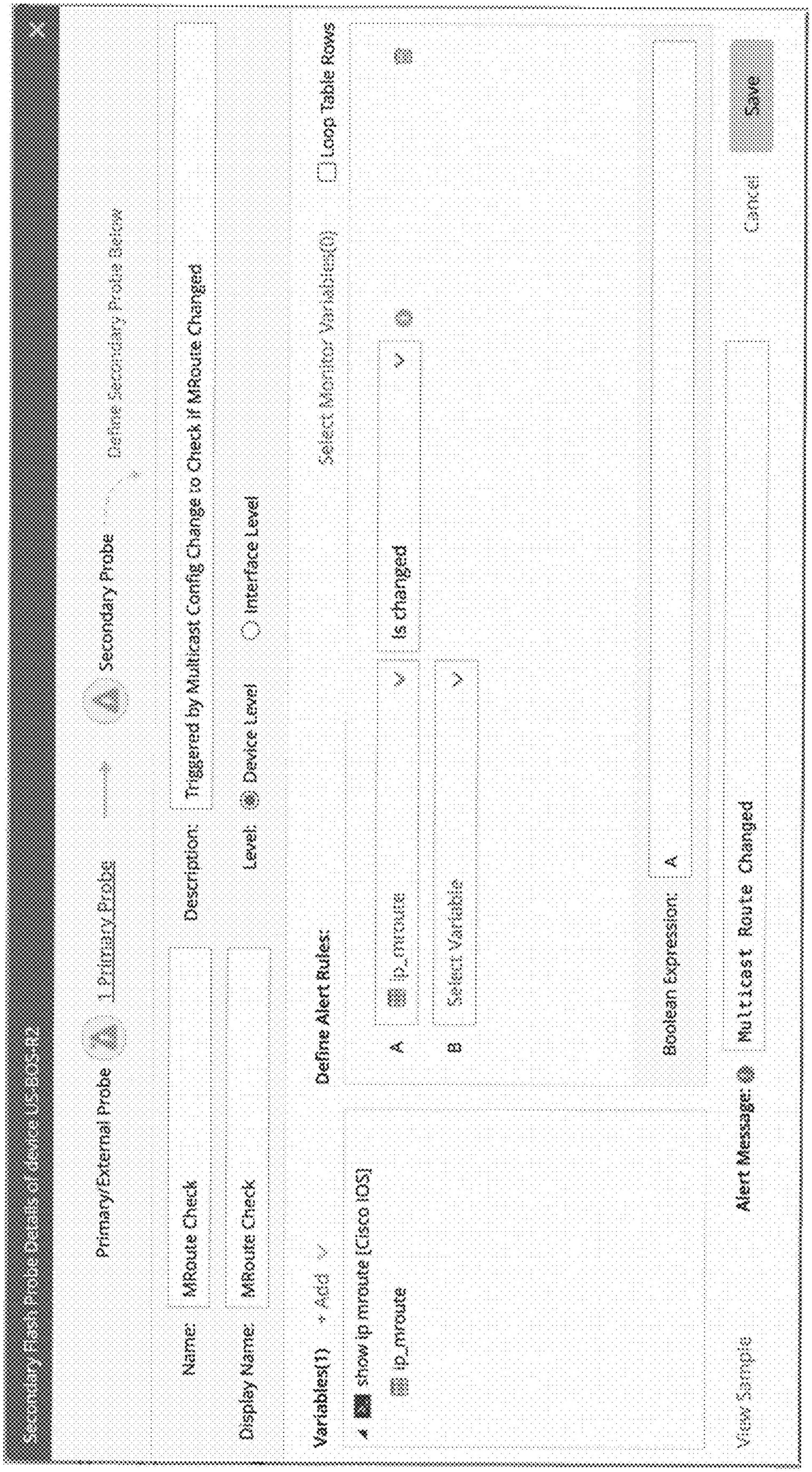
FIG. 37 illustrates a screenshot for secondary flash probe details.

FIG. 37 illustrates a screenshot for secondary flash probe details. In one embodiment, the screenshot is the details of the device from FIG. 36 when the route is checked. The screenshot for the secondary flash probe may be triggered by a multicast configuration change to check if MRoute is changed.

The functions, features, and properties of the primary flash probes may also apply to the secondary flash probes. In some embodiments, the secondary flash probes may only be triggered by the primary flash probe and cannot be run periodically. To specify the desired primary flash probe(s) to trigger the secondary flash probe, a user can select one or more primary flash probes from the Triggered By section in Secondary Flash Probe Details. Like the primary flash probe, the user can apply the secondary flash probe to other devices. Since the secondary flash probe needs to be triggered by the primary flash probe, the system will check whether the targeting devices have a similar primary flash probe, triggering a secondary flash probe. If not, the system will first apply the primary flash probe to other devices and then apply the secondary flash probe.

There may be at least three types of flash probes. The Primary Probe can be polled with a particular frequency, such as an alert-based Flash Probe where an anomaly generated by devices triggers the probe, or a timer-based Flash Probe where the probe can be triggered by a timer and can be used for further scheduled CLI and NI tasks. A secondary probe can only be triggered by primary probes. An external probe is used for integration with other monitoring systems. The alert generated by 3rd party systems can implicitly generate external flash probes.

Figure 38:
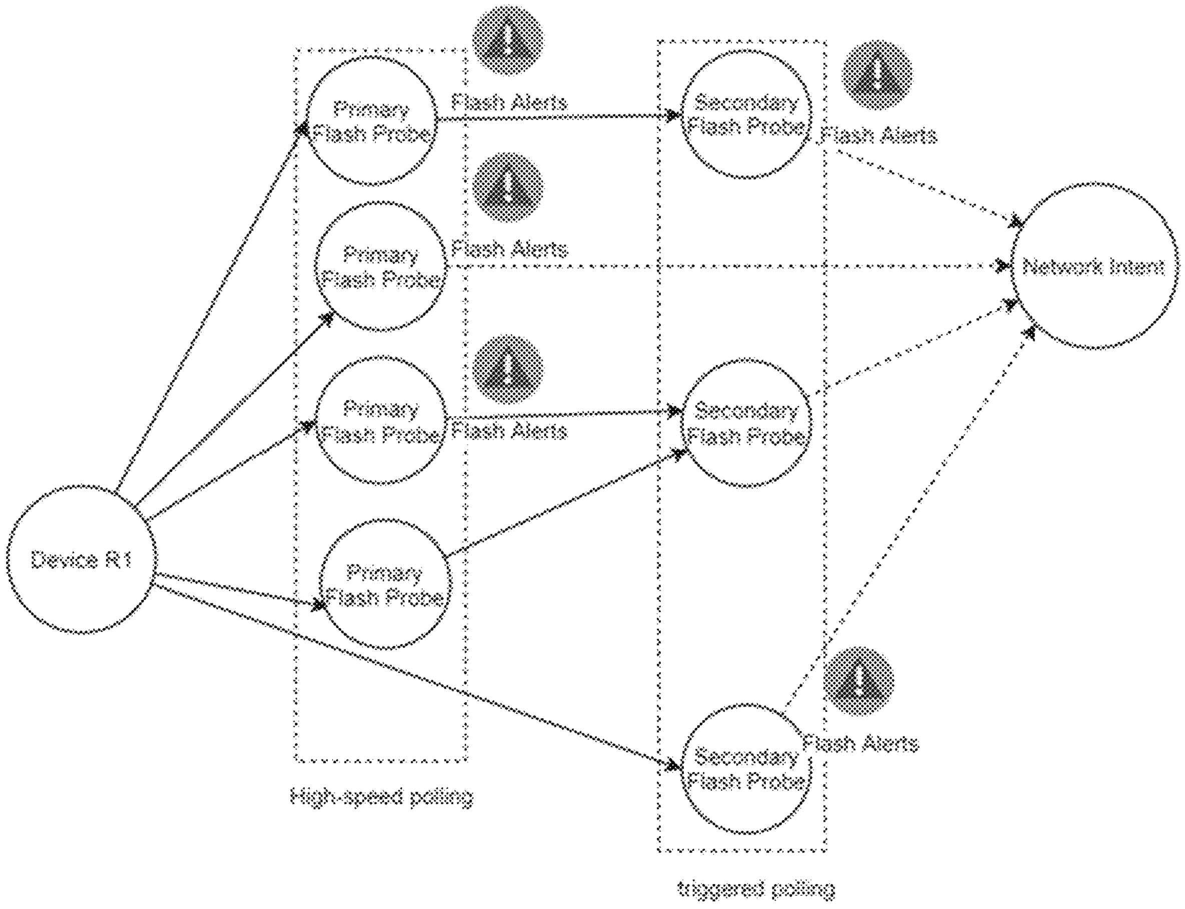
FIG. 38 illustrates an example probe setup.

FIG. 38 illustrates an example probe setup. The primary flash probe can trigger the secondary flash probe. The probes are used for establishing the network intent for device R1.

Flash probes can be set at different levels to capture different types of anomalies. For example, at the device level for an anomaly that is related to specific devices and not specific interfaces. Device-level flash probes may include CPU high, device config change, BGP neighbor flapping, etc. In another example, the anomaly may be at the interface level when the anomaly is related to specific interfaces. Interface level flash probes may include interface flapping, interface error increase, etc. The flash probe can be configured at multiple interfaces of the same device. In this embodiment, the system will check the selected interfaces one by one to determine whether an anomaly exists. If an anomaly exists in any of the selected interfaces, the flash probe's result will generate an alert and trigger the respective NIs.

Parser variables can be added. When a user adds parser variables to the target device, the system will use the target device type as the filter and list only applicable parsers for the user to select. Multiple parser variables can be selected for the further alert check. The variables may differ based on the flash probe level. For example, only device variables will be available to select if the flash probe is set at the device level. If the flash probe is set at the interface level, both device level and interface level variables will be available to select. Even if the plan is to check the interface level anomaly, there may still be a device level variable as its condition.

A compound variable may be added. Compound variables may be designed to perform bulk operations on multiple parser variables or use function calls to retrieve certain values. For example, CRC_Increase_Count=$crc-GetLastValue($crc). In this example, a compound variable is used to get the CRC error increase count. In another example: BGP_Neighbor_Change_Count=abs(GetTableRowCount($bgp_nbrs)−GetLastRowCount($bgp_nbrs)). In this example, the statement above can get the BGP neighbor change count compared to last time's data retrieval.

The alert definition may define the condition to create the alert. The following example operations may be supported to build the condition: Equals to, Does not equal to, Is none, Is not none, Greater than, Less than, Greater than or equals to, Less than or equals to, or Range. To compare the current value of a parser variable with its previously retrieved value, a user can select the desired parser variable and use the keyword LastValue as the comparison object. In one embodiment, an entire table can be set as the baseline for the alert check. The loop table rows' function may be designed to check the specific column's value(s) for granular control purposes. The user selects at least one table first and then selects the loop table rows' desired column. The system will loop each row to check whether the defined alert rule is matched. If any row matches the alert definition, an alert will be triggered, and the system will stop checking more rows for performance considerations.

Variables are then monitored. To optimize the performance, the system offers users the ability to select the parser variables they deem critical to their intended usage (instead of unselectively storing all historical data). Specific monitoring variables can be selected, so only parser variables' most critical historical data will be stored in the database and later be visualized in the monitoring data view. An alert message may be displayed in the Preventive Automation Dashboard and sent via email for notification purposes. In one embodiment, a user can type $ to reference the variables defined in the alert message field's alert rule statement.

In some embodiments, there may be built-in flash probes. Examples are shown in the following table:

TABLE 6

Built-In Flash Probe Examples

| Built-in Flash Probe Type | Used for | By Default | Frequency |
|---|---|---|---|
| Config Change Probe | Devices w/CLI Config. | Disabled | Daily |
| CLI Unreachable | Devices w/CLI access | Enabled | All |
| SNMP Unreachable | Devices w/SNMP access | Enabled | |

The built-in flash probe examples include the configuration change, which polls the configuration and generates an alert if there's any change. The SNMP Unreachable generates alerts if a device cannot be accessed via SNMP. CLI Unreachable generates alerts if the device cannot be accessed via CLI.

There may be an application programming interface triggering a flash alert that uses the existing APM/monitoring/logging system to trigger NI analysis. In one example, this may complement monitored data with high-frequency SNMP data while leveraging a CLI parser variable data for low-frequency monitoring. There may be a correlation between all monitoring alerts on a map.

Figure 39:
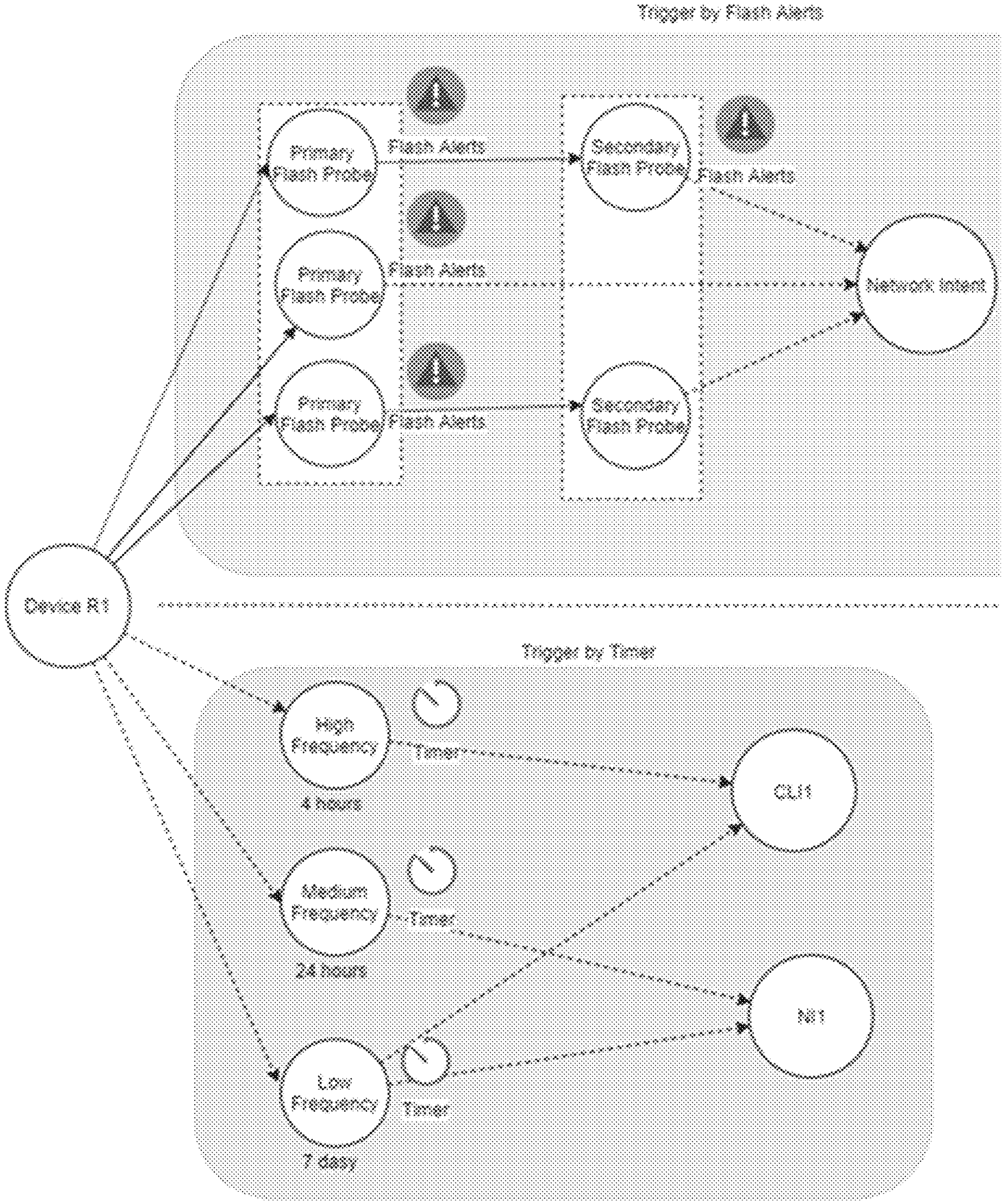
FIG. 39 illustrates an example of timer triggered flash probes.
Figure 40:
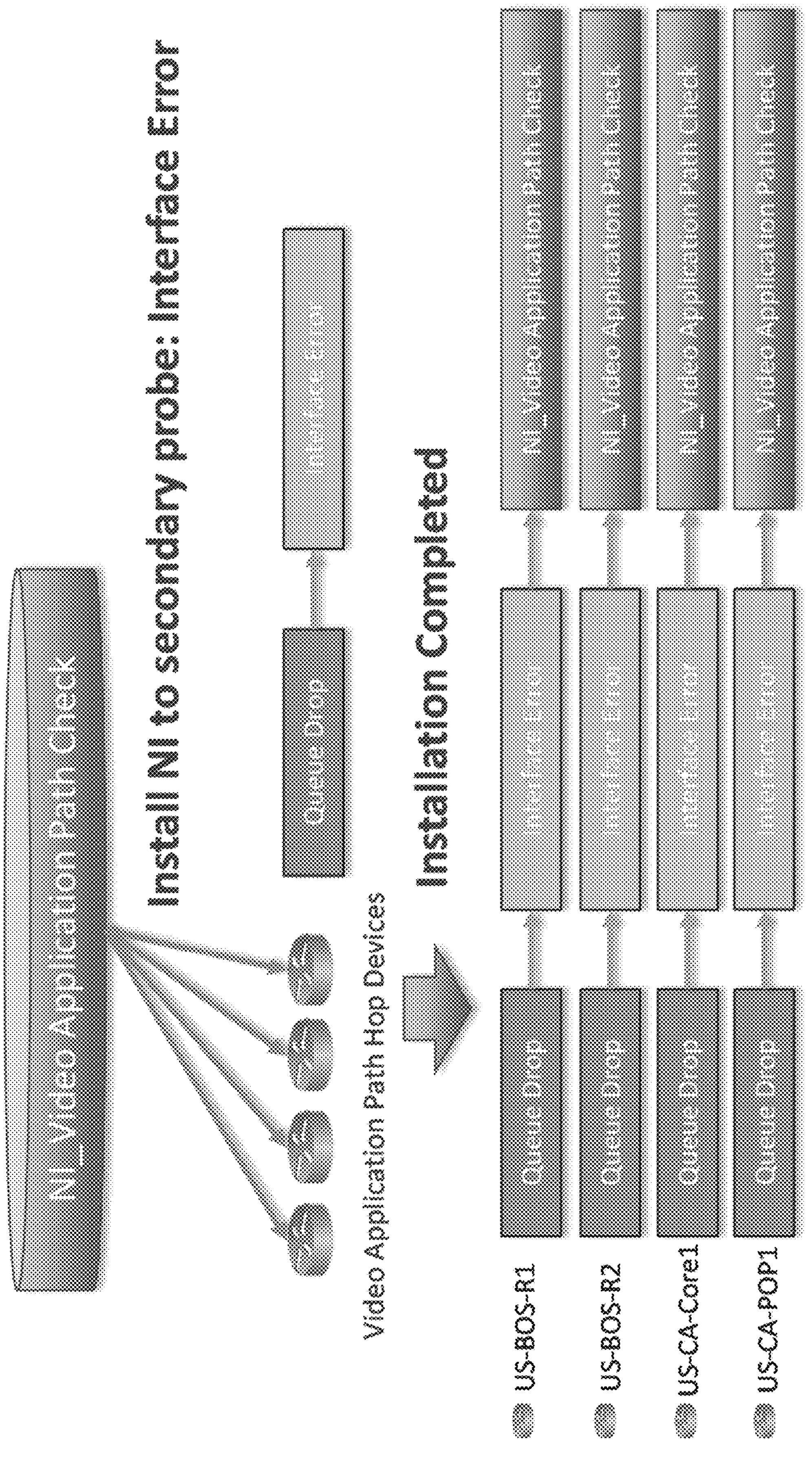
FIG. 40 illustrates the installation of NI to a probe.

FIG. 39 illustrates an example timer triggered flash probes. A timer-based flash probe may be used for scheduling tasks. Due to the scalability, the backend design for triggered automation analysis and scheduled NI/CLI analysis may be similar: they both use the flash probe as the trigger for task execution. Timer and alert may be used for the alert trigger. The timer may be used for scheduling CLI/Network Intent. Creating a timer-based flash probe may include adding a new timer-based flash probe and defining the frequency so the timer-based flash probe can be used for scheduling tasks. There may be default timer-based flash probes. By default, the system may provide the following built-in timer-based flash probes for the use of scheduling tasks:

High Frequency: Run every 4 hours
Medium Frequency: Run every day
Low Frequency: Run every week There may be the installation of the automation. FIG. 40 illustrates the installation of NI to a probe. For example, after Flash Probe is executed and Flash Alert is generated, the user can view the results in the PA Dashboard. To further help a user find the Flash Alert's root cause, Network Intentions related to this Flash Probe can be triggered to execute. The user may select Network Intent(s) (NI) by clicking an Add Automation link, and in the Select Network Intent window, select an NI. The user can also search for an NI by keyword. The user can add an associated Flash Probe(s) to selected NIs for automation. These NIs will be executed if a Flash Alert is generated. By default, the devices of these NIs will be selected, and a user can add more devices so that the user can choose Flash Probes for these devices.

The trigger rule can be defined for how the system executes automation and has the following options:

Run Once: the automation will be executed once.

Run Continuously: define the times and frequency for the automation to be executed repeatedly.

Enable Trigger Suppression: check this to avoid running this automation multiple times in the short term.

Besides enabling the trigger suppression for automation, the system-wide trigger suppression can be enabled.

Figure 41:
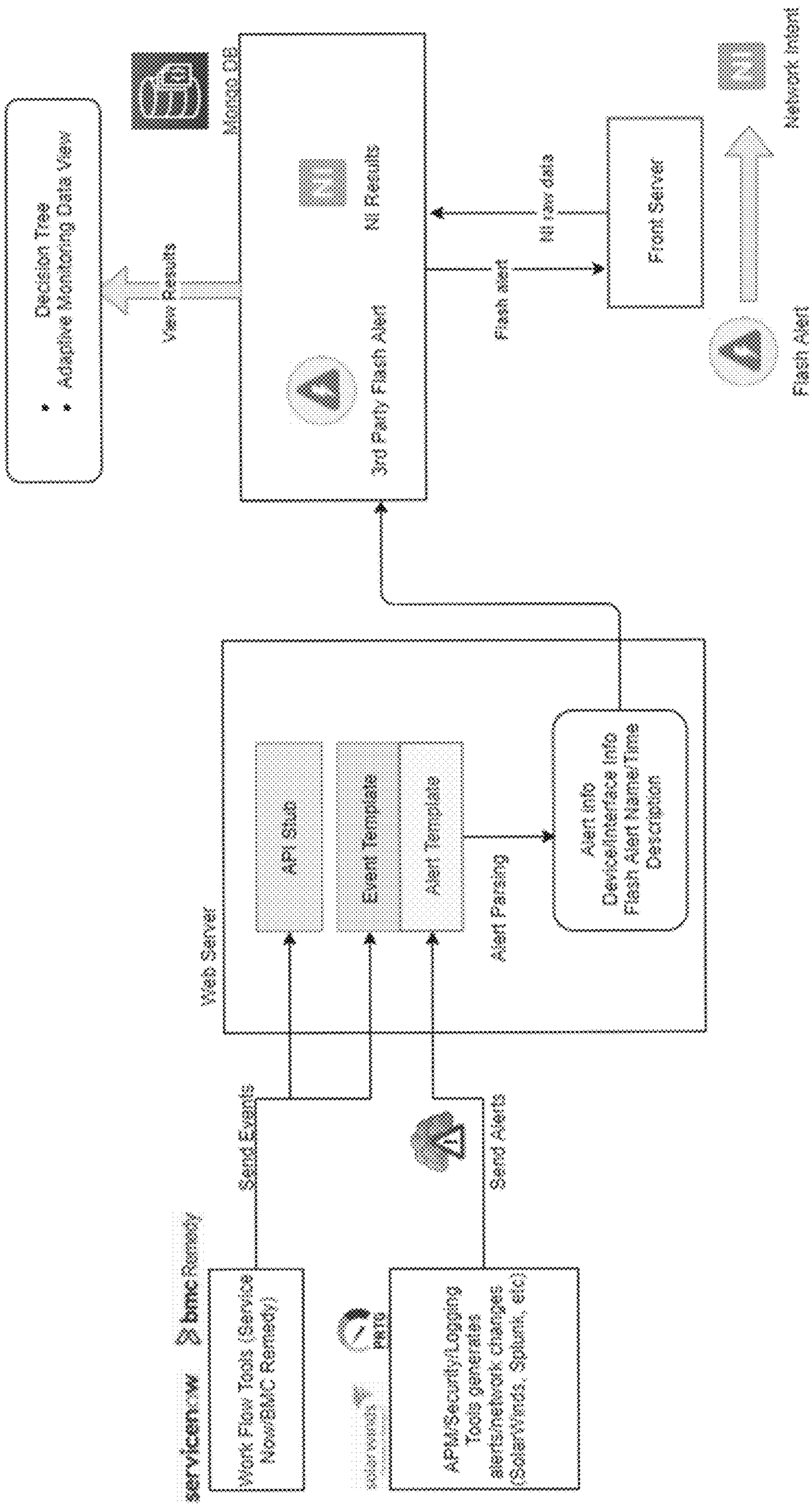
FIG. 41 illustrates an example system for implementing alerts.

FIG. 41 illustrates an example system for implementing alerts. The embodiment may include events and alerts provided to a web server via an API rather than event-based in other examples. The web server has an API Stub, Event Template, and Alert Template. Parsing of the Alert Template can provide alert info, device/interface info, flash alert name/time or a description of a third-party flash alert. The results may be triggered for a decision tree, a PA dashboard, or an adaptive monitoring data view. There may be a front server receiving the flash alert and providing NI raw/monitored data.

There may be a Prevention Automation (PA) dashboard and/or execution/decision tree. The PA Dashboard provides an overview of the network health status and statistics for the entire or partial network. Also, the PA dashboard offers the ability to further drill down to any device to view its alert and execution details. The PA dashboard may be a display for adaptive monitoring and may include a decision tree. The PA dashboard includes four components: PA dashboard summary, alert distribution, execution tree and alert history of probe and NI.

The PA dashboard summary shows PA statistics: the number of devices, the number of probes, the number of triggered Network Intents, and the number of devices with no alerts, probe alerts, and intent alerts. In addition, users can customize the device scope (the whole network, a site, a device group, or the devices of the current map) and the time range. The alert distribution shows the total number of probes with alerts and NIs with alerts. In addition, users can select a specific device to view its execution details from the following two categories: devices with Network Intent alerts and devices with probe alerts. The execution tree or decision tree shows the detailed results of probes and triggered Network Intentions for a specified device. The results are displayed with different color codes to highlight the network parameters in abnormal states. The alert history of probes and NI shows all historical alert results. In addition, users can view all alerts generated by a probe or a Network Intent.

The PA dashboard may be customizable. By default, the PA dashboard demonstrates the alert results for all domain devices. Users can specify the device scope by the following filter conditions:

Search Devices: use the hostname to search for specific devices.

All Networks (default).

Select Sites: select one or more sites.

Select Devices: select certain devices.

Current Map: select devices on the current map.

The alert results that occurred during the last 24 hours will be displayed by default. However, users can customize the time range. The results can be categorized based on the alert types:

Intent Alerts represent the devices with network intent alerts during the selected time range.

Probe Alerts represent the devices with only probe alerts during the selected time range.

No Alerts represent the devices without any active alert during the selected time range.

Clicking each alert type in a pie chart, the corresponding device info will be visualized in an alert distribution table. A user can create a default PA dashboard view by defining the default network and period.

Figure 42:
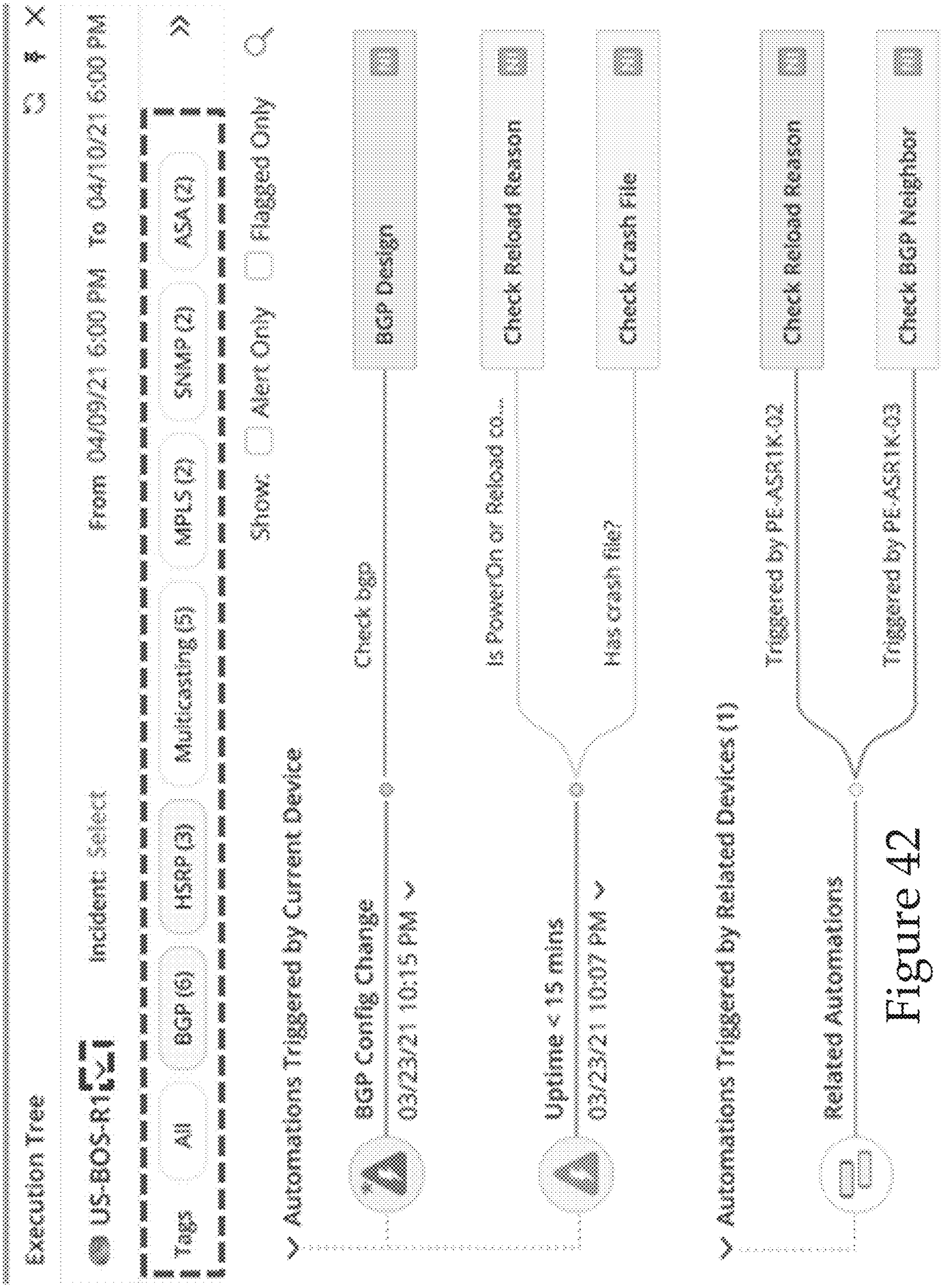
FIG. 42 illustrates an example execution tree.

FIG. 42 illustrates an example execution tree. The execution tree shows the Network Intent and the related probe execution results and provides a view of all automations without separation of a previous Playbook/Guidebook/Runbook. It can be filtered by tag to view Network Intent results with certain tags. With the execution tree, a user can select a device from an alert distribution table, and the execution tree will be activated to display the detail of all probes and triggered network intents for this device in a tree structure. The automation can be triggered by the current device or related devices such as its neighbor devices. Each row starts with the Flash Probe with its results visualized by the different codes (e.g., colors with red indicating that an alert was generated, green indicating no alert, and grey meaning that the probe is not executed), followed by one or multiple Hypothesis and the triggered Network Intents visualized by the similar color codes. A user can click a probe or a triggered Network Intent to view its detail. The execution tree can be built by adding a NI associated with a particular probe.

Figure 43:
FIG. 43 illustrates an example of alert history.
Figure 44:
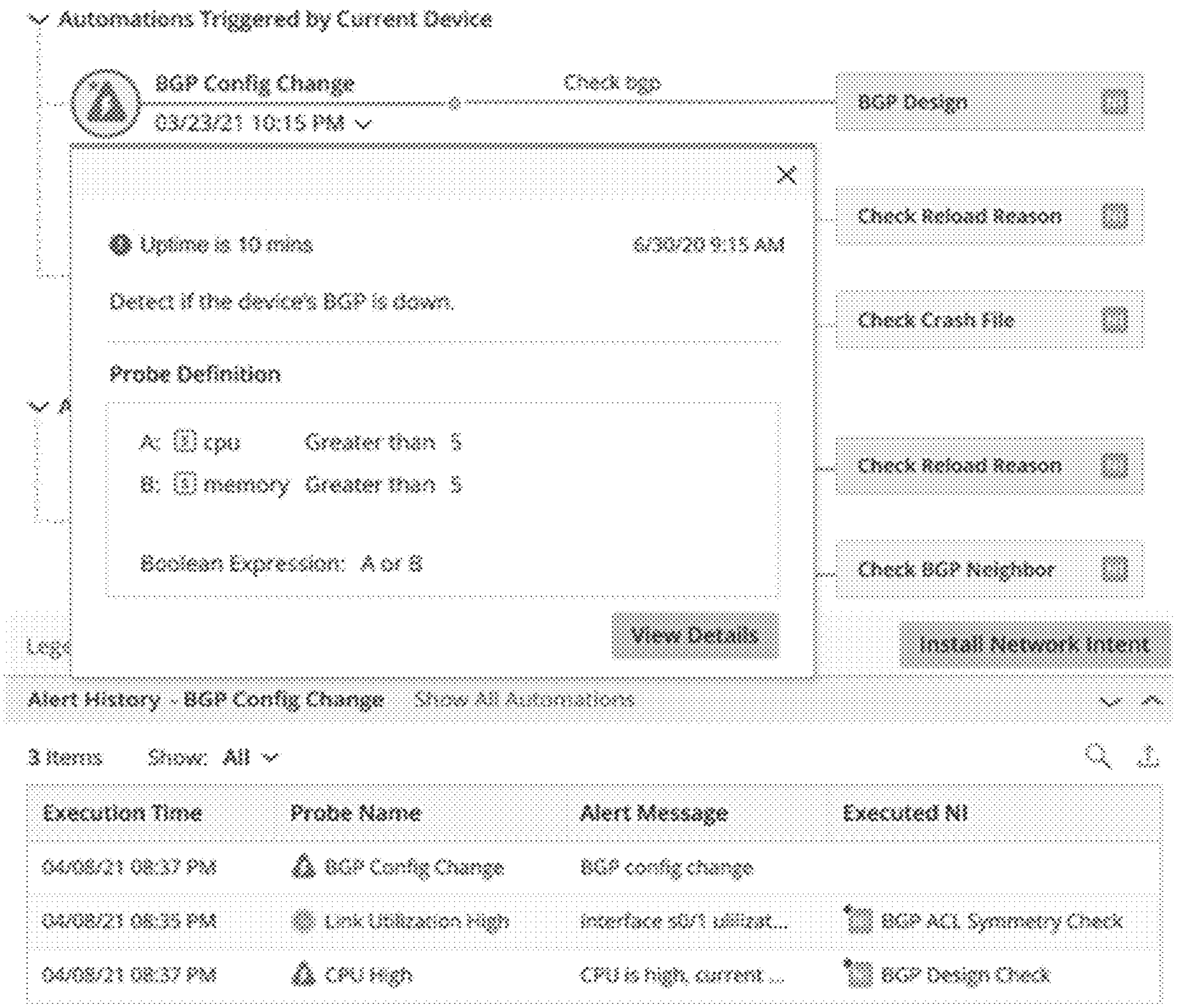
FIG. 44 illustrates an alert history for selected automation.

FIG. 43 illustrates an example alert history. The screenshot may be a lower pane that shows the alert history of a device during the selected time range. The alerts may be sorted by execution time. The triggered network intents are listed in the same row as the flash probe triggering it. A specific probe or network intent is selectable so that only the alert history of this selected automation will be displayed, as shown in FIG. 44.

Figure 45:
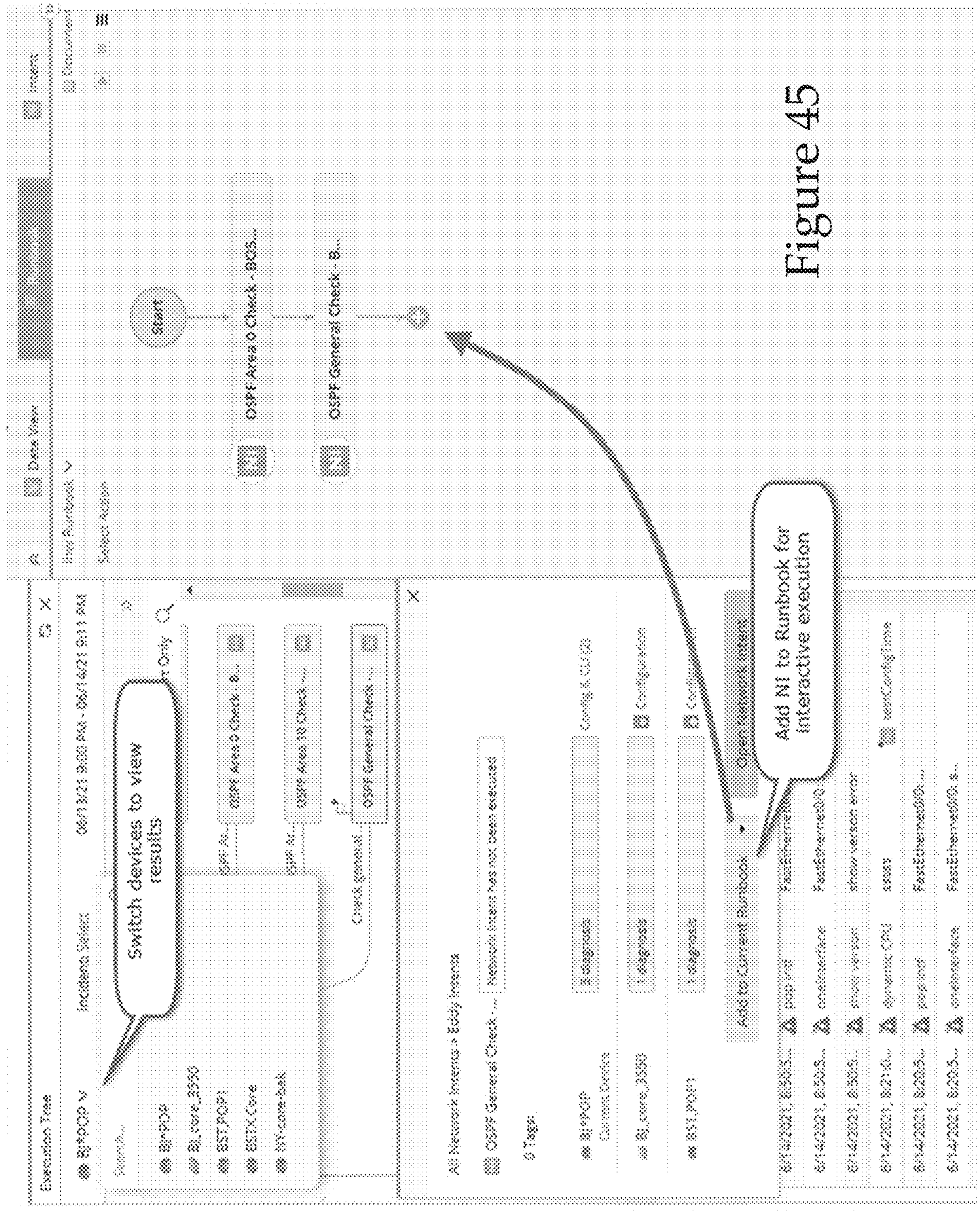
FIG. 45 illustrates adding NI to a runbook.

PA Dashboard results can be viewed or displayed in a map. After creating or opening a map, a user can select the device scope of the PA dashboard to the current map and view the alert distribution for all devices on this map. The alert distribution table selects a device to pin the execution tree and the map side by side. Then a user can add an NI into the current runbook to execute the NI interactively as in FIG. 45. FIG. 45 illustrates adding NI to a runbook by collapsing a summary view and pinning the execution tree, while adding Network Intents to the runbook to record the results and share with others. Customizations may include configuring (e.g. per-user setting) a Default Network by specifying the interested networks, and a Default Time Period by specifying the interested time range.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for automating network management comprising:

performing, with a processor, monitoring of a network, wherein the monitoring is adaptive to network problems and adaptive to a workload to detect a network incident;

establishing, with the processor, a primary flash probe that is used to detect a primary deviation based on the network incident, wherein the primary flash probe is configured to detect the primary deviation on specific devices;

establishing, with the processor, one or more secondary flash probes related to the primary flash probe that are triggered when the primary flash probe detects the primary deviation, wherein each of the one or more secondary flash probes is configured to detect additional deviations, different from the primary deviation, on specific devices that are related to the primary deviation detected by the primary flash probe, which is related to the network incident;

generating, with the processor, a flash alert when the primary flash probe detects the primary deviation, wherein the primary flash probe generates a corresponding flash alert; and generating, with the processor, a flash alert when the one or more secondary flash probes detect the additional deviations, wherein each of the one or more secondary flash probes generates a corresponding flash alert.

2. The computer-implemented method of claim 1, further comprising:

running, with the processor, a network automation at a device level based on the generated flash alert; and running, with the processor, a diagnosis for a network device that includes a comparison with a baseline configuration.

3. The computer-implemented method of claim 1, wherein the primary deviation comprises at least one of:

an interface performance issue, including a link utilization spike or interface flapping;

a device performance issue;

a route table entry anomaly; or a firewall failover.

4. The computer-implemented method of claim 3, wherein when the primary deviation comprises the interface performance issue, then the one or more secondary flash probes detect the additional deviations at an interface level, wherein when the primary deviation comprises the device performance issue, then the one or more secondary flash probes detect the additional deviations at a device level.

5. The computer-implemented method of claim 1, wherein the monitoring comprises a back-end automation without reliance on a user to run automation.

6. The computer-implemented method of claim 1, wherein the primary flash probe or the one or more secondary flash probes is configured perform a device level check and an interface level check.

7. The computer-implemented method of claim 1, wherein the primary flash probe is for a configuration change and the one or more secondary flash probes are for a failover check for the configuration change.

8. The computer-implemented method of claim 1, further comprising:

establishing, with a processor, a built-in flash probe that is triggered for detection of a configuration change, or when SNMP or CLI is unreachable.

9. The computer-implemented method of claim 1, wherein the primary flash probe or the one or more secondary flash probes is triggered by an event or by an API.

10. The computer-implemented method of claim 1, further comprising:

providing, with the processor, a dashboard displaying a summary of the primary flash probe and the one or more secondary flash probes;

displaying, with the processor, on the dashboard, the generated flash alerts for each of the primary flash probe or the one or more secondary flash probes; and displaying, with the processor, on the dashboard, a distribution of the primary flash probe, the one or more secondary flash probes, and the generated alerts.

11. The computer-implemented method of claim 10, wherein the dashboard displays an execution tree with results from the primary flash probe and the one or more secondary flash probes and the corresponding flash alerts.

12. The computer-implemented method of claim 10, wherein the dashboard displays a map of network devices and displays the primary flash probe and the one or more secondary flash probes for each of the network devices on the map.

13. A network management system comprising:

one or more processors configured to execute instructions and to act as:

a network intention (NI) management configured to define and execute network intention (NI);

adaptive monitoring automation configured to utilize one or more flash probes in a backend process, wherein each of the one or more flash probes are configured to create an alert and trigger the NI execution defined by the NI management and wherein at least a portion of the one or more flash probes are configured to detect deviations on specific devices; and a dashboard interface for displaying network devices and displaying interfaces with a corresponding result for each of the one or more flash probes, wherein the corresponding result for each of the one or more flash probes comprises the alerts for each of the one or more flash probes and a triggered automation for each of the alerts;

wherein the one or more flash probes comprise a primary probe and one or more secondary probes related to the primary flash probe that are triggered when the primary flash probe detects a primary deviation, and each of the one or more secondary flash probes is configured to detect additional deviations different from and related to the primary deviation detected by the primary flash probe.

14. The system of claim 13, wherein the one or more processors are further configured to perform an execution tree with the results from the one or more flash probes and the alerts for each of the one or more flash probes.

15. The network management system of claim 13, wherein when the alert occurs, the triggered automation for the alert is executed.

16. The network management system of claim 13, wherein the one or more flash probes further comprises an external probe.

17. The network management system of claim 13, wherein the one or more processors is further configured to display a dashboard displaying a summary of the one or more flash probes and the alerts for each of the one or more flash probes, and includes a distribution of both the one or more flash probes and the alerts for each of the network devices and for each of the interfaces.

18. The network management system of claim 17, wherein the one or more processors is further configured to display a dashboard displaying an execution tree with the corresponding results from the one or more flash probes and includes the alerts for each of the one or more flash probes.

19. The network management system of claim 17, wherein the one or more processors is further configured to display a dashboard displaying a map of the network devices and the one or more flash probes for each of the network devices.

20. The network management system of claim 17, wherein the one or more processors are further configured to act as a visual parser using a grammar to turn device command output or configuration file text into programmable variables, wherein the visual parser is configured to parse a configuration file and CLI command output for automation problem resolutions, further wherein the visual parser comprises variables comprising text, single variables, paragraph, and table.

21. The network management system of claim 13, wherein the NI comprises at least one of a name, a description, a target device, a tag, a configuration, or a variable.

* * * * *